United States Patent [19]

Hiraiwa et al.

[11] Patent Number: 5,416,813
[45] Date of Patent: May 16, 1995

[54] MODERATOR ROD CONTAINING BURNABLE POISON AND FUEL ASSEMBLY UTILIZING SAME

[75] Inventors: Kouji Hiraiwa, Chigasaki; Yoshihira Ando; Koji Hirukawa, both of Yokohama; Kazuki Hida, Kawasaki, all of Japan

[73] Assignee: Kabushiki Kaisha Toshiba, Kawasaki, Japan

[21] Appl. No.: 142,052

[22] Filed: Oct. 28, 1993

[30] Foreign Application Priority Data

Oct. 30, 1992 [JP] Japan .................. 4-293126
May 31, 1993 [JP] Japan .................. 5-129188

[51] Int. Cl.$^6$ ............................................. G21C 3/00
[52] U.S. Cl. ................................ 376/419; 376/350; 376/351
[58] Field of Search ............... 376/419, 350, 351, 431; 976/DIG. 64

[56] References Cited

U.S. PATENT DOCUMENTS

| | | | |
|---|---|---|---|
| 3,799,839 | 3/1974 | Fischer et al. | 376/419 |
| 3,933,582 | 1/1976 | MacNabb | 376/419 |
| 4,460,540 | 7/1984 | Funk et al. | 376/327 |
| 4,474,728 | 10/1984 | Radford | 376/339 |
| 4,576,787 | 3/1986 | Alsop | 376/447 |
| 4,629,599 | 12/1986 | Crowther et al. | 376/212 |
| 4,664,882 | 5/1987 | Doshi | 376/423 |
| 4,728,480 | 3/1988 | Baloh et al. | 376/209 |
| 4,789,520 | 12/1988 | Morimoto et al. | 376/419 |
| 5,045,275 | 9/1991 | Abdel-Khalik | 376/331 |
| 5,096,660 | 3/1992 | Hembjer et al. | 376/438 |
| 5,225,154 | 7/1993 | Kanno et al. | 376/416 |

FOREIGN PATENT DOCUMENTS

58-16712  1/1983  Japan .
58-113785 7/1983  Japan .

*Primary Examiner*—Donald P. Walsh
*Assistant Examiner*—Meena Chelliah
*Attorney, Agent, or Firm*—Foley & Lardner

[57] ABSTRACT

A moderator rod provided with a burnable poison and disposed in a fuel assembly of a reactor core comprises an outer tube, an inner tube disposed in the outer tube, the outer and inner tubes constituting a double tube structure between which an annular section is formed, and a burnable poison charged in said annular section. A containing amount of the burnable poison per unit area of the annular section is distributed at least one of peripheral direction and axial direction of the double tube structure of the inner and outer tubes. A fuel assembly of a nuclear reactor comprises an upper tie plate, a lower tie plate, a number of fuel rods supported at their upper ends by the upper tie plate and at their lower ends by the lower tie plate and filled up in their inner spaces with a plurality of fuel pellets, at least one of moderator rods containing burnable poison in various states and a channel box. The moderator has an outer tube and an inner tube disposed coaxially in the outer tube. An area of a metal, ceramics or thermet containing the burnable poison is formed at a portion except for portions having axial length corresponding to 1/24 to 1/12 length of the fuel effective length from the upper and lower ends thereof.

20 Claims, 43 Drawing Sheets

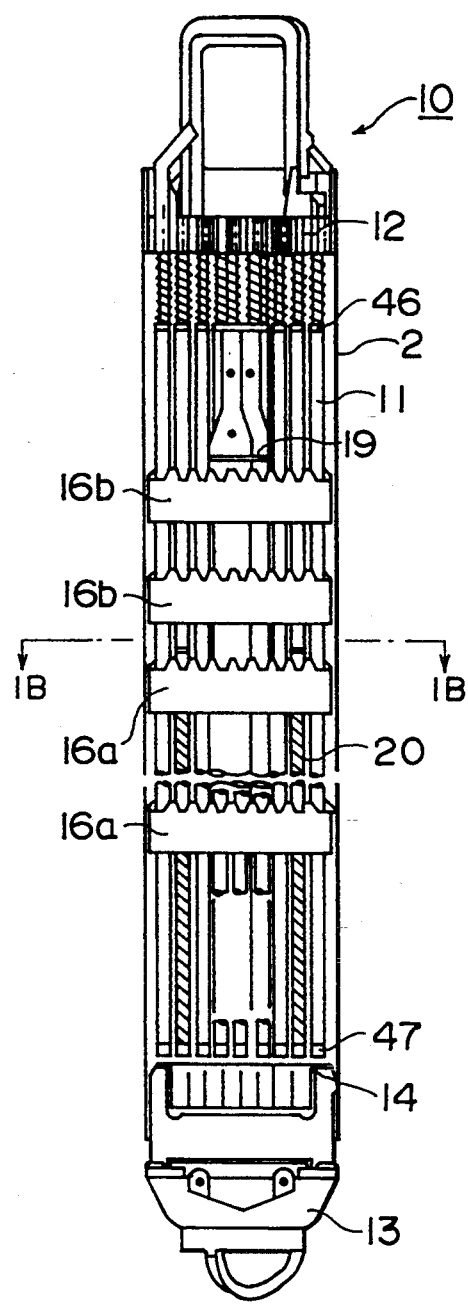
FIG.I(A)

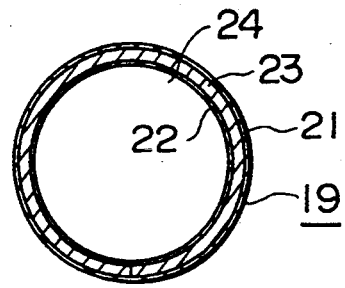
FIG. 4(A)-a
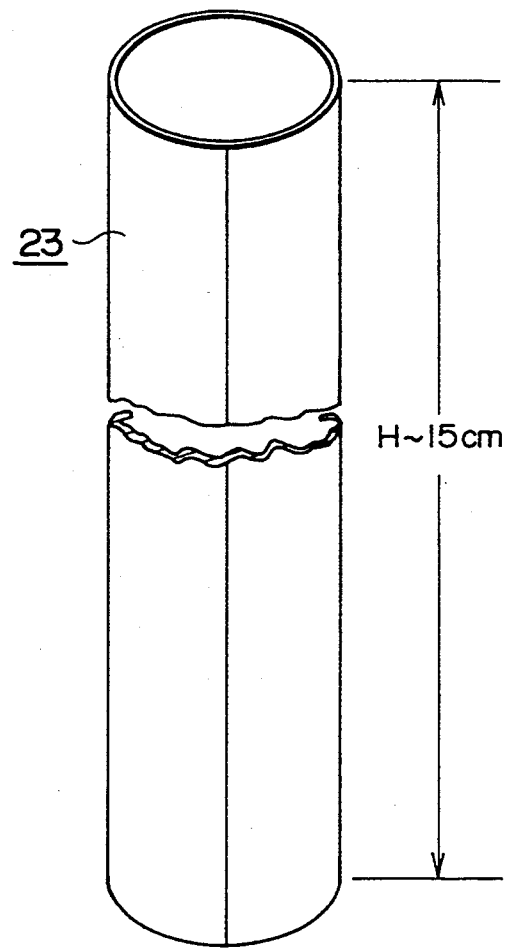
FIG. 4(A)-b

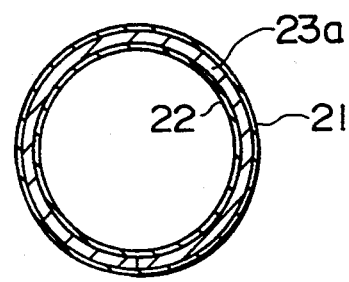
FIG. 4(B)-a
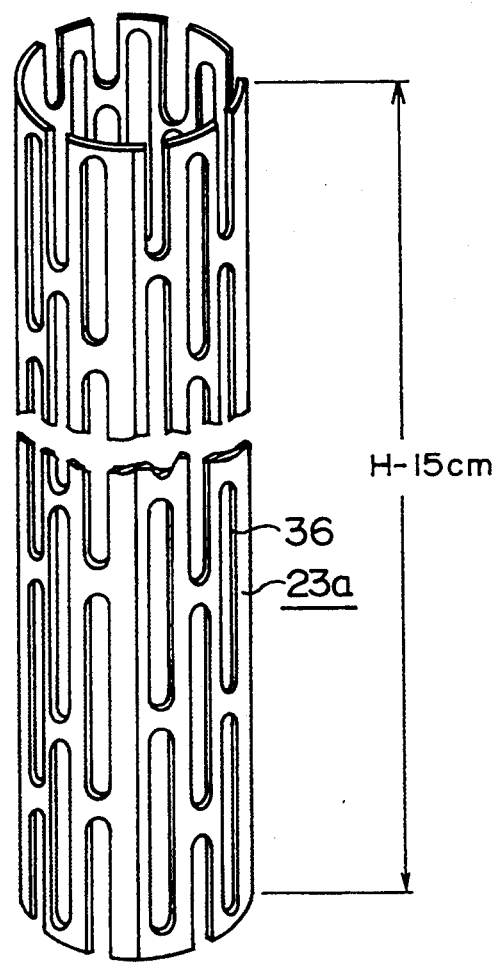
FIG. 4(B)-b

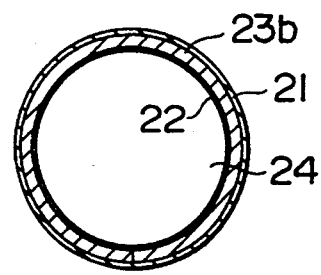
FIG. 4(C)-a
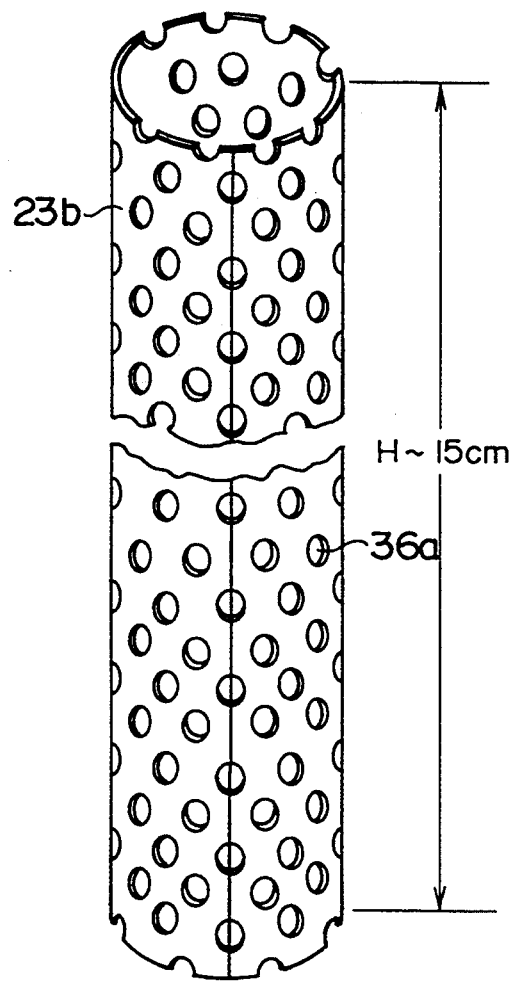
FIG. 4(C)-b

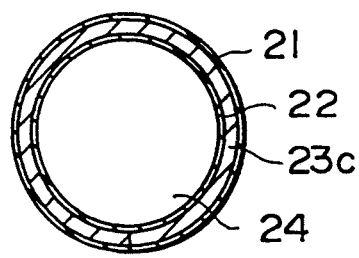
FIG. 4(D)-a
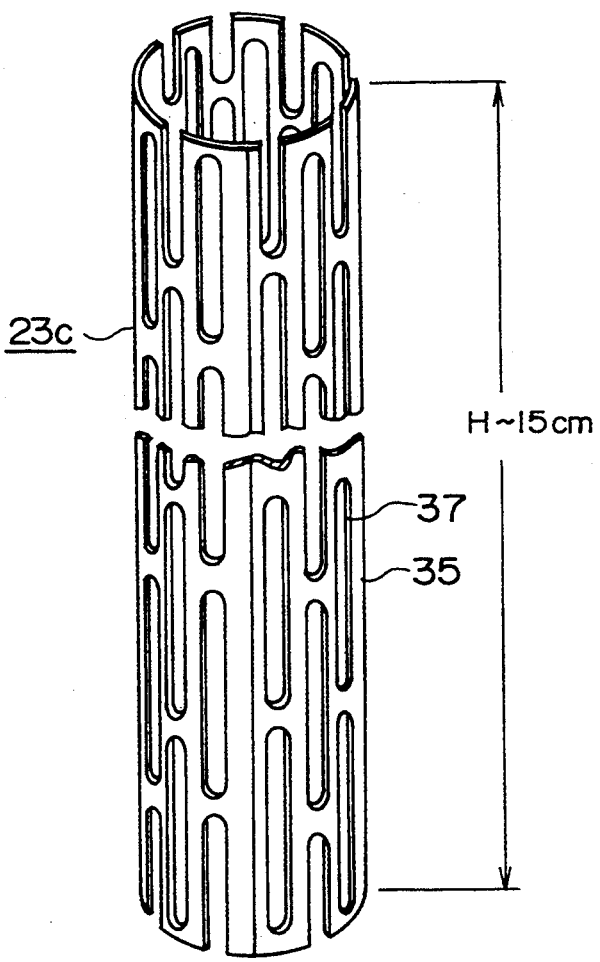
FIG. 4(D)-b

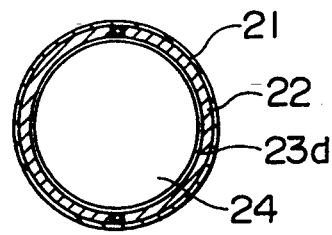
FIG. 4(E)-a
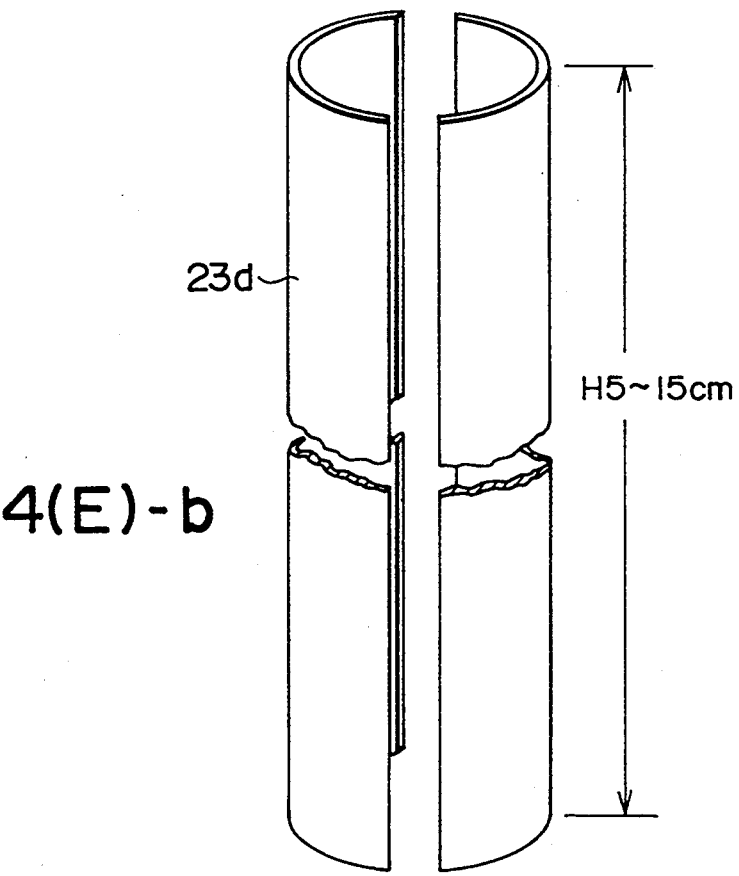
FIG. 4(E)-b

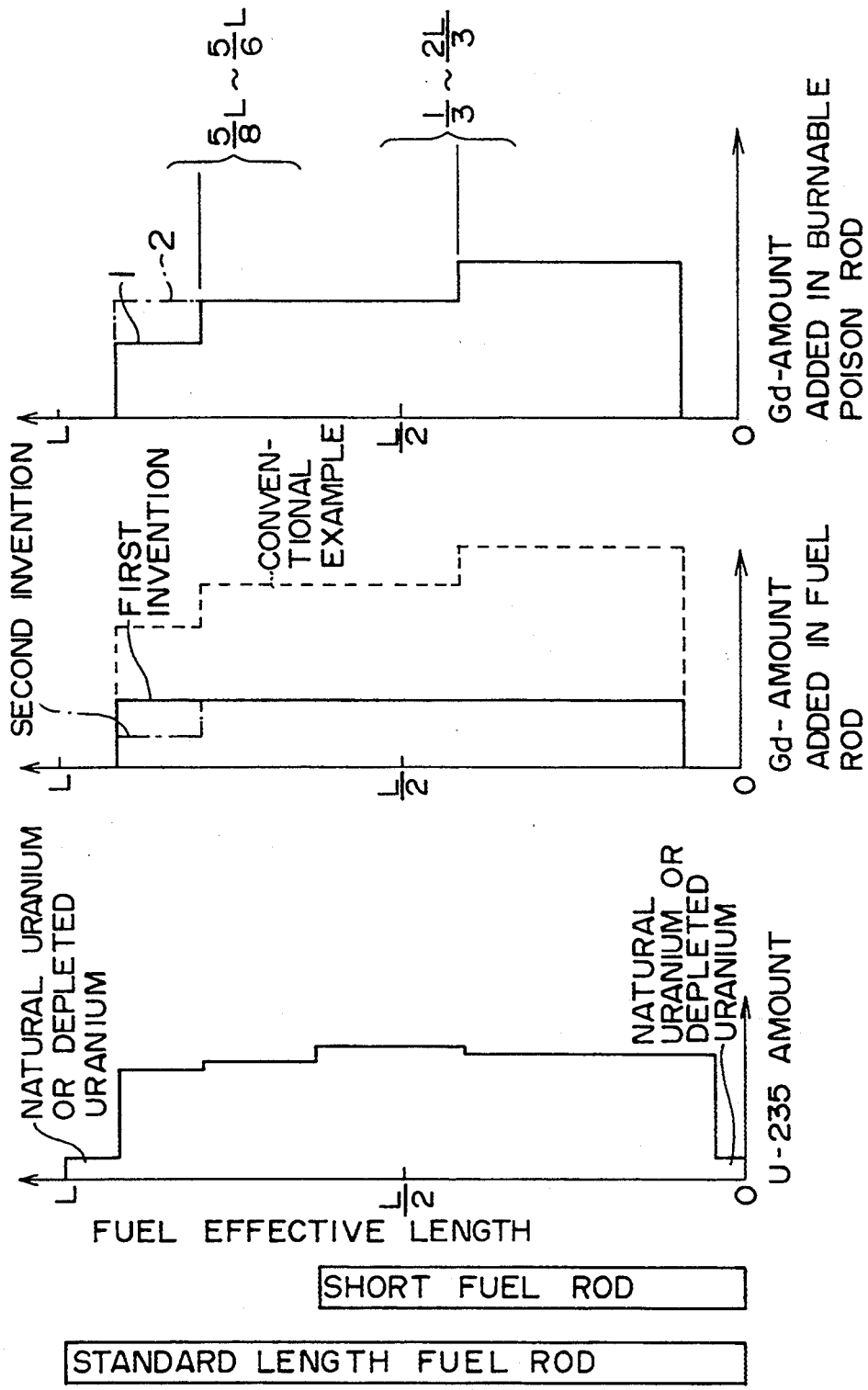

FIG. 6 (A)

| 3 | 2 | 1 | 1 | 1 | 1 | 2 | 3 |
|---|---|---|---|---|---|---|---|
| 2 | P | G | 1 | P | 1 | G | P | 2 |
| 1 | G | 1 | 1 | G | 1 | 1 | G | 1 |
| 1 | 1 | 1 | G | WR | 1 | 1 | 1 |
| 1 | P | G | WR | | G | P | 1 |
| 1 | 1 | 1 | | G | 1 | 1 | 1 |
| 1 | G | 1 | 1 | G | 1 | 1 | G | 1 |
| 2 | P | G | 1 | P | 1 | G | P | 2 |
| 3 | 2 | 1 | 1 | 1 | 1 | 2 | 3 |

FIG. 6 (B)

| 3' | 2' | 1' | 1' | 1' | 1' | 2' | 3' |
|---|---|---|---|---|---|---|---|
| 2' | P | G | 1' | P | 1' | G | P | 2' |
| 1' | G | 1' | 1' | 1' | 1' | G | 1' |
| 1' | 1' | 1' | 1' | BP/WR | 1' | 1' | 1' |
| 1' | P | 1' | BP/WR | | 1' | P | 1' |
| 1' | 1' | 1' | 1' | 1' | 1' | 1' |
| 1' | G | 1' | 1' | 1' | 1' | G | 1' |
| 2' | P | G | 1' | P | 1' | G | P | 2' |
| 3' | 2' | 1' | 1' | 1' | 1' | 2' | 3' |

BPWR : BURNABLE POISON ROD OF THE PRESENT INVENTION
WR : WATER ROD
G : $Gd_2O_3$ ADDED FUEL ROD
P : SHORT FUEL ROD
NUMBER ①~③ ENRICHMENT ORDER FROM HIGH ENRICHMENT
①'~③' TO LOW ENRICHMENT
(EXAMPLE OF $UO_2$ FUEL)

BPWR : BURNABLE POISON ROD OF THE PRESENT INVENTION
WR : WATER ROD
G : $Gd_2O_3$ ADDED FUEL ROD
P : SHORT FUEL ROD
NUMBER ①~④ ENRICHMENT ORDER FROM HIGH ENRICHMENT
  TO LOW ENRICHMENT
  (EXAMPLE OF $UO_2$ FUEL OF HIGH
   ENRICHMENT)

BPWR : BURNABLE POISON ROD OF THE PRESENT INVENTION
WR : WATER ROD
G : Gd$_2$O$_3$ ADDED URANIUM FUEL ROD
P : SHORT FUEL ROD
NUMBER ①~④ ENRICHMENT ORDER FROM HIGH Pn ENRICHMENT
TO LOW Pn ENRICHMENT
(EXAMPLE OF MOX FUEL)

BPWR: BURNABLE POISON ROD OF THE PRESENT INVENTION
WR: WATER ROD
G: $Gd_2O_3$ ADDED FUEL ROD
NUMBER ①~③ ENRICHMENT ORDER FROM HIGH ENRICHMENT TO LOW ENRICHMENT

FIG. 13(A)

|   |   |   |   |   |   |   |   |
|---|---|---|---|---|---|---|---|
| 4 | 3 | 3 | 2 | 2 | 3 | 3 | 4 |
| 3 | G | 1 | 1 | 1 | 1 | G | 3 |
| 3 | 1 | G | 1 | G | 1 | 1 | 3 |
| 2 | 1 | 1 | WR | WR | G | 1 | 2 |
| 2 | 1 | G | WR | WR | 1 | 1 | 2 |
| 3 | 1 | 1 | G | 1 | G | 1 | 3 |
| 3 | G | 1 | 1 | 1 | 1 | G | 3 |
| 4 | 3 | 3 | 2 | 2 | 3 | 3 | 4 |

FIG. 13(B)

|   |   |   |   |   |   |   |   |
|---|---|---|---|---|---|---|---|
| 4 | 3 | 3 | 2 | 2 | 3 | 3 | 4 |
| 3 | G | 1 | 1 | 1 | 1 | G | 3 |
| 3 | 1 | 1 | 1 | 1 | G | 1 | 3 |
| 2 | 1 | 1 | BP/WR | BP/WR | 1 | 1 | 2 |
| 2 | 1 | 1 | BP/WR | BP/WR | 1 | 1 | 2 |
| 3 | 1 | G | 1 | 1 | 1 | 1 | 3 |
| 3 | G | 1 | 1 | 1 | 1 | G | 3 |
| 4 | 3 | 3 | 2 | 2 | 3 | 3 | 4 |

BPWR : BURNABLE POISON ROD OF THE PRESENT INVENTION
WR : WATER ROD
G : Gd$_2$O$_3$ ADDED FUEL ROD
NUMBER ①~④ ENRICHMENT ORDER FROM HIGH ENRICHMENT TO LOW ENRICHMENT

FIG. 14(B)

WATER CROSS

FIG. 14(C)

BPWR

WATER CROSS

BPWR: BURNABLE POISON ROD OF THE PRESENT INVENTION
WR: WATER ROD
G: $Gd_2O_3$ ADDED FUEL ROD
NUMBER ①~③ ENRICHMENT ORDER FROM HIGH ENRICHMENT TO LOW ENRICHMENT

MODERATOR ROD CONTAINING BURNABLE POISON AND FUEL ASSEMBLY UTILIZING SAME

BACKGROUND OF THE INVENTION

1. Field of The Invention

The present invention relates to a moderator rod containing a burnable poison and a fuel assembly utilizing the same in a reactor core.

2. Prior Art

Example of Basic Structure of Fuel Assembly of Boiling Water Reactor

A basic structure of a fuel assembly of a conventional boiling water reactor BWR will be first described hereunder with reference to FIGS. 38(A) and 38(B). Referring to FIGS. 38(A) and 38(B), the fuel assembly 1 is composed of the numbers of fuel rods 11, arranged in 8 columns and 8 rows (8×8), each of which is packed with fissionable material, one moderator rod (water rod) 5 of a cylindrical tube structure occupying a space in the fuel assembly corresponding to four fuel rod arrangement shown in FIG. 38(B), and a spacer 16 for bundling the fuel rods 11 and the moderator rod 5 with the upper end of this bundle being fixed to an upper tie plate 12 and the lower end of this bundle being fixed to a lower tie plate 13. The bundle of the fuel rods 11 and the moderator rod 5 are surrounded by a channel box 2.

Four fuel assemblies 1, each mentioned above, constitute a unit lattice by arranging them at peripheral portions of a control rod (blades) 17 crossing in cross section, and a core is constructed by arranging, in a lattice, a plurality of the unit lattices. One or a plurality of the moderator rods 5 are arranged at a portion near the central portion of the fuel assembly 1, and the moderator rod 5 having an outer diameter substantially equal to or slightly larger than an outer diameter of a fuel cladding is utilized.

The moderator rod has an inner structure so that a coolant of an amount suitable for preventing the coolant from boiling passes during a reactor operation or running period. In a certain case, a plurality of moderator rods having different outer-diameters have been utilized as disclosed in the Japanese Patent Laid-open Publication No. 12088/1990 or No. 147890/1990.

Example of Fuel Containing Burnable Poison

A portion of the conventional fuel rod is contained with a burnable poison, and in order to maintain for a long term, a flatness of an excess reactivity, the concentration or density thereof and the number of the fuel rod containing the burnable poison are adjusted to suitable values or numbers.

This is carried out by utilizing such characteristics as that a reactivity worth (negative) of the burnable poison packed inside the fuel rod and a reactivity (positive) of uranium are both substantially linearly reduced in accordance with burning. For example, in the technology disclosed in the Japanese Patent Laid-open Publication No. 147890/1990, as shown in FIG. 2, the excess reactivity is made flat by utilizing the fact that the reactivity worth of gadolinia and uranium is linearly reduced.

Example of Moderator Rod Containing Burnable Poison of PWR)

In a PWR, the burnable poison may be arranged in an element or member of fuel assembly except the fuel rods. Many technology related to methods of manufacturing the burnable poison have been known and some of them will be described hereunder.

In the Japanese Patent Publication No. 16712/1983, entitled with "Burnable Poison Rod" it is described that, in a pressurized water reactor PWR, the burnable poison rod is settled in a vacant position of a control rod guide sheath of a rod-cluster type control rod (RCC) in the fuel assembly, and it is then utilized by assembling it into the fuel assembly. The density or concentration of the burnable poison rods and the number thereof in the fuel assembly and the number of the fuel assemblies in which the burnable poison rods are assembled are decided so as to reduce the concentration of a soluble boron to such extent as being enough to ensure a temperature coefficient of the moderator to be negative.

In the specification of the U.S. Pat. No. 3,510,350, there is disclosed a burnable poison rod in which a borosilicate glass tube is inserted into an annular space of a double cylindrical metallic tube, an annular space in an inner side metallic tube and a gas plenum formed by this space receives a reaction gas product such as helium gas caused by absorption of neutron by boron.

In order to improve a defect of much parasitic neutron absorption by a structure at the end of a core life of this burnable poison rod, an annular pellet is arranged, which is formed of a slender outer tube, an inner tube coaxially disposed inside the outer tube, upper and lower plugs mounted to the outer and inner tubes and a burnable poison disposed in an annular space defined between these outer and inner tubes. The burnable poison rod of such structure has an axial passage formed to the upper and lower plugs so as to communicate with an inside hole of the inner tube for circulating the coolant having the neutron moderating function inside the inner tube to thereby increase coolant containing amount.

In this prior art, the outer and inner tubes of the burnable poison rod are made of a zirconium alloy, and the annular pellet made of burnable poison is formed of a burnable poison such as boride such as $B_4C$—$Al_2O_3$ or $ZrB_2$, or oxide such as $Gd_2O_3$.

In the Japanese Patent Publication No. 40158/1983, entitled with "Burnable Poison Rod Usable in Nuclear Reactor", there is disclosed a burnable poison rod for solving a problem in a moisture control of an aluminium oxide in a case where the burnable poison pellet is diluted by an aluminium oxide to reduce the burnable poison amount remaining in the end of the core life and, at the same time, to reduce the containing amount of boron in shape of $B_4C$—$Al_2O_3$. In the burnable poison rod, disclosed in this publication, it is characterized that the burnable poison pellet is formed of a boron carbide and the boron utilized therefor includes an amount of 1 to 8 w % depleted in concentration of boron-10 (B-10) chemically from the amount of 18.6 w % of $B_{10}$ contained in natural boron. As a chemical compound of the diluted boron, boron carbide, boron nitride or zirconium diboride are listed.

Furthermore, in the Japanese Patent Publication No. 37717/1991, entitled with "Sintered Burnable Neutron Absorber Pellet for Fuel Assembly of Nuclear Reactor", there is disclosed a method for improving a problem of difficulty of the moisture control due to the moisture absorbing property of the aluminium oxide in the case where the burnable poison pellet, disclosed in the Japanese Patent Publication No. 16712/1983, entitled with "Burnable Poison Rod" that is in shape of B$_4$C—Al$_2$O$_3$ is diluted to reduce the boron containing amount. In this publication, there is further disclosed a compound selected from silicate, magnesium oxide, talc, sodium silicate or silica utilized as sintering additive, and a compound selected from boron, gadolinium, samarium, cadmium, europium, hafnium or indium utilized as a burnable poison to be diluted by the aluminium oxide.

Still furthermore, in the Japanese Patent Publication No. 45037/1989, entitled with "Annular Burnable Poison Rod" there is disclosed a burnable poison rod, in which, in order to remove a moisture absorption property of the burnable poison pellet, to make as possible as thin a structural volume of the burnable poison rod and to reduce an amount of a moderator to be removed by the burnable poison rod, a support tube formed of niobium is disposed in an annular space, and a layer of burnable neutron absorber selected from a group of boron compounds including boron carbide, boron nitride or zirconium diboride is formed at least a portion of a surface of the support tube so as to have a thickness of 0.05 to 0.25 mm.

Still furthermore, in the Japanese Patent Publication No. 11674/1991, entitled with "Fuel Device for Nuclear Reactor", there is disclosed a fuel assembly utilizing a burnable poison in which a sleeve containing a burnable neutron poison is contained so as to be fitted to an outer peripheral surface of a control rod guide tube connected, at its upper and lower ends, respectively to upper and lower nozzles. This sleeve is formed by containing particles of boron carbide or gadolinium to a zirconium alloy.

Example of Application of Burnable Poison Containing Moderator Rod to BWR

The burnable poison containing moderator rod is applicable to a fuel assembly for the BWR, and one example is shown in FIG. 6 of the Japanese Patent Laid-open Publication No. 113785/1983. Furthermore, in FIGS. 9 to 12 of this publication, there are disclosed examples for changing a surface area by changing a cross section of the moderator rod by making the section non-circular as a method of adjusting a poison reactivity of the moderator rod containing the burnable poison. Furthermore, in the Japanese Patent Laid-open Publication No. 147890/1990, there is disclosed an example in which a zirconium boride as a burnable poison is coated to the moderator rod.

However, the prior art technologies such as described above may involve the following problems.

Recently, there has been a tendency of requiring a fuel assembly design for increasing average U-235 enrichment or Pu enrichment (enhancement) of the fuel assembly for expanding an operation cycle (from 9 to 13 months to 15 to 18 months) or improving fuel cycle cost by increasing discharge exposure. In order to satisfy such requirement, the addition of the burnable poison rods to suppress an initial excess reactivity has been managed. And the increasing concentration of burnable poison in comparison with the conventional technique has been managed.

By the way, if the gadolinia is added into the fuel as the burnable poison, the thermal conductivity decreases and melting point of a fuel pellet lowers as the adding concentration increases. As this result, a temperature of the gadolinia added fuel pellet is made higher and a fission product (FP) gas is much discharged. Accordingly, gas accumulation in the gas plenum provided in the fuel rod increases and an inner pressure of the gas is hence increased.

For the reason described above, in a mechanical design of the fuel rod, in order to make substantially equal the degree of interference between the cladding and the pellet due to the inner pressure of the gadolinia non-added fuel rod and the thermal swelling of the fuel pellet with respect to the gadolinia added fuel rod, it is attempted to make reduce the U-235 enrichment of the gadolinia added fuel rod or Pu enrichment lower than that of the gadolinia non-added fuel rod, or to make large a volume of the gas plenum. As this result, in the case of the high enrichment and high burn-up, it has been highly required to increase the volume of the gas plenum and to lower the enrichment or enhancement with respect to the gadolinia added fuel rod. This results in the limiting of the increasing of the charging amount of the U-235 and Pu-239 to the fuel assembly.

First Problem

In the case described above, such problem can be removed if a burnable poison is arranged to a portion other than the fuel rod.

PWR type poison rod utilizes this type of configuration.

However, since the burnable poison rod for the PWR utilizes a boron and since there has been not considered a specific combination of a fuel enrichment distribution design in the fuel assembly used in BWRs, there provides a problem of increasing a local power peaking as it is or a problem of an axial power distribution control being not suitable in BWR use.

Namely, in the BWR, a non-boiling water mainly acting as a moderator flows outside the channel box, and in order to improve the fact that the thermal neutron flux is high at the outer side of the fuel assembly and low at the inner side thereof, one or a plurality of water rods are arranged at substantially a central portion of the fuel assembly.

However, when the technique of the burnable poison rod for the PWR disclosed in the aforementioned Japanese Patent Publication No. 16712/1983, entitled with "Burnable Poison Rod" is applied to this central position, the local power peaking of the fuel rod arranged outer side of the fuel assembly is made too large, thus providing a problem. Furthermore, since in the BWR, a void distribution exists in the axial direction, it becomes necessary to take a countermeasure thereto, and still furthermore, since a diameter of the annular burnable poison rod becomes larger, more than twice, than that of the PWR, the ceramics annular burnable poison rod in the prior art provides less productivity, thus also involving a problem.

The burnable poison rod is utilized for the PWR for the reason that a boron density is made too high at a time when the excess reactivity of the core at the initial cycle time is controlled by a soluble boron density in the coolant and then to prevent the temperature coefficient of the moderator from becoming negative at the initial time of the operating cycle.

Accordingly, an effect of the burnable neutron absorption material in the burnable poison rod can be achieved by locating the same with such a concentration as suppresses the soluble boron density in the coolant at an initial half time Of the operating cycle, and the remaining of this neutron absorption material at the final time of the cycle makes short the cycle life of the core, making worse the fuel economy. Thus, it is basically desired to design the burnable neutron absorption material so as to dilute the concentration as possible as thin.

Particularly, in a current use, the burnable poison rod for the PWR is withdrawn after every one cycle and a flow rate limiting rod or control rod is in place inserted, and accordingly, it is not a design promise to stay the burnable poison rod for a long term such as six cycles in the core together with the fuel assembly. On the other hand, in the case where it is utilized for the BWR, it is necessary to design the fuel assembly in consideration of the long term staying thereof in the core.

Second Problem

However, furthermore, in the case where the gadolinia is adapted as a burnable poison having the shape and structure, as they are, of the burnable poison rod (which will or may be also called hereinlater as a moderator rod containing a burnable poison) disclosed, for example, in the aforementioned Japanese Patent Publications, it has been found in a view point of analysis result that this adoption of the gadolinia provides an desirable characteristic for making flat the excess reactivity. This fact is explained hereunder with reference to, as one example, a relationship between a poison reactivity and a gadolinia concentration in the case where the gadolinia as the burnable poison material is packed in the moderator rod containing the burnable poison. In this example, the moderator rod has outer and inner tubes made of zircaloy, an annular portion between these tubes has a thickness of 1.0 mm, and an alloy (thermet) of zirconium metal and gadolinia is packed in the annular portion.

FIG. 27 shows variations of reactivities in a case where three kinds of poison concentrations of the moderator rods containing the burnable poison is increased with solid lines x, y and z. As shown in FIG. 27, the poison reactivities of the moderator rod containing the burnable poison change a certain exposure point and are then rapidly reduced therefrom, and it will be observed that the change has upwardly protruded shape in comparison with a conventional case in which the reactivity of a conventional burnable poison added in a fuel pellet changes linearly as shown with the dotted line in FIG. 27.

Further, as is observed from the fact that the magnitudes of the initial reactivities of the burnable poisons represented by the curves x, y and z have merely small differences from each other, it will be found that the width of change in the initial reactivity is small even if the gadolinia concentration is changed, and only due to the concentration of the gadolinia, the initial reactivity is not sufficiently adjusted. This is based on the following reason.

Since the burnable poison is a substance having a very large thermal neutron absorption cross section, so-called a shielding effect is attained. Namely, neutrons produced by a fission reaction are moderated by a coolant as a moderator and hence change to thermal neutrons, which flow in the surface of the burnable poison. However, since the thermal neutrons are absorbed by the burnable poison in the vicinity of the surface, they do not reach the inside thereof. As this result, the poison reactivity is made parallel to a surface area facing the moderator.

In a case where the burnable poison is added to the fuel pellet, the surface area is simply reduced as progressing the burn-up of the burnable poison from the outer side thereof as shown in FIGS. 15(A) and 15(B). Then, the poison reactivity is reduced approximately linearly in accordance with the exposure. On the other hand, in a case where the burnable poison is contained in the annular portion such as in the case of the moderator rod containing the burnable poison, the surface area is hardly changed by the burning, so that the poison reactivity is maintained constant for the time being and the poison reactivity is rapidly reduced when the burnable poison is almost burned up.

In accordance with these results, an effect is caused on the excess reactivity. This will be explained hereunder in detail with reference to FIGS. 28 and 29. In FIG. 28, the broken line represents as a model a burning change of a typical infinite multiplication factor in a case where the burnable poison is added only to the fuel pellet, and operating interval shown with arrows represent running cycles.

For example, with a core in which fuel charged in the core is reloaded by ⅓ amount thereof every fuel reload times, the average infinite multiplication factor in the core corresponds to the infinite multiplication factor whose cycle is shifted by one cycle to make average the same. The infinite multiplication factor shown with the broken line in FIG. 28, viewed from its burning term, changes linearly with respect to the exposure, and the exposure of the excess reactivity of the core, in which the infinite multiplication factor is made average, changes also approximately linearly as shown with the broken line in FIG. 29.

However, since the poison reactivity of the moderator rod containing the burnable poison is not linearly changed as shown with the curve x, y or z in FIG. 27 with respect to the exposure the infinite multiplication factor is offset from the linear change at the initial period of operating cycle with respect to the exposure. For this reason, the change of the exposure of the excess reactivity of the core utilizing the moderator rod containing the burnable poison affects such that the initial period of operating cycle is made large and an intermediate period of operating cycle is reduced as shown with the solid line in FIG. 29.

As can be understood from the above disclosure, in the case where only the moderator containing the burnable poison of single concentration or density is utilized, there provides a problem such that the excess reactivity cannot be made flat due to its burning characteristic and, hence, the operation of the control rod and the adjustment of the flow rate for controlling the excess reactivity must be increased in frequencies, thus being troublesome and inconvenient for the operating of the reactor.

SUMMARY OF THE INVENTION

The present invention was conceived in view of the above matters and problems encountered in the prior art and an object of the present invention is to provide a fuel assembly capable of suppressing excess reactivity of a fuel during almost operation cycle, reducing the amount of a burnable neutron absorbing material and providing an excellent reactivity suppressing characteristic during the initial burning time by improving a burnable poison added fuel rod of the fuel for high exposure, and also provide a burnable poison rod adapted to such fuel assembly.

Another object of the present invention is to provide a moderator rod containing a burnable poison capable of providing a linearly changing characteristics of the poison reactivity and realizing a flat excess reactivity, and also provide a fuel assembly containing such moderator rod.

These and other objects can be achieved according to the present invention by providing the following moderator rod provided with a burnable poison and disposed in a fuel assembly of a reactor core and the fuel assembly containing such moderator rod in various aspects.

In a first aspect particularly for solving the above first problem, there is provided a fuel assembly of a nuclear reactor comprising an upper tie plate, a lower tie plate, a number of fuel rods supported at their upper ends by the upper tie plate and at their lower ends by the lower tie plate and filled up in their inner spaces with a plurality of fuel pellets, at least one of moderator rods disposed between the fuel rods, and a square cylindrical channel box forming the coolant passage, in which the fuel rods and the moderator are accommodated in a bundle, wherein the moderator rod containing the burnable poison has an outer tube, an inner tube disposed coaxially in the outer tube, upper and lower annular plugs secured to these outer and inner tubes and metal, ceramics or thermet containing burnable poison charged in an annular space formed between the outer tube and the inner tube, the lower annular plug being connected to a lower end tube of a single tube structure having a lower end plug, and a coolant having a neutron moderating function is taken into the inner tube from the flow-in port formed to the lower end tube through a coolant passage formed between the fuel rods in the fuel bundle, the coolant then flowing through the inner tube, the upper annular plug being connected to an upper end tube of a single tube structure having an upper end plug, and the coolant from the inner tube through the leakage port is discharged into the coolant passage between the fuel rods in the fuel bundle, at least one of the moderator rods containing the burnable poison being provided with a tub for supporting a plurality of spacers arranged axially of the fuel bundle for maintaining a horizontal space between the fuel rods and the burnable poison rods, and an area of a metal, ceramics or thermet containing the burnable poison is formed at a portion except for portions having axial length corresponding to 1/24 to 1/12 length of the fuel effective length from the upper and lower ends thereof.

Furthermore, the poison charged area of the burnable poison has an axial burnable poison concentration distribution or density distribution and a portion positioned higher than a boundary positioned at ⅓ to ⅔ length position from the lower end of the fuel effective length has the burnable poison concentration or density distribution smaller than that in a portion positioned lower than the boundary. Otherwise, the poison charged area of the burnable poison has an axial burnable poison concentration distribution or density distribution, the poison charged area having a first sectioning portion positioned at ⅓ to ⅔ length position from the lower end of the fuel effective length and a second sectioning portion positioned at ⅔–5/6 length position from the lower end of the fuel effective length, and the burnable poison concentration or density distribution is made highest at a portion lower than the first sectioning portion, made lowest at a portion higher than the second sectioning portion, and made middle at a portion between the first and second sectioning portions.

Furthermore, the concentration of the burnable poison to be added to the burnable poison rod of the present invention is a concentration providing a reactivity suppressing effect throughout about 1.0 to 1.5 cycle with unit cycle having a cycle length at which the fuel assembly is charged.

In a second aspect, in the fuel assembly of the first aspect, the burnable poison rod is disposed at a central portion of the fuel bundle and the fuel rods include ones, of the fuel rods facing the burnable poison rod, containing no burnable poison corresponding to the number of fuel rod cells occupied by at least the burnable poison rod, and the fuel rods containing the burnable poison and arranged at the most outer peripheral portion or at a portion next to the most outer peripheral portion of the fuel-bundle has a burnable poison concentration less than that at which the burnable poison has been burned up at a time of 0.5 to 0.8 time of a cycle length.

In a third aspect, the gadolinium added zirconium alloy or the zirconium thermet containing the gadolinia to be inserted between the double tube structure of the first aspect is formed to provide a cylindrical structure by bending a plate member and it is inserted and piled up in the annular section. In this operation, circular or elongated holes punched out from the plate member are adjusted in arrangement to control the amount of the burnable poison amount. In such case, it is desired that diameters of the punched circular holes are distributed with diameters equal to or smaller than a thermal neutron diffusion length of water (2 or 3 cm) during the reactor operation period. The axial length of the cylindrical member is selected so as to accord with the design nuclearly calculated by dividing the axial fuel effective length of the core into a plurality of sections, and a plurality of the gadoliniums or gadolinias contained in the zirconium alloy and the zirconium thermet having different concentration and amount are prepared and they are charged into the double tube structure so as to realize the axial space distribution of the gadolinia concentration or amount thereof.

In a fourth aspect for solving the above second problem, the burnable poison rod constituting the fuel assembly is constructed so as to have a double tube structure having outer and inner tubes, a not-boiling coolant passes inside the inner tube, a burnable poison is charged in an annular section between the outer and inner tubes, and a burnable poison containing amount with respect to the unit area of the annular section is distributed in one of both of peripheral and axial directions of the double tube structure of the burnable poison rod.

In a fifth aspect-for solving the second problem, the burnable poison rod constituting the fuel assembly is constructed so as to have a double tube structure having outer and inner tubes, a non-boiling coolant passes inside the inner tube, a burnable poison is charged in an annular section between the outer and inner tube, and at least two kinds of burnable poisons are charged in the annular section, the burnable poisons being different in neutron absorbing cross sections. Furthermore, it is desired that the annular section is constructed so as to have two layer structure or three layer structure, or two or three layer structure in which a burnable poison, which is different from a burnable poison contained in the annular section, is contained in one or both of the inner and outer tubes. In the three layer structure, the outer layers contain a burnable poison having a large neutron absorbing cross section and the intermediate layer contains a burnable poison having a small neutron absorbing cross section. In the two layer structure, it is desired that a layer near the inside of the burnable poison rod contains a burnable poison having a large cross section and a layer near the outside of the burnable poison rod contains a burnable poison having a small cross section.

It is effective for the combination of the burnable poisons that the burnable poison having a large cross section is gadolinium containing Gd-157 at a ratio higher than that contained in a natural gadolinium, and the burnable poison having a small cross section is gadolinium containing Gd-155 at a ratio higher than that contained in a natural gadolinium.

Furthermore, in the above fourth and fifth aspects, at least one of the fuel rods contains a fuel pellet in which a burnable poison having a low concentration having a poison reactivity acting term shorter than that of a burnable poison contained in the moderator rod or a burnable poison is coated on a surface of the fuel pellet.

According to the present invention of the aspects described hereinabove, the invention can attain or achieve the following function.

According to the first aspect, the excess reactivity and the excessive local power peaking at the cycle initial time can be suppressed for a period of about 0.5 cycle of the cycle length from the initial period of the fuel life by the burnable poison rod and the gadolinia added fuel rods having low concentration less than 3 wt % disposed to the most outer peripheral portion or next outer peripheral portion of the fuel assembly, and furthermore, the excess reactivity and the axial local power peaking during the cycle can be suppressed by the effect of the burnable poison rod during the 1.0 to 1.5 cycle term from the fuel life initial time.

In this aspect, the gadolinium added zirconium alloy or zirconium thermet containing the gadolinia to be inserted into the annular section of the double tube cylindrical structure of the burnable poison rod is formed to provide a cylindrical shape by bending a plate member, which is inserted and piled in the annular section.

In this case, it is desired that diameters of the holes are distributed with diameters equal to or smaller than a thermal neutron diffusion length of water (2 or 3 cm) during the reactor operation period. The axial length of the cylindrical member is selected so as to accord with the design nuclearly calculated by dividing the axial fuel effective length of the core into a plurality of sections.

A plurality of the gadoliniums or gadolinias contained in the zirconium alloy and the zirconium thermet having different concentration and amount are prepared and they are charged into the double tube structure so as to realize the axial space distribution of the gadolinia concentration or amount thereof. It is also desired that the concentration of the burnable poison to be added to the burnable poison rod is the concentration for achieving the reactivity suppressing effect during about 1.0 to 1.5 cycle with the cycle length at which the fuel assembly is charged being a unit cycle.

According to the second aspect, it is desired that when the gadolinium is added to the fuel pellets of the fuel rods arranged to first and second layers from the most outer peripheral portion of the fuel assembly, it is suppressed less than 3% and gadolinia having concentration more than 3% is not added to the fuel pellets. Accordingly, the poison effect of the gadolinium less remains at the end of the cycle. Furthermore, the burnable poison rod arranged to the central portion of the fuel assembly has an increased tendency to cause the local power peaking of the horizontal cross section of the fuel assembly at the life initial time, so that, in the view point of suppressing this tendency, the addition of the gadolinia to the fuel rods arranged at the first or second layer from the most outer peripheral portion of the fuel assembly can attain the effect for reducing the maximum linear power density at the cycle initial time.

According to the third aspect, since the axial power distribution can be controlled throughout the entire operating cycle by the axial poison density distribution of the burnable poison rod, the design considering the axial concentration distribution of the burnable poison to be added to the fuel rods can be easily realized.

According to the fourth aspect, the poison reactivity reduction rate can be approximate almost straight reduction rate by the combination of a plurality of poison reactivities of the moderator rods containing a plurality of burnable poisons, and further in combination of the fuel rods containing normal burnable poison, more linear poison reactivity can be realized.

The characteristic feature of the burning change of the poison reactivity of the moderator rod containing the burnable poison has an upward curved shape as shown in FIG. 27, and simply showing in FIG. 30(A), the shape can approach the stepped variation (three solid lines).

Namely, in the case where the burnable poison is charged in the moderator rod, the burning end time of the burnable poison can be easily adjusted by the concentration thereof, but the initial reactivity cannot be sufficiently adjusted by the concentration because of the self-shielding effect of the burnable poison. In such case, one method of making the poison reactivity of the moderator rod containing the burnable poison to be linear change with respect to the exposure such as shown in FIG. 30(B) in which the reactivities in stepped state is made average as a staged change shown in FIG. 30(A).

The advantageous effects achieved by this method is shown by FIG. 31. In FIG. 31(A), the solid lines a, b and c represent the poison reactivities in which the line b being base, the line a is a case of 0.5 time of the line b and the line c is a case of 1.5 time of the line b. FIG. 31(B) shows a case in which these reactivities are averaged with the solid line b being a comparison reference, solid line e being an average of the lines a and c, and solid line f being an average of the lines a, b and c.

As can be seen from this result, the reactivity can be adjusted to show slightly staged shape when two reactivities are averaged by averaging the stepped reactivities and the reactivity can be adjusted to show approximately linear shape when three reactivities are averaged, and in both the cases, the reactivity change approaches to the straight line by the averaging effect.

The above effect is described with reference to the case in which the concentration of the burnable poison is changed, and in the case of packing the burnable poison in the annular section, substantially the same effect can be obtained by controlling the thermal neutron absorbing material amount of the burnable poison.

For example, FIG. 32 shows a case in which the diameter and the thickness of the outer tube are the same as those of FIG. 31 and the thickness of the annular section is made twice (curve g) and a case in which the thickness is not changed and the concentration is made twice (curve h), and in comparison with the curves g and h, it will be found that the reactivity changes are almost equal to each other in the case where the total amount of the poison per unit area is equal to each other.

Furthermore, the natural gadolinium is a substance of mixture of several kinds of isotopes, by 10 to 20%, respectively, different in their mass numbers, but only Gd-155 and Gd-157 in the isotopes are strong neutron absorbing substances with respect to the thermal neutrons, so that substantially the same effect will be obtained by enriching only these nuclides to adjust the enrichment thereof in place of the concentration.

Still furthermore, substantially the same effect will be also obtained by distributing the burnable poison in the axial direction as well as the peripheral (longitudinal) direction. Moreover, the burnable poison may be distributed in both the axial and peripheral directions of the moderator rod. In such case, the effect can be attained without affecting the power distribution of the neighboring fuel rods by distributing the burnable poison with widths each being, for example, a thermal neutron diffusion length (2-3 cm during the reactor operation).

Further, it is not absolutely necessary for the double tube structure to provide a circular cross section and the inner and outer tubes may be constructed to provide a square or polygonal shape such as hexagonal shape.

According to the fifth aspect, FIG. 33(A) shows the poison reactivity of the moderator rod containing a single burnable poison in the annular section thereof. However, in the case where two or more than two kinds of burnable poisons having different neutron cross sections are used, the poison reactivity becomes that shown in FIG. 33(B) by remarkably shielding the neutron absorbing effect of the burnable poison having a small cross section during the high reactivity effect of the burnable poison having a large cross section.

Furthermore, the straight line a in FIG. 33(C) shows the poison reactivity of the fuel rod charged with the fuel pellet to which the burnable poison having a low concentration is added or which has a surface coated with the burnable poison for making short the life of the poison reactivity with respect to the moderator rod containing the burnable poison.

The burning change of the poison reactivity in combination of these two effects is represented by FIG. 33(D) and approaches to the linear poison reactivity shown by broken line in FIG. 33(D). Further, the straight line b in FIG. 33(C) is a poison reactivity in the case of addition of the burnable poison having a normal concentration to the fuel rod. The aim of the present invention is to approach the burning change of the poison reactivity to this straight line b.

Furthermore, according to the sandwiched arrangement in which a burnable poison having a small cross section is centrally interposed between burnable poisons having large cross sections, the aforementioned shielding effect can be further enhanced. Namely, the burnable poison has a large neutron absorption cross section with respect to the thermal neutrons, but the thermal neutrons are moderated by the coolant passing inside and outside the moderator rod and flow out from the surface of the moderator rod. Accordingly, in the three layer structure described above, the thermal neutrons are absorbed by the burnable poison having the large cross section and contained in the outer layer near the surface of the moderator rod and the thermal neutrons hardly reach the burnable poison having the small cross section and contained in the intermediate layer. As this result, the poison effect of the inside burnable poison can be effectively maintained up to the time when the outside burnable poison has been quenched.

Still furthermore, the coolant passing inside the moderator rod containing the burnable poison is not boiled and the coolant passing outside the moderator rod is boiled, so that the thermal neutron flux is high in the inside of the moderator rod containing the burnable poison. Accordingly, the poison effect can be maintained in the view point of the exposure by constructing the moderator rod to have a double layer structure in which the burnable poison having a small cross section is arranged in the outside layer having small thermal neutron flux.

Further, the fuel rod charged with the fuel pellet added with the burnable poison having a low concentration or coated on its surface with the burnable poison is effective for making linear the poison reactivity in the foregoing fourth aspect. Namely, the poison reactivity of the moderator rod containing the burnable poison adapting the fourth aspect is shown by a curve f in FIG. 31(B), but it is not made sufficiently linear at the initial time of the burning. However, in the fifth aspect, since the poison reactivity is made linear only at the time near the burning end of the burnable poison, so that the fuel rod containing the burnable poison has significant means in the fifth aspect in comparison with the fourth aspect.

BRIEF DESCRIPTION OF THE DRAWINGS

In the accompanying drawings:

FIG. 1(A) is a vertical view, partially in section, of a first embodiment of a fuel assembly according to the present invention;

FIG. 4(A)-a is a cross sectional view of the burnable poison rod in FIG. 3 and FIG. 4(A)-b is a perspective view of the burnable poison rod, partially cut away, of FIG. 4(A)-a;

FIG. 4(B)-a is a cross sectional view of another example of the burnable poison rod in FIG. 3 and FIG. 4(B)-b is a perspective view of the cylindrical burnable poison member, partially cut away, of FIG. 4(B)-a;

FIG. 4(C)-a is a cross sectional view of a further example of the burnable poison rod in FIG. 3 and FIG. 4(C)-b is a perspective view of the cylindrical burnable poison member, partially cut away, of FIG. 4(C)-a;

FIG. 4(D)-a is a cross sectional view of a still further example of the burnable poison rod in FIG. 3 and FIG. 4(D)-b is a perspective view of the cylindrical burnable poison member, partially cut away, of FIG. 4(D)-a;

FIG. 4(E)-a is a cross sectional view of a still further example of the burnable poison rod in FIG. 3 and FIG. 4(E)-b is a perspective view of the cylindrical burnable poison member, split into vertical two portions and partially cut away, of FIG. 4(E)-a;

FIG. 5(A) is a schematic view showing lengths of a standard length fuel rod and a length-reduced (short) fuel rod of the fuel assembly of the first embodiment, FIG. 5(B) is a view showing the axial enrichment distribution in FIG. 5(A), FIG. 5(C) is a view showing the axial distribution of the burnable poison amount of the burnable poison added fuel rod, and FIG. 5(D) is a view showing the axial-distribution of the poison amount of the burnable poison rod;

FIG. 6(A) is a cross sectional view of the fuel assembly of the conventional first example for showing the enrichment distribution in the horizontal cross section and FIG. 6(B) is a view showing arrangement of the burnable poison rod in the fuel assembly of the first embodiment;

FIG. 7(A) is a cross sectional view of the fuel assembly of the conventional second example for showing the enrichment distribution in the horizontal cross section and FIG. 7(B) is a view showing arrangement of the burnable poison rod in the fuel assembly of a modified embodiment of the first embodiment;

FIG. 8(A) is a cross sectional view of the fuel assembly of the conventional third example for showing the enrichment distribution in the horizontal cross section and FIG. 8(B) is a view showing arrangement of the burnable poison rod in the fuel assembly of a second embodiment of the present invention;

FIG. 11(A) is a cross sectional view of the fuel assembly of the conventional fourth example for showing the enrichment distribution in the horizontal cross section and FIG. 11(B) is a view showing arrangement of the burnable poison rod in the fuel assembly of the third embodiment of the present invention;

FIG. 13(A) is a cross sectional view of the fuel assembly of the conventional fifth example for showing the enrichment distribution in the horizontal cross section and FIG. 13(B) is a view showing arrangement of the burnable poison rod in the fuel assembly of the fourth embodiment of the present invention;

FIG. 14(B) is a cross sectional view of the fuel assembly of the conventional sixth example for showing the enrichment distribution in the horizontal cross section and FIG. 14(C) is a view showing the arrangement of the burnable poison rod in the fuel assembly of the fifth embodiment of the present invention;

FIG. 3(D) is a view showing a poison reactivity of an entire fuel assembly in the case of the poison reactivity in FIGS. 33(B) and 33(C) being summed;

DESCRIPTION OF THE PREFERRED EMBODIMENTS

First Embodiment

Figure 1B:
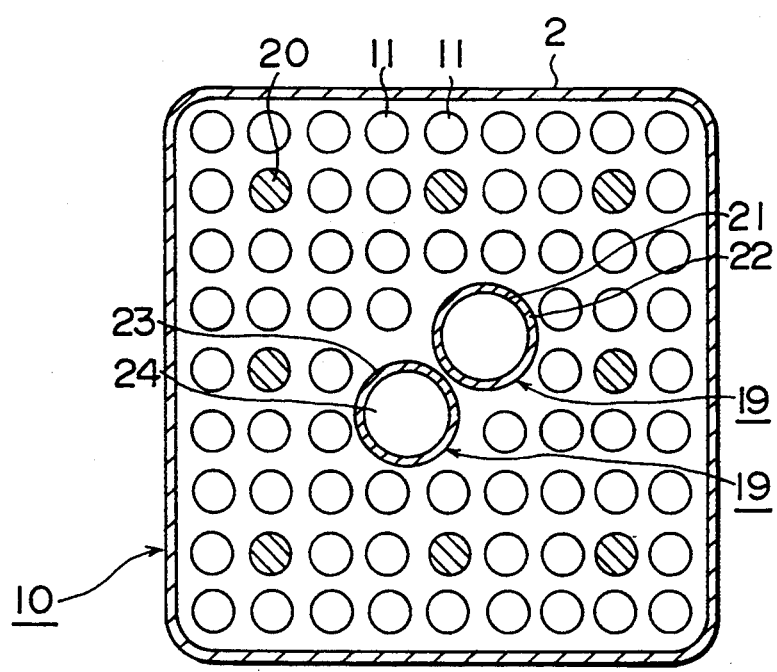
FIG. 1(B) is a sectional view taken along the line IB—IB in FIG. 1(A)

A first embodiment of a fuel assembly according to the present invention will be described hereunder with reference to FIGS. 1 to 8, in which FIG. 1(A) is an elevational view of a fuel assembly 10 and FIG. 1(B) is a cross sectional view taken along the line IB—IB in FIG. 1(A).

Referring to FIG. 1(A), the fuel assembly 10 of this embodiment has a 9×9 lattice structure (nine rows and nine columns) and composed of standard length fuel rods (called merely fuel rod hereinbelow) 11, an upper tie plate 12, a lower tie plate 13, fuel spacers 16a, 16b, a channel box 2, a burnable poison rod 19 and a fuel rod 20 having a reduced axial length (called short or length-reduced fuel rod hereinlater).

The upper and lower ends of the fuel rod 11 are supported by the upper and lower tie plates 12 and 13, and the burnable poison rod 19 is also supported at its upper and lower ends by the upper and lower tie plates 12 and 13. A plurality of the fuel spacers 16a and 16b are disposed along the axial direction of the fuel assembly 10 to suitably maintain the mutual distances between the fuel rods 11 and the burnable poison rod 19.

The axial positions of the fuel spacers 16a, 16b are supported by a tub, not shown, of the burnable poison rod 19. Eight partially-length-reduced fuel rods 20 each having an axial length shorter than that of the fuel rod 11 are arranged and these short fuel rods 20 are supported in a state that the upper ends of these short fuel rods 20 slightly project above the spacers 16a.

The channel box 2 is secured to the upper tie plate 12 by means of screws, for example, so as to surround the outer periphery of a bundle of the fuel rods 11, the length-reduced fuel rods 20 and the burnable poison rod 19, thus constituting the fuel assembly 10.

Figure 17:
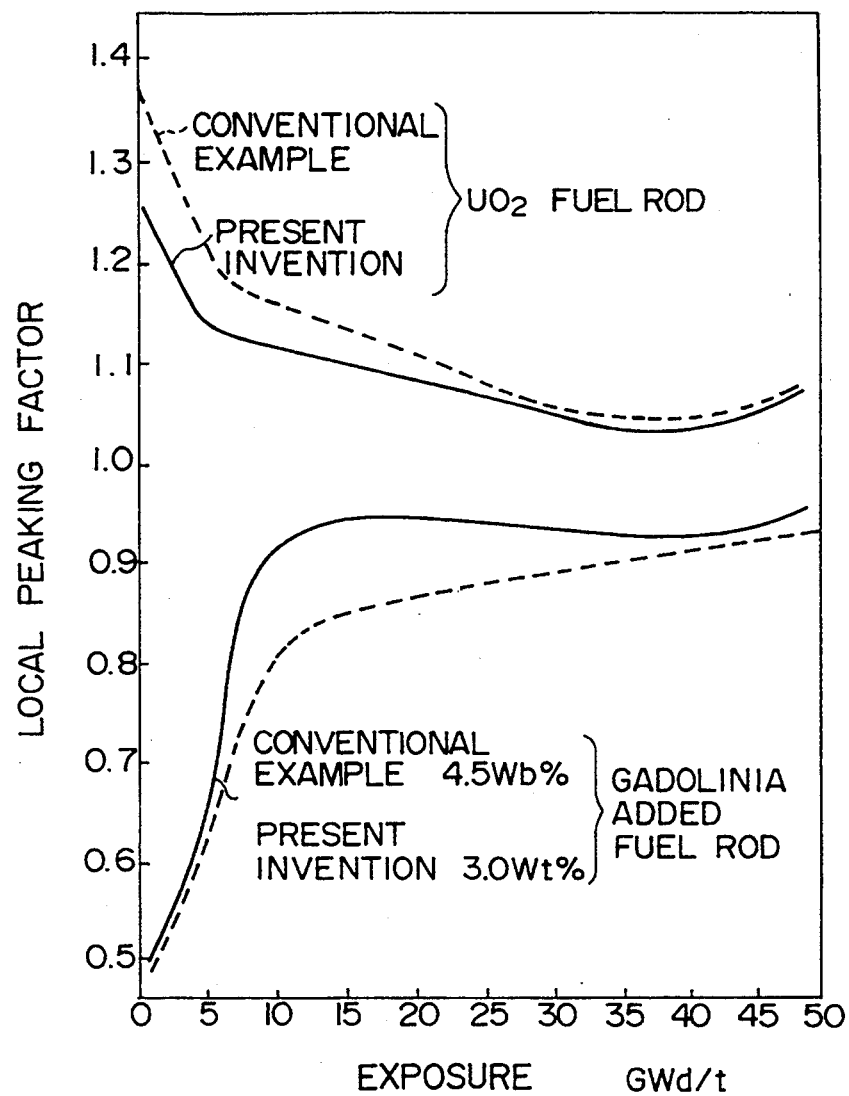
FIG. 17 is a graph showing the characteristic feature in comparison with fuel assemblies utilized for the BWR according to the present invention and the conventional example in which the axis of abscissa shows an exposure and the axis of ordinate shows a local power peaking.

The lower tie plate 13 is mounted on a fuel supporting fitting, not shown, fitted to a control rod guide tube secured to a core support plate and has, at its upper end portion, a fuel rod support portion 14 and has a space 15, as shown in FIG. 17, below the fuel rod support portion 14, which supports the lower ends of the fuel rods 11, the short fuel rods 20 and the burnable poison rod 19.

Figure 2A:
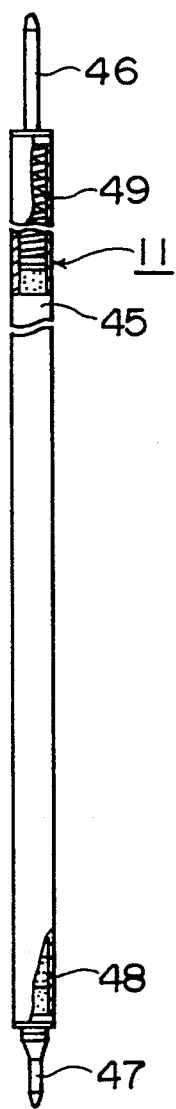
FIG. 2(A) is a front view of a standard length fuel rod, partially cut away, of FIG. 1(A)
Figure 2B:
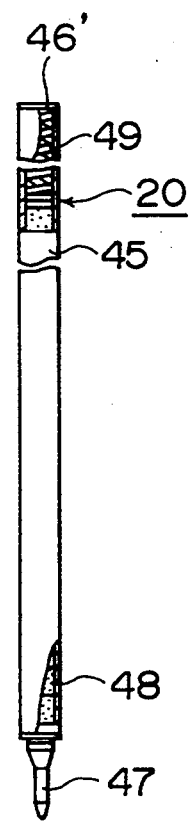
FIG. 2(B) is a front view of a length-reduced fuel rod, partially cut away, of FIG. 1(A)

FIGS. 2(A) and 2(B) show the fuel rod 11 and the short fuel rod 20 of FIG. 1, respectively. These fuel rods 11 and 20 are formed of claddings 45 which are sealed at their upper ends by upper plugs 46 and 46' and at their lower ends by lower plugs 47 and 47, respectively, and which are packed with a plurality of fuel pellets 48, and gas plenums 49 are formed at upper end portions of the claddings 45. Both the fuel rods 11 and 20 are different from each other in their axial lengths and the upper plugs.

The burnable poison rod 19 is arranged to substantially the central portion of the bundle of the fuel rods 11 and has a diameter larger than outer diameters of the fuel rods 11 and 20.

Figure 3:
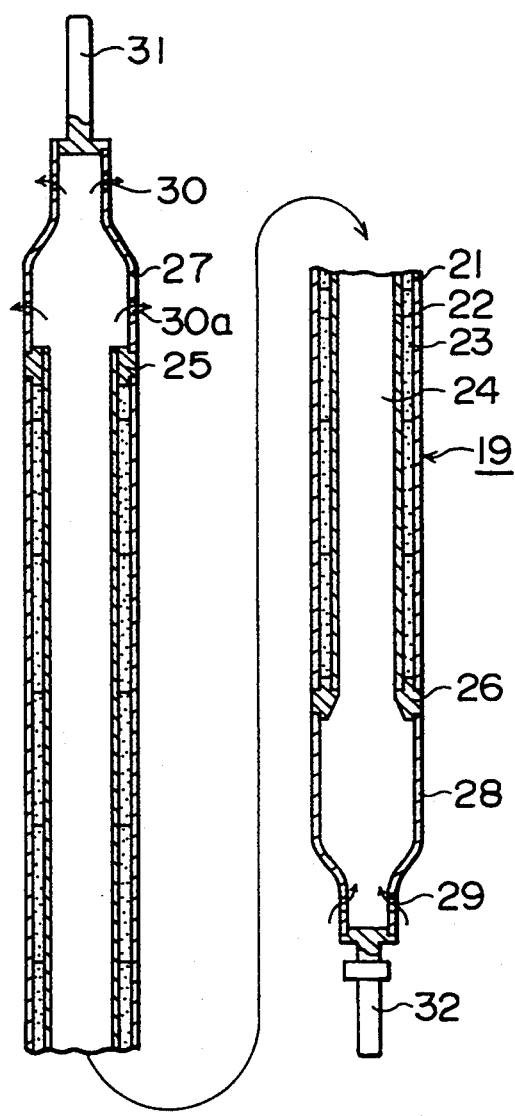
FIG. 3 is an elevational section of a burnable poison rod of FIG. 1.

The burnable poison rod 19 of FIG. 1 is explained hereunder with reference to FIG. 3 and FIG. 4(A). In FIG. 3, the burnable poison rod 19 is shown as axial two portions, but it is actually one continuous rod like member having substantially the same length as that of the fuel rod 11.

The burnable poison rod 19 is composed of an outer tube 21, an inner tube 22 disposed inside the outer tube 21, a burnable poison member 23 packed in an annular space formed between the outer and inner tubes 21 and 22, upper and lower annular end plugs 25 and 26 sealing upper and lower ends of the annular space, upper and lower end tubes 27 and 28 connected to the upper and lower end plugs 25 and 26, and upper and lower end plugs 31 and 32 plugging the upper and lower end tubes 27 and 28.

Namely, the burnable poison 19 is composed of the slender outer tube 21, an inner tube 22 disposed coaxially inside the outer tube 21, the upper and lower annular end plugs 25 and 26 attached to the upper and lower ends of these tubes 21 and 22, the annular space defined between these outer and inner tubes 21 and 22, and the burnable poison member 23 packed in this annular space.

Gadolinia or gadolinium is utilized as the burnable poison, and the burnable poison member 23 is formed of a zirconium alloy or zirconium thermet containing the gadolinia or gadolinium, so as to have a thickness of about 1 to 2 mm, by bending a flat plate to form a cylindrical tube.

The lower annular end plug 26 is disposed to be continuous to the lower end tube 28 of a single tube structure having the lower end plug 32, and the upper annular end plug 25 is disposed to be continuous to the upper end tube 27 of a single tube structure having the upper end plug 31. The lower end tube 28 is formed to provide a smooth surface for reducing a resistance against the flow of the coolant. The lower end tube 28 is provided with a coolant inlet port 29 and the upper end tube 27 is provided with two coolant leakage ports 30 and 30a.

The coolant having a neutron moderating function is introduced into a coolant flow passage between the fuel rods in the fuel bundle in the core through the coolant inlet port 29 of the lower end tube 27, then flows circularly in the inner tube 22, and is discharged into the coolant flow passage between the fuel rods in the fuel bundle through the leakage ports 30 and 30a of the upper end tube 27.

At least one of the burnable poison rods 19 shown in FIG. 1(B) is provided with a tub for maintaining the axial positions of the spacers 16a and 16b horizontally supporting the distances between the fuel rods 11 and the other burnable poison rods 19. As this tub, two metallic pieces, each in rectangular shape, are welded to an outer surface of the burnable poison rod 19 with a space corresponding to a height of the fuel spacer 16a or 16b.

The metal or thermet of the burnable poison member 23 containing the burnable poison of the burnable poison rod 19 is packed in an area of the fuel pellet packed portion, i.e. fuel effective length, of the fuel rod 11 except areas, of upper and lower end portions of the fuel pellet packed portion, having 1/24 to 1/12 length of the fuel effective length.

Further, the burnable poison packed area has the burnable poison concentration distribution or density distribution in the axial direction of the burnable poison rod, and the burnable poison concentration or its density is made smaller in an upper area than in a lower area with a position having a ⅓ to ⅔ length of the fuel effective length from the lower end thereof being boundary between the upper and lower areas.

Furthermore, a first sectioning portion is formed to the aforementioned ⅓ to ⅔ length portion of the fuel effective length and a second sectioning portion is also formed to ⅔ to 5/6 length portion thereof in the manner that the burnable poison concentration or density is made highest in an area lower than the first sectioning portion, is made lowest in an area upper than the second sectioning portion, and is made intermediate in an area between the first and second sectioning portions.

These sectioned portions will be made equal to the sectioned portion of the axial enrichment distribution of the fuel rod 11 or the axial distribution of the burnable poison amount of the burnable poison added fuel rod.

FIGS. 4(A) to 4(C) show three examples of cylindrical burnable poison members containing the burnable poison.

FIG. 4(A) represents a burnable poison member 23 formed by forming cylindrically the zirconium alloy containing the gadolinium or the zirconium thermet containing the gadolinia, FIG. 4(B) represents a burnable poison member 32a formed from the member 32 with elongated holes 36, and FIG. 4(C) represents a burnable poison member 32b formed from the member 32 with a number of holes 36a.

Namely, the amount of the burnable poison material can be adjusted by forming the number of elongated holes or circular holes to the burnable poison member 32, and the respective burnable poison members different in distributions and shapes of the holes are packed in the annular space in the burnable poison rod, thereby making axial distribution of the burnable poison material, which is adjusted by the side of the holes and the distribution thereof in conformity with the thickness of the member and the added concentration of the gadolinium or gadolinia.

In this case, it is desired that the circular holes are distributed each with a diameter being substantially equal to or slightly smaller than a thermal neutron diffusion length (about 2 to 3 cm) at the reactor running period. In the case of the elongated holes, it is desired that the elongated holes are distributed each with a diameter of a smaller width side being substantially equal to or slightly smaller than a thermal neutron diffusion length (about 2 to 3 cm) at the reactor operating period.

For example, when a thermet containing gadolinia added to zirconium by about 15% volume density is used as a burnable poison member having an outer diameter of about 24 mm and a thickness of about 2 mm, the thermet contains the gadolinia of the amount corresponding to the gadolinia of about 4.5 wt % of four fuel rods each having a diameter of about 11 mm. It is desirable, for the power distribution of the fuel assembly in the direction of the diameter and for the core shutdown margin, to set the density at this time to that corresponding to about 1.0 to 1.5 cycle length in the cycle length from the initial life time of the fuel assembly.

In the conventional gadolinia containing fuel rod, when a fuel pellet having 4.5 wt % lower portion and 3.0 wt % upper portion is used, in order to make equivalent the upper portion to four fuel rods containing the burnable poison, it will be necessary to punch holes of about 33.3 volume % to the burnable poison member.

As shown in FIG. 1(B) and FIG. 6, the burnable poison rod 19 is arranged at the central portion of the fuel bundle and at least the cell numbers occupied by the burnable poison rods 19 in the fuel rods facing the burnable poison rods 19 are formed as fuel rods containing no burnable poison, and the fuel rods arranged most outside or second layer side from the most outside of the fuel bundle contain a plurality of burnable poisons which are burned up during 0.5 to 0.8 term of the fuel charging first cycle length, that is, for example, burnable poison having a concentration of less than 3 wt %.

The operation or function of the first embodiment will be described hereunder.

The fuel assemblies of this embodiment are charged in the core and the reactor is then operated. The most part of the coolant is guided into the coolant passage formed between the fuel rods 11 and the length-reduced (short) fuel rods 20 through the penetrating port provided to the fuel rod support portion 14 of the lower tie plate 13. The remaining coolant flowing into the space 15 of the lower tie plate 13 is flown into, as shown in FIG. 3, the coolant passage 24 through the coolant inlet port 29 of the burnable poison rod 19 and then discharged into the coolant passage at a portion lower than the upper tie plate 12 through the leakage ports 30 and 30a.

As this result, the metallic cylindrical burnable poison member 23 containing the burnable poison (gadolinium or gadolinia in this embodiment) packed in the annular space of the burnable poison rod 19 absorbs the neutrons till the time of about 1.0 to 1.5 cycle in the cycle length from the life initial time of the fuel assembly and then suppresses the excess reactivity of the fuel.

Figure 15A:
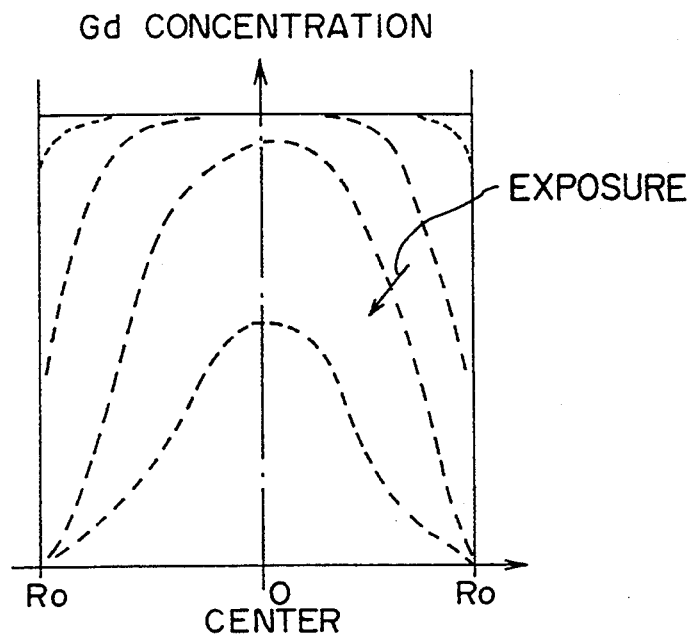
FIG. 15(A) is a modeled view showing a gadolinium burning condition in the diameter direction in a gadolinia added fuel pellet and FIG. 15(B) shows a curve showing a thermal neutron flux distribution in the diameter direction in the fuel pellet.
Figure 15B:
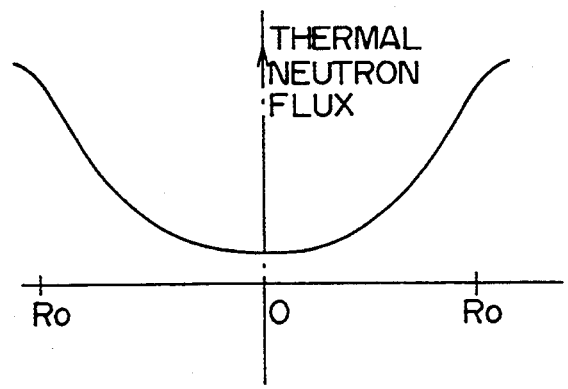

In the case of the gadolinia added to the fuel pellet, since the thermal neutron absorbing effect of the uranium and gadolinium is strong, almost thermal neutrons are absorbed outside the fuel pellet, as shown in FIG. 15(B), to thereby remarkably lower the thermal neutron flux in the fuel pellet, this being called a shielding effect. As this result, as shown in FIG. 15(A), the gadolinium added to the fuel pellet is transformed faster from the outside thereof and hence loses in its neutron absorbing ability.

Thus, the surface area of the gadolinium effectively exposed to the thermal neutrons is gradually made small as the burning progresses. The reactivity suppressing effect is approximately proportional to the effective surface area of the gadolinium exposed to the thermal neutrons, so that, in the conventional technology, the reactivity suppressing effect is rapidly lowered as the burning progresses.

On the other hand, in the case of the burnable poison rod of this embodiment, fast and intermediate neutrons each has a distribution in a diameter direction not larger than that in the case of the thermal neutron at the inside and peripheral portions of the burnable poison rod, and since a large amount of the moderator is prepared in the coolant passage 24 of the burnable poison rod 19, the thermal neutrons can be sufficiently supplied form the inside surface of the cylindrical burnable poison member 23.

Further, as can be understood from FIGS. 6(A) and 6(B) showing the fuel enrichment distribution of the fuel assembly and the arrangement of the gadolinia added fuel rods of the fuel assembly, according to this embodiment, since less or substantially no fuel rod added with the burnable poison is arranged to the periphery of the burnable poison rod 19, the thermal neutrons can be sufficiently moderated and supplied by the water in the coolant passage between the fuel rods from the outside of the thin cylindrical plate-like burnable poison member.

According to this embodiment, the gadolinia concentration of about 15 volume % is shown, and according to this fact, the burnable poison of the amount corresponding to the fuel rod with the burnable poison of 4.5 wt % being added can be possessed, and the surface area corresponding to about four fuel rods is realized. As this result, substantially the equivalent neutron absorbing ability can be obtained.

As described above, the concentration of the burnable poison can be set to relatively high concentration and the thermal neutrons can be absorbed from the inside and outside of the cylindrical plate member. Thus, the transformation of the gadolinium progresses, but the surface area contributing the effective thermal neutron absorption is not changed. Accordingly, if the burning progresses, the reactivity suppressing effect cannot be rapidly lost.

Particularly, in order to adjust the reactivity so as to lose the thermal neutron absorbing effect of the gadolinium at an aimed period while suppressing the reactivity for a long period, the concentration of the gadolinium or gadolinia to be added to the cylindrical zirconium is set at a time of burning up the gadolinium and the holes 36 or 36a are formed as shown in FIGS. 4(B) and 4(C) to the cylindrical burnable poison member to thereby adjust the reactivity suppressing effect, whereby the adjustment of the reactivity suppressing term and the suppressing degree can be easily realized.

Hereunder, the arrangement of the burnable poison fuel in the first embodiment of the fuel assembly of the present invention is explained in comparison with that of a conventional example with reference to FIG. 6(A), relating to the conventional example, and FIG. 6(B), relating to the present embodiment. These figures represent the enrichment, in cross section, at the central portion at which the axial enrichment is made most high and the burnable poison distribution at that portion, as shown in FIG. 5.

In the conventional example, in the case of the fuel of the cross-section average enrichment of about 4.2 wt % of the fuel assembly under the design condition of the maximum pellet enrichment of less than 5.0 wt %, from the view points of the excess reactivity suppression of the cycle and the core shutdown margin, about 14 numbers of the fuel rods added with the burnable poison having the gadolinia concentration of about 4.5 wt % (see FIG. 6(A)).

On the other hand, according to the first embodiment of the present invention, six numbers of the central fuel rod added with the burnable poison can be replaced with the fuel rods having maximum enrichment, whereby since the average enrichment in the horizontal cross-section of the fuel assembly increases by about 0.1 wt %, when they are adjusted to the discharge exposure similar to that in the conventional technique, the enrichment of each of the fuel rods can be reduced by about 0.1 wt % in comparison with the conventional technique or arrangement.

By the way, the reactivity suppressing function due to the burnable poison rods according to the present invention is based on the neutron absorbing effect at the central position of the fuel assembly, so that an power peaking is liably caused to the fuel rods at the outer peripheral portion of the fuel assembly. Particularly, the power peaking of the most outside fuel rods disposed at four corner portions of the fuel assembly and the fuel rods adjacent to these four fuel rods is large in the BWR.

For this reason, the fuel rods added with the gadolinia of the amount less then about 3 wt %, for example, for losing the neutron absorbing ability at the period less than 0.5 to 0.8 cycle of the fuel life initial time, are disposed at the second layer from the most outer side layer in the fuel assembly so as to simultaneously suppress the excess reactivity at the cycle term of less than 0.5 to 0.8 cycle of the fuel life initial time and to suppress the local power peaking of the fuel rods arranged to the peripheral side of the fuel assembly.

Figure 16:
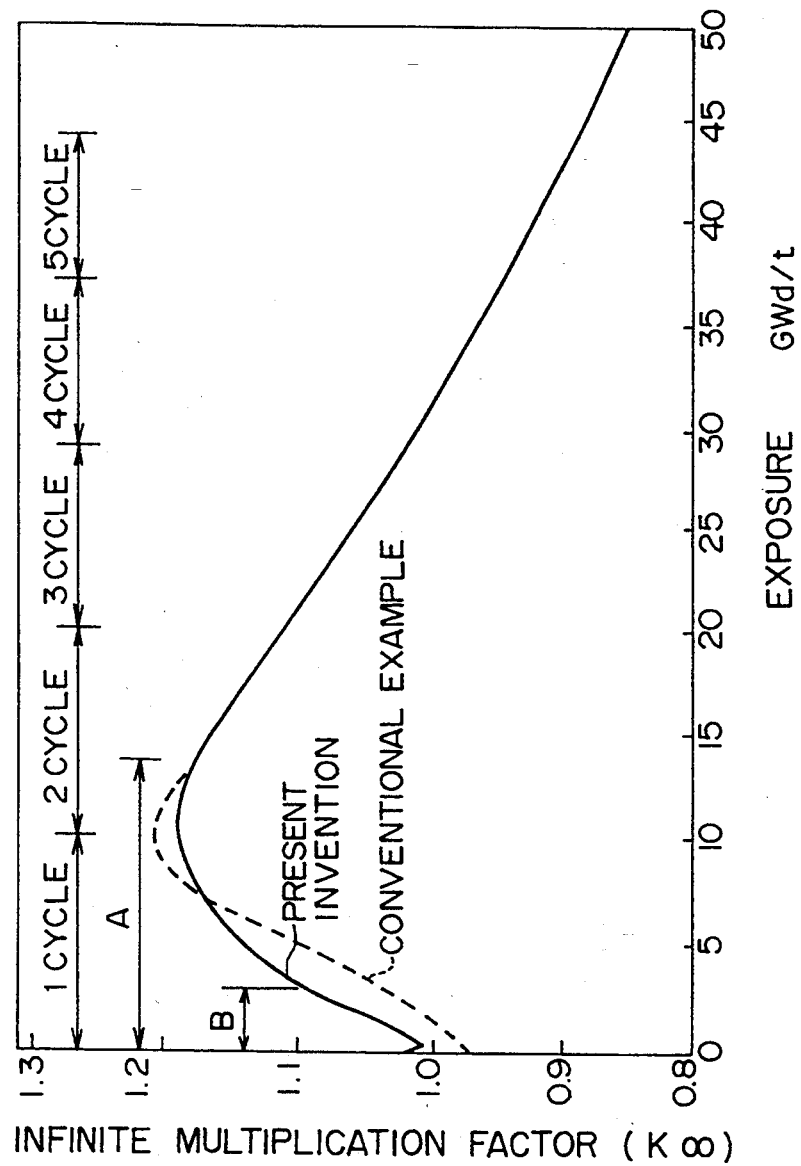
FIG. 16 is a graph showing the characteristic feature in comparison with fuel assemblies of the present invention and the conventional example in which the axis of abscissa shows a burn-up degree and the axis of ordinate shows an infinite multiplication factor of neutrons.

As this result, the fuel, according to the present invention, charged as new fuel in the core has an infinite multiplication factor higher than that of a conventional fuel in the term "B" shown in FIG. 16 with solid line and the infinite multiplication factor is rapidly increased by the burning of the fuel rods added with the burnable poison, but after the burn-up of these fuel rods, the effect due to the burnable poison rod of the present invention remains to the term "A" and the infinite multiplication factor gently increases and the peak value is also gentle and has a low value in comparison with the conventional technique.

On the other hand, in the conventional arrangement of FIG. 6(A), a large number of fuel rods added with the burnable poison is arranged and the concentrations thereof are set to about 4.5 wt % being substantially the same with each other so as to burn up the burnable poison at the time of about 1.0 cycle of the fuel life, thus the infinite multiplication factor increasing linearly.

As this result, in the conventional example, there is such tendency as that the peak of the infinite multiplication factor at the burn-up time of the burnable poison becomes high and the power distribution in the diameter direction becomes large. As a countermeasure to this phenomenon, it is considered to further increase the gadolinia concentration to be added to the fuel rod.

However, when the excess reactivity at the cycle initial time is made short as the neutron infinite multiplication factor at the life initial time approaching near 0.9, there causes a problem, and the temperature of the pellet rises as the gadolinia is much added to the fuel rod with high concentration and, hence, the amount of the fissionable gas discharged from the pellet increases and the inner pressure inside the fuel rod also increases, so that it becomes necessary to reduce the uranium enrichment of the fuel rod.

Further, as shown in FIG. 17, the fuel rods added with the burnable poison provide an extremely low power at the burning initial stage due to the strong thermal neutron absorbing effect of the gadolinium, and accordingly, the local power peaking of the other fuel rods added with no burnable poison becomes high in proportion to the above fact. Particularly, the local peaking of the fuel rods arranged near the four corner portions at the most peripheral side of the fuel assembly becomes high.

Accordingly, in the conventional example, to further increase the gadolinia adding amount leads to further increase the local power peaking at the life initial time and, as a countermeasure therefor, the fuel assembly will have to be designed so that its horizontal cross-section has an increased enrichment distribution, thus making complicated.

FIG. 17 represents change of burning of the local power peaking of the fuel assembly during the running operation of the present invention and the conventional example. In the example of the present invention, the number of the fuel rods added with the gadolinia is less by 6 numbers than that of the conventional example, and this means that the numbers of the fuel rods having high power peaking is more by 6 numbers than that of the conventional example, so that the local power peaking at the burning initial time is alleviated at least by 10% in comparison with the conventional example.

Furthermore, the gadolinia can be added with thinner concentration according to the present invention in comparison with the conventional example and the power is rapidly increased faster than that in the conventional example as burning progresses, thus contributing, according to the present invention, to the reduction of the local power peaking coefficient at the time of the progressing of the burn-up at the life initial time.

The axial power distribution is stabilized to be flat during the cycle operation with the power distribution with less axial leakage of the neutrons in conformity with the power distribution characteristics in the BWR having the axial void distribution in the case of the fuel assembly having the short fuel rod by designing the axial enrichment distribution and the burnable poison amount distribution shown in FIG. 5 and designing the axial burnable poison amount distribution of the burnable poison rod, and furthermore, at the cycle end operation, the axial power distribution in the core can be realized with the central peak and slightly downward side peak, thus realizing an improved scrum curve characteristics.

In the upper area of the fuel effective length portion and an area just near the section in which natural uranium or depleted uranium is charged, the concentration and amount of the burnable poison in this area is reduced in the conventional technology for reducing the reactivity loss due to a portion of the burnable poison not burned up, and according to the present invention, this effect can be also easily achieved. As shown in FIG. 5, the gadolinia to be added to the fuel rod is essentially thin, so that it is considered to make small the concentration of the burnable poison contained in the burnable poison rod or a manner reverse to this will be also considered.

In a case where the axial burnable poison distribution in the burnable poison rod is realized by changing the distribution density as shown in FIG. 4(B) or 4(C) in which it is provided with holes 36 or 36a, the special deviation of the neutron absorbing effect can be prevented by uniformly punching the holes in the axial and peripheral direction of the cylindrical member inclusive of the contacting portion thereof.

The power distribution in the diameter direction in the core can be made flat by preparing two kinds of burnable poison rods having different poison amounts and arranging some burnable poison rods containing much burnable poison amount to new fuel assemblies to be charged to the central area of the core and arranging other burnable poison rods containing less burnable poison amount to new fuel assemblies to be charged to the peripheral area of the core.

According to this first embodiment of the present invention described above, the following effects can be achieved.

First, according to this embodiment, the burnable poison having low concentration is added to the fuel pellet and the burnable poison having high concentration is added to the burnable poison rod and lodged in the cladding in separation from the fuel pellet. Accordingly, the temperature of the fuel pellet added with the burnable poison of the low concentration is small in an increasing amount in comparison with the temperature of the conventional fuel pellet added with the burnable poison of 4.5 wt % and the fuel pellet can be manufactured with substantially the same volume as that of the gas plenum of the fuel rod in which the burnable poison is not added.

Accordingly, the required lowering amount of the enrichment of the fuel is made extremely small in comparison with a standard length type fuel rod in which gadolinia is not added with respect to the burnable poison added fuel rod in this case, it is sufficient for the enrichment lowering corresponding to the power peaking lowering to the extent of about 5%, which is remarkably smaller than the enrichment lowering corresponding to the requirement of the power peaking lowering of about 10 to 20% in the conventional example. That is, according to this embodiment, the enrichment of the fuel rod added with the burnable poison can be increased in comparison with the conventional example.

By replacing the fuel rod added with the burnable poison with a fuel rod having the maximum enrichment, the average enrichment of the fuel assembly increases and a fuel assembly having high degree of burn-up possibility can be easily obtained. Furthermore, according to this embodiment, the number of the fuel rods having high power output in the fuel assembly increases and the power distribution of the horizontal cross section of the fuel assembly can be made flat, thus lowering the local power peaking of the fuel rods arranged at the most outer peripheral portions in the fuel assembly. As this result, the numbers of both the fuel pellets added and not added with the gadolinia decrease in comparison with the conventional example, thus the fuel assembly being easily manufactured.

Moreover, since the concentration of the burnable poison, i.e. gadolinia, added to the fuel rod is low, the increasing of the thickness of the fuel rod cladding and the increasing of the volume of the gas plenum can be remarkably improved as countermeasures to the increasing of the inner gas pressure of the fuel rod due to the increasing of the FP gas.

The burnable poison rod in the present embodiment is formed by piling up the cylindrical zirconium alloys or zirconium-thermets in which the concentration or amount of the burnable poison in the axial direction is changed, and the sectioning of this concentration can be easily done so as to accord with a nuclear calculation mesh in a simulation code of a reactor.

The sintered pellet of an annular aluminium oxide containing boron carbide utilized for a burnable poison rod of a conventional BWR has a thickness of 0.5 to 1.0 mm, an outer diameter of about 10 mm and a height of about 50 mm, thus being small. However, the shape thereof according to this embodiment is large, that is, an outer diameter being about 24 to 32 mm, thus providing less productivity and being inconvenient for the use of the ceramics as in the conventional example. It is difficult in technique in the view point of the sintering to mix the gadolinia with a ceramics base material as a diluting material with high concentration as in this example. In this view point, according to the present embodiment, the gadolinia can be added as it is into the thin cylindrical zirconium plate member to the amount of about 40 vol %.

In the axial distribution of the burnable poison amount in the fuel assembly, only one kind of the fuel pellet containing the burnable poison can be used by making the fuel pellets with the same uranium enrichment and same gadolinia concentration in amounts to be added to the fuel rod, thus reasonably manufacturing the fuel pellets.

Furthermore, members constituting the fuel rods can be reasonably manufactured by, as means for adjusting the gadolinium or gadolinia amount distribution in the axial direction of the burnable poison rod, changing the concentration of the base material to be added to the zirconium and, in addition to this technique, adjusting the density of the holes formed to the member.

Namely, by forming the vacant holes to the burnable poison member having a constant gadolinium or gadolinia concentration by means of, for example, a press working, laser working or the like, the manufacturing means of the burnable poison added fuel rod can be reduced and the amount of the poison can be easily visually discriminated from the density of the holes, thus improving the quality monitoring working. Furthermore, the gadolinium amount contained in the zirconium can be easily inspected, after assembling to the burnable poison rod, by utilizing the characteristic feature of a magnetic member of the gadolinium or gadolinia.

In the case of the aluminium oxide, since it possesses moisture absorbing property, there provides a problem on a manufacture control, but according to this embodiment, this problem can be obviated. The member containing the poison according to this embodiment is separated from the fuel and isolated from the core water, so that there is no need for consideration of a corrosion-proof property and compatibility of the fuel pellet and the cladding of high temperature, thus providing a gentle environmental condition.

In the conventional fuel pellet containing the burnable poison, the limit of the contained density thereof is merely about 10 wt % from the viewpoints of the burning behavior and the sintering ability of the fuel pellet, but according to the cylindrical burnable poison member of the present embodiment, the burnable poison having higher density can be provided with respect to the fuel design in response to the requirement of achieving high exposure.

In the case of the addition of the burnable poison to the fuel rod, when the enrichment of the fuel pellet increases, a neutron spectrum is hardened, thereby lowering the neutron absorbing effect, but according to the present embodiment, this hardly affects because of the facts that, in the fuel rods added with the burnable poison, fuel rods added with initially thin gadolinia are arranged to areas near the outer peripheral portion, having soft spectrum, of the fuel assembly and the burnable poison rods having a sufficient amount of water area as moderator are arranged to the inside area of the fuel assembly.

Since the burnable poison rod is provided in its inside with the moderator passage, it serves as a neutron absorbing member of a neutron flux trap type having good efficiency in the case where the burnable poison has the neutron absorbing ability. Upon the burnable poison contained in the burnable poison rod being burn up completely, the rod acts thereafter as the water rod and, hence, serves to increase the thermal neutron flux at the central area of the fuel assembly and to make flat the power distribution at the horizontal cross section of the fuel assembly.

FIG. 4(D) shows a third example of the burnable poison member 23c filling the annular space, and the burnable poison member 23c of FIG. 4(D) is formed by punching circular or elongated holes to a zirconium burnable poison support base material 35 and fitting into these holes a burnable poison material 37 containing the burnable poison such as gadolinia sintered material, gadolinium-zirconium alloy and gadolinia-zirconium thermet. The amount of the burnable poison can be changed by changing this fitting area.

In such case, the gadolinia sintered material, gadolinium-zirconium alloy and gadolinia-zirconium thermet are evenly arranged in the axial direction as well as the peripheral direction of the cylindrical member, and particularly, a specific care is paid to make even this arrangement at the connecting portions of the upper and lower ends of the cylindrical member, thereby preventing the neutron absorbing effect from being deviated. Further, it is desired that the horizontal width of the fitting member is made smaller than that of the thermal neutron diffusion length (2-3 cm) during the power operation.

According to this third example, the concentration of the burnable poison is high as like in an initially charged fuel, but when it is designed to make low its amount, the cylindrical member containing burnable poison having a large area of the volume of the zirconium base material will be easily realized.

FIG. 4(E) shows a fourth example of a burnable poison member 23d, in which ceramics forms the burnable poison containing member likely as the gadolinium-zirconium cylindrical member or the gadolinia-zirconium thermet cylindrical member.

Namely, the burnable poison member 23d of FIG. 4(E) is formed of two splittable semi-circular cylindrical members being formed by the sintered ceramics and these semi-circular cylindrical members are mated together in use as one cylindrical member. Although in this fourth example, two-splittable cylindrical members are shown, but more than two splittable shape will be also considered.

A large ceramics such as having about 15 cm can be formed by thus dividing the cylindrical member into a plurality of sections, and as the ceramics, there will be considered a gadolinia sintered material, gadolinia-zirconium sintered material or gadolinia-alumina sintered material.

Furthermore, in order to adjust the gadolinia amount, a volatile component is mixed in the ceramics formation stage and the density is adjusted in a sintering stage, or as shown in the examples of FIGS. 4(B) and 4(C), it can be easily done to provide the circular or elongated vacant holes 36 or 36a. Further, it may be possible to form the holes 36 and 36a by means of laser working after the ceramics formation.

FIG. 7(B) shows a modified example of the first embodiment, which corresponds to a conventional example in which the concentration is higher than the case of the example of FIG. 6 (fuel assembly average enrichment of about 3.7 wt %) and 22 numbers of gadolinia added fuel rods are arranged (fuel assembly average enrichment of about 4.5 wt %).

In this modified example, 6 numbers of the gadolinia added fuel rods can be reduced in comparison with the conventional example. Furthermore, such high enrichment fuel assembly can increase the added concentration of the gadolinia to the conventional fuel rod to about 5-6 wt %, but according to this example, this is reduced less than about 3 wt %. Further, an example of FIG. 7(A) is a conventional example corresponding to the present embodiment.

Second Embodiment

FIG. 8(B) represents a second embodiment of the present invention corresponding to a conventional example of an interchangeable MOX (mixed-oxide fuel) fuel assembly corresponding to the fuel assembly of FIG. 6 (fuel assembly average enrichment of about 3.7 wt %). FIG. 8(A) is a conventional example corresponding to the present second embodiment.

In the MOX fuel, since the spectrum is hardened, the neutron absorbing effect of the gadolinium being the burnable poison is made small and, hence, there is required the burnable poison added fuel rods larger in number than the case of the uranium fuel assembly.

However, when the gadolinia is added to the MOX fuel pellet, since the thermal neutron absorption cross section of the plutonium is large, the neutron absorbing effect of the gadolinia is remarkably reduced and the excess reactivity suppressing ability of the fuel assembly is hence reduced.

Then, in the most of the MOX fuel designs, the uranium fuel pellet is used without using the MOX fuel pellet with respect to the gadolinia added fuel rod. As this result, as shown in FIG. 8(A), 22 numbers of uranium fuel rods are used and, in conformity with these uranium fuel rods, the charging amount of the plutonium to the fuel assembly can be reduced.

On the other hand, in the second embodiment shown in FIG. 8(B), 6 numbers of the burnable poison added uranium fuel rods are replaced with the MOX fuel rods of the maximum plutonium enrichment, so that the charging amount of the plutonium can be increased by the amount corresponding to this replacement.

Particularly, in the MOX fuel assembly using the plutonium, since the MOX fuel rod is manufactured in a glow box, it is difficult to axially distribute the burnable poison concentration in the MOX fuel rod. Accordingly, it is particularly effective for the MOX fuel assembly to provide the axial power distribution ability by providing the axial burnable poison amount distribution as shown in FIGS. 5 and 10 in the moderator rod containing the burnable poison.

Third Embodiment

Figure 9:
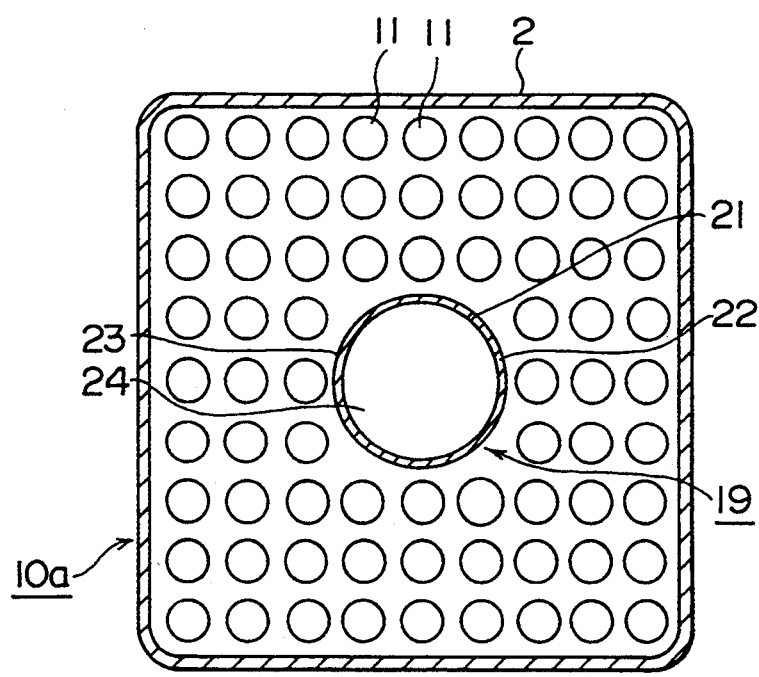
FIG. 9 is a cross sectional view of the fuel assembly according to a third embodiment of the present invention.

FIG. 9 represents, through a horizontal cross section, a third embodiment of the fuel assembly 10 according to the present invention. Namely, as can be seen from FIG. 9, the fuel assembly 10 has 9×9 lattice structure 10a and a large burnable poison rod, having a cross sectional area corresponding to 3×3 fuel cell, is arranged at the central portion of this lattice structure 10a and having no length-reduced fuel rod.

Figures 10A, 10B, 10C, 10D:
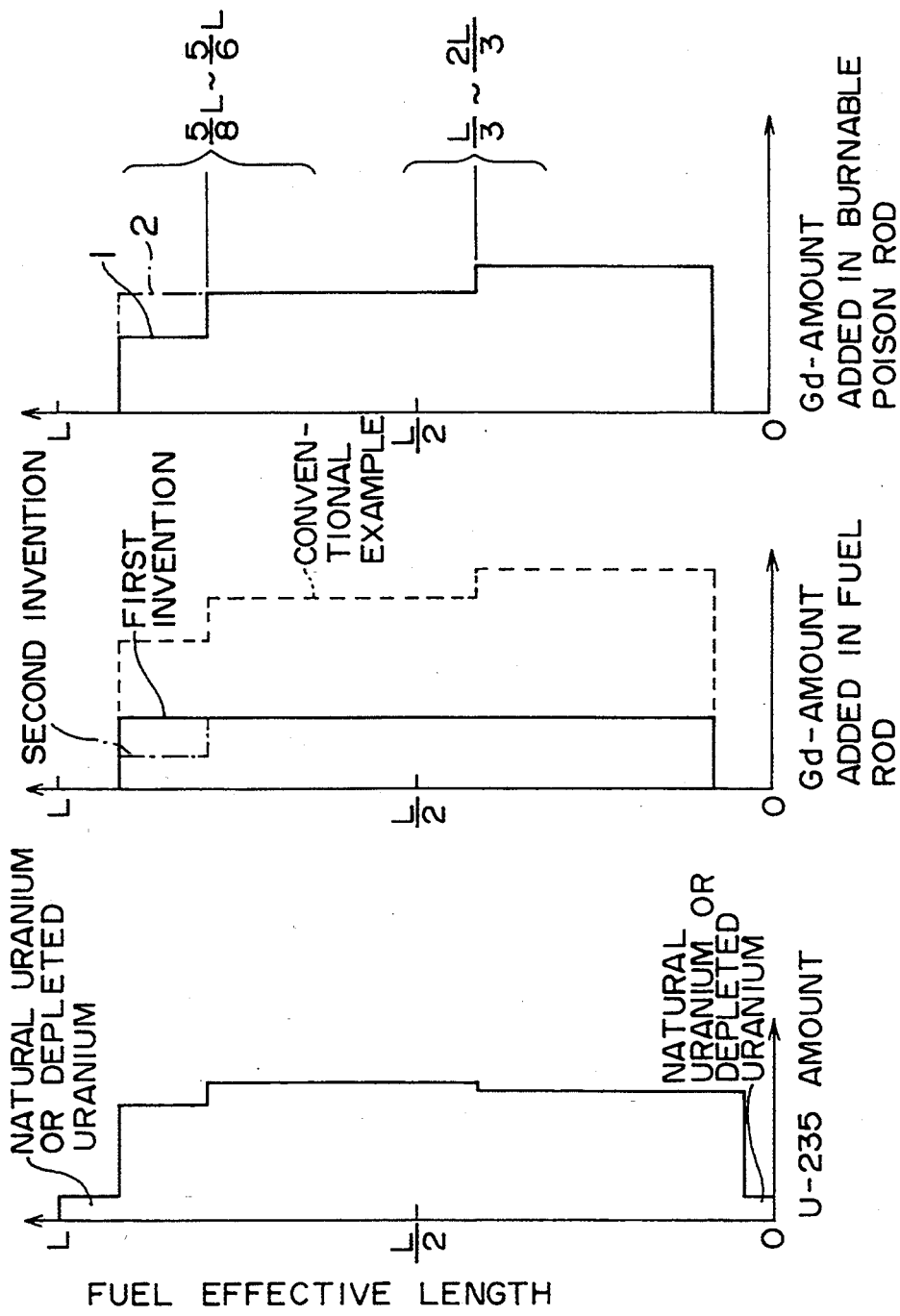
FIG. 10(A) is a schematic view showing a standard length fuel rod of the fuel assembly according to the third embodiment of the present invention.
FIG. 10(B) is a view showing the axial enrichment distribution of the fuel assembly of FIG. 10(A)
FIG. 10(C) is a view showing the axial distribution of the burnable poison amount of the burnable poison added fuel rod.
FIG. 10(D) is a view showing the axial distribution of the poison amount of the burnable poison rod.

FIG. 10 including FIGS. 10(A) to 10(D) represents the axial enrichment distribution, the distribution of the axial gadolinium added amount of the burnable poison containing fuel rod and the axial distribution of the gadolinium amount contained in the burnable poison rod, all related to the third embodiment of the present invention. Since the power peaking in an area directly above the natural uranium or depleted uranium area of the lower end portion of the fuel rod is small by a amount corresponding to no location of the short fuel rod, the amount of the gadolinium in the burnable poison rod in this area is reduced. The other structure is in principle the same as the fuel assembly shown in FIG. 6(B). FIG. 11(B) shows the enrichment distribution in the horizontal cross section of the fuel assembly of the present embodiment and the arrangement of the gadolinia added fuel rods therein, and FIG. 11(A) shows a conventional example.

Fourth Embodiment

Figure 12A:
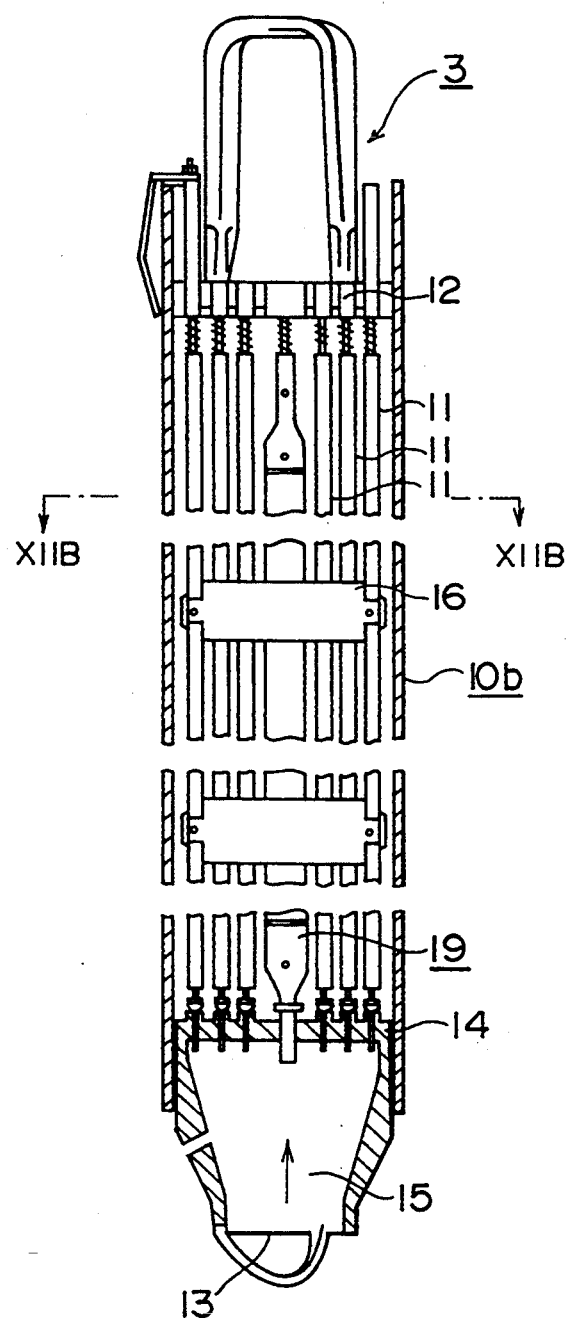
FIG. 12(A) is a cross sectional view of the fuel assembly according to a fourth embodiment of the present invention and FIG. 12(B) is a sectional view taken along the line XIIB—XIIB in FIG. 12(A)
Figure 12B:
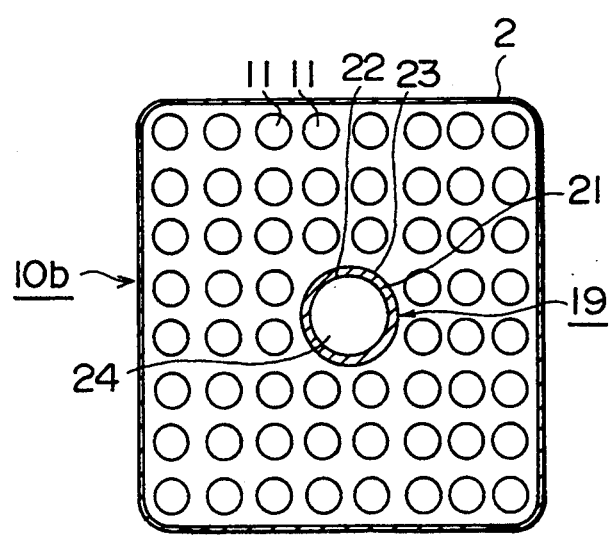

FIGS. 12(A) to 13 represent a fuel assembly 10b of a fourth embodiment according to the present invention, in which a large burnable poison rod 19 having a cross sectional area corresponding to 2×2 fuel rod cell is arranged in the fuel assembly 10b having 8×8 lattice arrangement structure. In this embodiment, no short fuel rod is assembled.

FIG. 13(B) shows the enrichment distribution in the horizontal cross section of the fuel assembly 10b of the fourth embodiment and the arrangement of the gadolinia added fuel rods therein, and FIG. 13(A) shows a conventional example.

Fifth Embodiment

Figure 14A:
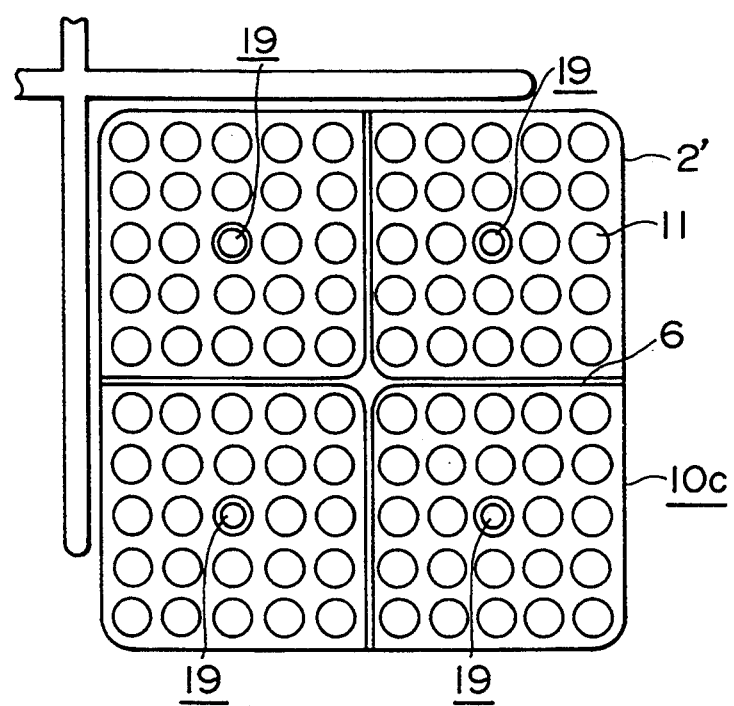
FIG. 14(A) is a cross sectional view of the fuel assembly according to a fifth embodiment of the present invention.

FIGS. 14(A) to 14(C) represent a fuel assembly 10c of a fifth embodiment according to the present invention, in which a water cross 6 is arranged at the central portion of the fuel assembly 10c having 10×10 lattice arrangement structure, and a small size burnable poison rod corresponding to one fuel rod cell is arranged to the central portion in each of four fuel assembly sections divided by this water cross 6. In this embodiment, no short fuel rod is assembled. FIG. 14(B) shows a conventional example.

FIG. 14(C) shows the enrichment distribution in the horizontal cross section of the fuel assembly 10c of the fifth embodiment and the arrangement of the gadolinia added fuel rods. In this fifth embodiment, the gadolinia added fuel rods of low concentration of 3 wt % are arranged to the most outer peripheral portions of a small fuel bundle or portions near four corners of the small fuel bundles of the second layer from the outermost periphery, and in principle, the burnable poison rod of this embodiment is not adjacently disposed. In such small size burnable poison rod, it achieves the reactivity suppressing effect corresponding to the effect attained by two burnable poison added fuel rods. As this result, according to the fifth embodiment, 8 numbers of the burnable poison rods are substituted with the fuel rod having the maximum enrichment uranium.

As described above, the burnable poison rod of this embodiment can be adapted even if the fuel lattice structure of the fuel assembly changes. For example, it may be applied to a fuel assembly of hexagonal lattice structure or a fuel assembly of circular tube annular arrangement lattice structure utilized in an advanced thermal reactor (ATR) in JAPAN.

In the foregoing description, the gadolinium and gadolinia are explained as examples of the burnable poison. Since the gadolinium is transformed to a gadolinium isotope having chemical characteristic not changed even if nuclear transformation due to the neutron absorption occurs, and it is advantageous and convenient that the gadolinium does not produce gas such as in boron-10 and has the thermal neutron absorption cross section larger than that of boron-10. However, boron or boron carbide may be utilized in place of the gadolinium in the present invention.

The first and third embodiments of the present invention will be summarized as follows.

(1) In the fuel assembly in which the upper tie plate, the lower tie plate and a plurality of fuel rods supported at their upper ends by the upper tie plate and at their lower ends by the lower tie plate and filled up in their inner spaces with a plurality of fuel pellets, and which are accommodated in the square cylindrical channel box forming the coolant passage, an elongated outer tube, and the burnable poison rod has an elongated outer tube, an inner tube disposed coaxially in the outer tube, upper and lower annular plugs secured to these outer and inner tubes and metal, ceramics or thermet containing burnable poison lodged in an annular space formed between the outer tube and the inner tube. The lower annular plug is connected to a lower end tube of a single tube structure having a lower end plug, and the coolant having the neutron moderating function is taken into the inner tube from the flow-in port formed to the lower end tube through a coolant passage formed between the fuel rods in the fuel bundle, the coolant then flowing through the inner tube. The upper annular plug is connected to an upper end tube of a single tube structure having an upper end plug, and the coolant from the inner tube through the leakage port is discharged into the coolant passage between the fuel rods in the fuel bundle. At least one of the burnable poison rods is provided with a tub for supporting a plurality of spacers arranged axially of the fuel bundle for maintaining the horizontal space between the fuel rods and the burnable poison rods. The area of the burnable poison rod in which the metal, ceramics or thermet containing the burnable poison is packed is formed at a portion except for portions having axial length corresponding to 1/24 to 1/12 length of the fuel effective length from the upper and lower ends thereof.

(2) The area of the burnable poison rod in which the metal, ceramics or thermet containing the burnable poison is packed is formed at a portion except for portions having axial length corresponding to 1/24 to 1/12 length of the fuel effective length from the upper and lower ends thereof. Furthermore, in this burnable poison packed area, the axial distribution of the burnable poison concentration or density is provided, and the burnable poison concentration or density at a portion upper from $\frac{1}{3}$ to $\frac{2}{3}$ length position from the lower end of the fuel effective length is made smaller than that at a portion lower than that length position.

(3) The area of the burnable poison rod in which the metal, ceramics or thermet containing the burnable poison is packed is formed at a portion except for portions having axial length corresponding to 1/24 to 1/12 length of the fuel effective length from the upper and lower ends thereof. Furthermore, in this burnable poison packed area, the axial distribution of the burnable poison concentration or density is provided, and a first sectioning portion is formed to the $\frac{1}{3}$ to $\frac{2}{3}$ length position from the lower end of the fuel effective length and a second sectioning portion is formed to the $\frac{2}{3}$ to 5/6 length position from the lower end of the fuel effective length or density at a portion upper from $\frac{1}{3}$ to $\frac{2}{3}$ length position from the lower end of the fuel effective length in a manner such that the burnable poison concentration or density is made highest at an area below the first sectioning position and it is made lowest above the second sectioning position, an intermediate area being middle.

(4) The burnable poison rod is arranged at the central portion of the fuel assembly, and the fuel rod cells, occupied by at least the burnable poison rods, of the fuel rods facing the burnable poison rods are fuel rods containing no burnable poison.

(5) The burnable poison concentration of the fuel rod containing the burnable poison disposed at the most outer peripheral portion or second layer portion therefrom is a concentration burned up during 0.5 to 0.8 operation cycle period, for example 3 wt % in gadolinia for 13 month operation period.

(6) The burnable poison containing member packed in the burnable poison rod is a porous gadolinia sintered member and has a splittable circular structure forming a part of the cylindrical shape.

(7) The burnable poison containing member packed in the burnable poison rod is a gadolinia-zirconia sintered member or gadolinia-alumina sintered member and has a splittable circular structure forming a part of the cylindrical shape.

(8) The burnable poison containing member packed in the burnable poison rod is a gadolinia containing zirconium alloy cylinder having one vertical narrow cutout or a zirconium thermet cylinder having one vertical narrow cutout.

(9) The burnable poison containing member packed in the burnable poison rod is a gadolinia containing zirconium alloy cylinder having one vertical narrow cutout or a zirconium thermet cylinder having one vertical narrow cutout and also provided with regularly punched elongated or circular holes.

(10) The burnable poison containing member packed in the burnable poison rod is formed by regularly punching circular or elongated holes to the zirconium metal or zirconium alloy cylinder having one vertical narrow cutout and fitting, into the holes, the gadolinia containing zirconium alloy, gadolinia containing zirconium thermet, gadolinia sintered material, gadolinia-zirconia sintered material or gadolinia-alumina sintered material.

Sixth Embodiment

Figure 18:
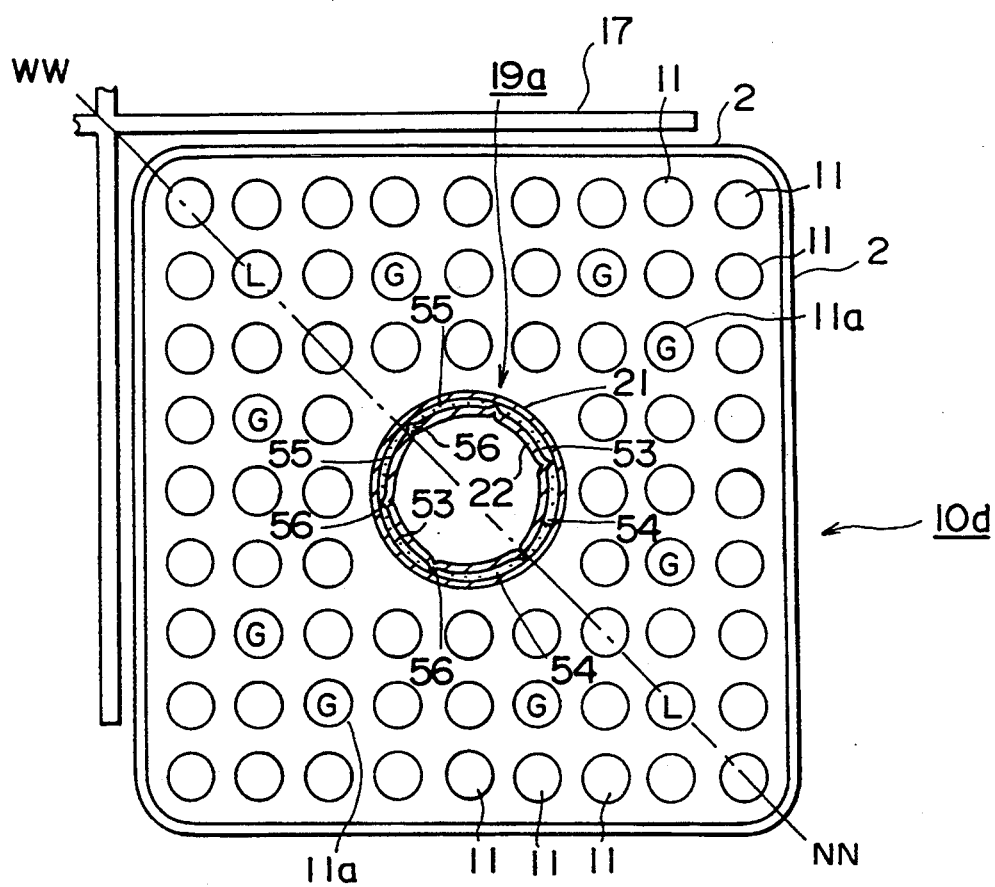
FIG. 18 is a cross sectional view of the fuel assembly according to a sixth embodiment of the present invention.

A sixth embodiment of the fuel assembly according to the present invention is described hereunder with reference to FIG. 18, showing a cross section of the fuel assembly 10d, and a control rod or blade 17 is arranged outside the channel box 2.

The fuel assembly 10d of the sixth embodiment of FIG. 18 is composed of a fuel rods 11 packed with fissionable material pellets in 9×9 lattice arrangement, fuel rods 11a and 11b containing burnable poison, indicated by letter G or L, in place of some of the fuel rods 11 and a moderator rod 19a containing a burnable poison. These rods are bundled and the bundle is surrounded by the channel box 2.

The moderator rod 19a has a double wall structure comprising an outer tube 21 having about 40 mm outer diameter and an inner tube 22 in which non-boiled moderator passes. Projections 56 are formed to the peripheral portion of the inner tube 22 and the projections 56 sections a portion between the outer and inner tubes into three annular sections 53, 54 and 55 each having about 1 mm thickness in the peripheral direction thereof. The annular sections 53, 54 and 55 are all packed with particles of an alloy of the gadolinia $Gd_2O_3$ as a burnable poison and the zirconium metal, and the contained gadolinia wt % is set in the annular section 53 to 10%, annular section 54 to 20% and annular section 55 to 30%.

The position of the moderator rod 19a in the fuel assembly 10d is determined so that the annular sections 53, 54 and 55 are arranged in symmetric with respect to a diagonal line (a dotted line connecting WW and NN, WW being a start point on the control rod side 17). The burnable poison (gadolinia) concentration of the fuel rod L is 1.0% and it is set so that the poison reactivity is lost at a time earlier than the burnable poison contained in the moderator rod 19a.

Figure 19:
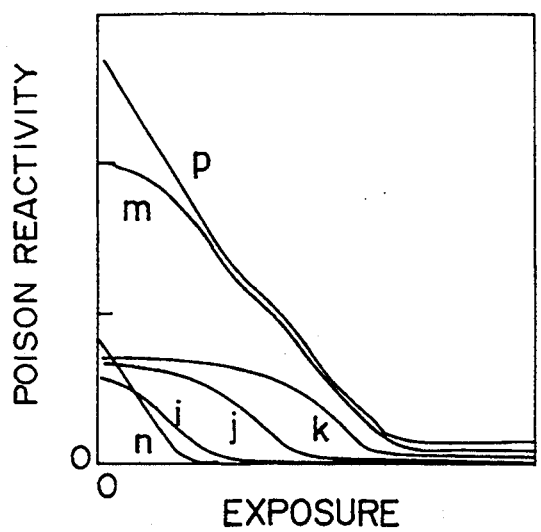
FIG. 19 is a characteristic view for the explanatory of effects of the fuel assembly of FIG. 18.

The function of this embodiment is explained hereunder with reference to FIG. 19, showing the relationship between the poison reactivity and the burn-up degree and the reactivity for recognizing contributions of the respective poisons. In the annular sections 53, 54 and 55, there are packed burnable poisons (gadolinia) of amounts different from each other and, hence, the burn-up points at which the poison reactivity has almost vanished are different, which are shown by solid lines i, j and k, respectively.

The poison reactivity of the moderator rod 19a is the sum, i.e. solid line m, of the solid lines i, j and k, and furthermore, the reactivity of the burnable poison of low concentration added to the fuel pellets of two fuel rods L will be shown by solid line n. The sum of the poison reactivity is shown by solid line p, and as a whole, an approximately linear reduction rate can be realized. Further, the concentration of the gadolinia of the fuel rod G is 4.0% which acts as a conventional fuel rod containing the burnable poison.

This embodiment will achieve the following effects.

According to this embodiment, the reduction rate of the poison reactivity can be made linear by the combination of the burnable poisons having concentrations different from each other and the excess reactivity can be hence made flat. The number of the fuel rod containing the burnable poisons can be reduced by charging the burnable poison in the moderator rod.

In this embodiment, the reactivity worth corresponds to 5 to 6 numbers of the fuel rods containing the burnable poison, and the numbers of the fuel rods containing the burnable poison can be reduced in accordance with the reduced numbers of the fuel rods. Therefore, the number of the fuel rods containing the burnable poison having small power in the burning initial period can be reduced, and the local power peaking coefficient can be hence lowered.

Furthermore, in the fuel rods to which the burnable poison is added, the concentration is not made high so that reason that the power becomes not so high because of the lowering of the thermal conductivity, but the reduction of the number of the fuel rods containing the burnable poison can reduce such limitation and the local power peaking can be reduced.

In a case where the take-out burn-up degree to be aimed is high, the number and the concentration of the required fuel rods containing the burnable poison increase and the poison rods must be arranged side by side. In such case, the reactivity worth of each poison rod is lowered due to the adjacent effect mutually killing the absorbing effects of the respective poison rods and the number of the required fuel rods containing the burnable poison increases. In such case, according to the present embodiment, much amount of the burnable poison can be effectively arranged in the fuel assembly.

Furthermore, in general, the enrichment distribution of the fuel assembly is made symmetric with respect to the diagonal line crossing the control rod for making flat the local power distribution, and according to this embodiment, the burnable poison concentration distribution of the annular sections of the moderator containing the burnable poison is made symmetric with respect to the diagonal line (line connecting WW and NN in FIG. 18). According to this result, more symmetric property can be realized with respect to the diagonal line WW-NN, thus providing the fuel having less local power peaking.

Further, according to the present embodiment, there is provided an example in which the gadolinia concentration is changed. However, for example, in the case of the gadolinia, two nuclides of Gd-155 and Gd-157 are actual absorbing elements and the nuclide of Gd-154, or Gd-156 contained in the natural gadolinium has less absorbing ability. Accordingly, substantially the same effect in the case of changing the concentration will be achieved by changing the enrichment of the nuclide of Gd-155 or Gd-157.

Furthermore, in the present embodiment, the burnable poison is formed to the thermet particles, and the effective poison concentration can be changed by changing the packing rate of the burnable poison by the combined use of large and small particles. A material usually used as a burnable poison such as zirconium boride will be utilized other than the gadolinia as the material of the burnable poison.

Further, in the present embodiment, the fuel pellet in which a burnable poison with low concentration is added to the fuel rod L is utilized, but, in an alternation, a burnable poison such as gadolinia or zirconium boride may be coated, by several micron thickness, on the surface of the fuel pellet. In the fuel pellet in which the burnable poison with the low concentration is added to the fuel rod L or in which the burnable material coating is effected on the surface of the pellet, there is no need for excessively lowering the enrichment, thus less affecting on the local power peaking.

Figure 37A:
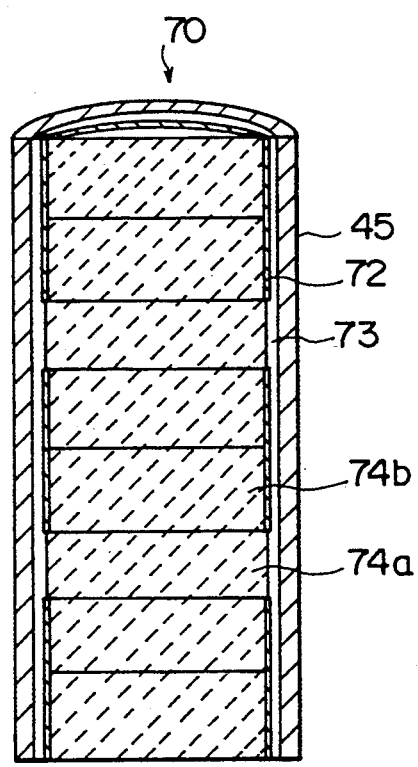
FIGS. 37(A) and 37(B) are views showing burnable poison coating methods to the surface of the fuel pellet of the sixth embodiment.
Figure 37B:
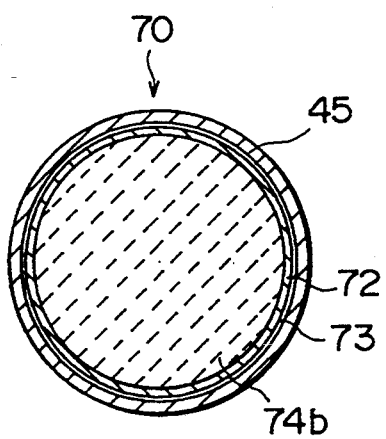
Figure 38A:
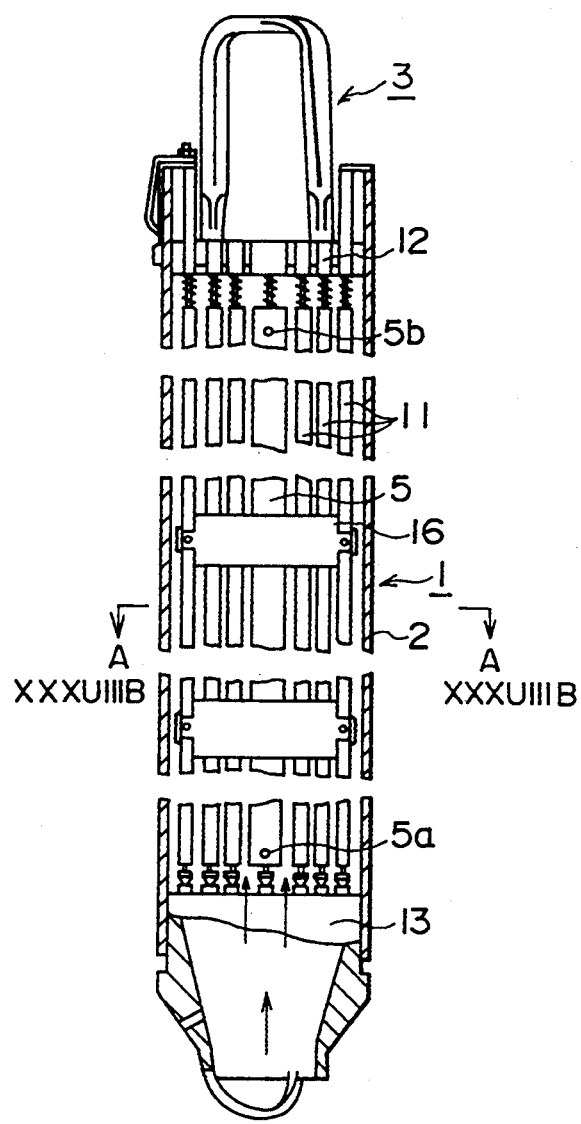
FIG. 38(A) is an elevational view showing a first conventional example of a fuel assembly to be charged in a conventional BWR and FIG. 38(B) is a sectional view taken along the line XXXVIIIB—XXXVIIIB in FIG. 38(A).
Figure 38B:
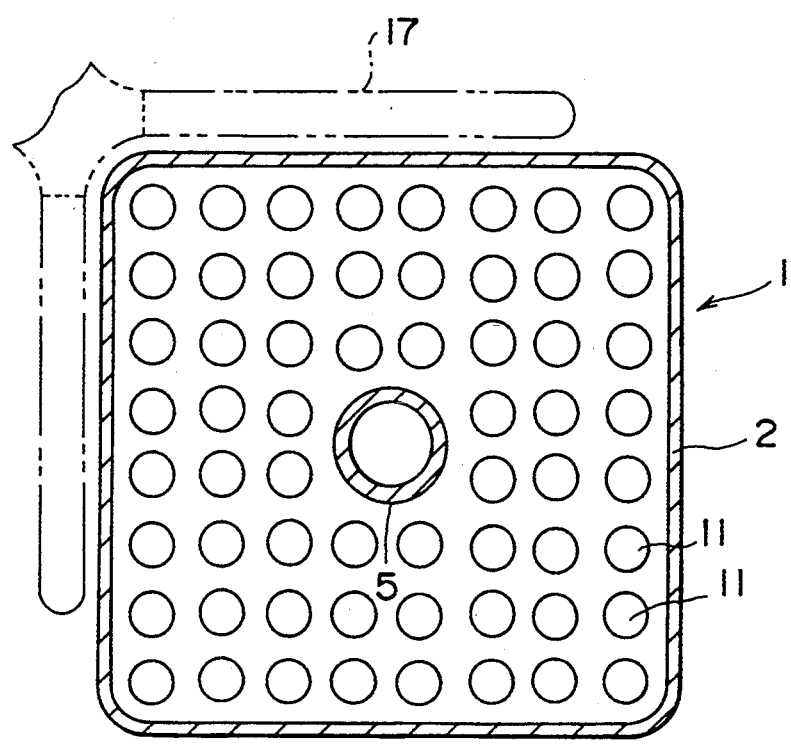

FIG. 37 shows a case in which the burnable poison 72 is coated on the surface of the fuel pellet 74b among the fuel pellets 74a and 74b of the fuel rod 70. The fuel rod 70 is composed of a fuel cladding 45, the fuel pellet 74b coated with the burnable poison and the normal pellet 74a, and an air gap exists between the fuel cladding 45 and the fuel pellets 74a, 74b. Helium is filled up in this air gap. In this embodiment, the burnable poison is coated on the surface of the fuel pellet 74b of the fuel rod 70, but, in an alternation, fuel pellet 74a area with partially no burnable poison coating may be provided in the axial direction as in the present embodiment for enhancing the thermal transfer efficiency of the fuel rod. Otherwise, the burnable poison coating pellets 74b may be continuously piled up in a predetermined thickness.

Furthermore, a flame-coating method will be utilized for the burnable poison coating of gadolinium, gadolinia or zirconium boride.

Still furthermore, in order to control the axial power distribution at the fuel life initial time, it is considered to arrange in combination the fuel pellets coated with the burnable poison or added with the gadolinia with low concentration in an area, having a suitable length range, at a portion below the ⅓ to ⅔ length portion of the fuel effective length in the enriched area in the fuel effective length portion. According to this technique, self-control ability of the axial power distribution of the fuel assembly (making flat the axial power distribution) in the life initial of the fuel can be achieved.

Seventh Embodiment

Figure 20:
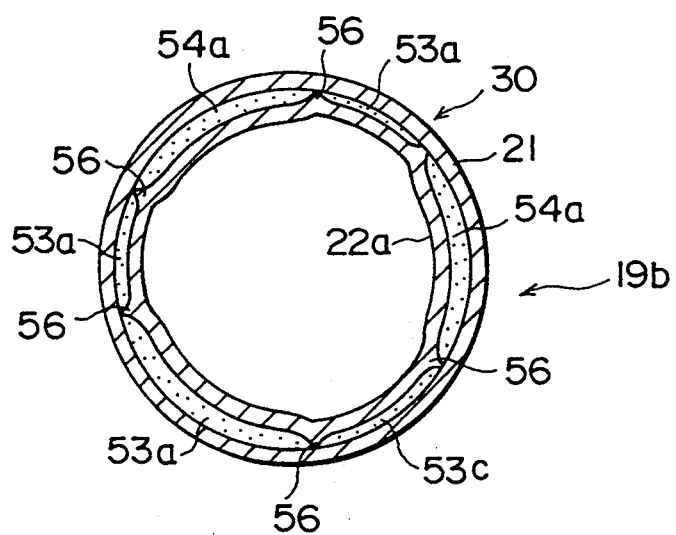
FIG. 20 is a sectional view showing a moderator rod according to a seventh embodiment of the present invention.

A seventh embodiment of the present invention will be described hereunder with reference to FIG. 20, showing a cross section of another example using a moderator rod 19b. The moderator rod 19b containing a burnable poison has a double layer (tube) structure having an outer tube 21 having a constant thickness and an inner tube 22 having partially different thickness portions.

Six projections 56 are formed to the outer surface of the inner tube 22. An annular portion between the inner tube 22 and the outer tube 21 is sectioned in the peripheral direction into a large thickness portion 54a and a small thickness portion 53a, and the burnable poison in the annular portion is sectioned by the projections 56.

The thermet of particles of the zirconium and gadolinia as in the former sixth embodiment and having the same concentration as that in the former embodiment is packed in both the sections 53a and 54a as the burnable poison.

In this seventh embodiment, the same concentration and two kinds of thicknesses in substitution for the gadolinia concentration are distributed in the peripheral direction of the moderator rod, and likely as in the former sixth embodiment, the reactivity can approach the linear (straight) line by the combined effect of the reactivity. Furthermore, according to this embodiment, only one kind of the burnable poison is utilized, so that the manufacturing of the burnable poison can be made simple.

Eighth Embodiment

Figure 21A:
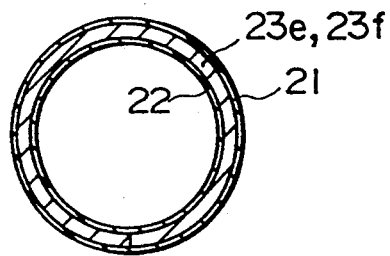
FIG. 21(A) is a sectional view showing a moderator rod according to a eighth embodiment of the present invention.
Figure 21B:
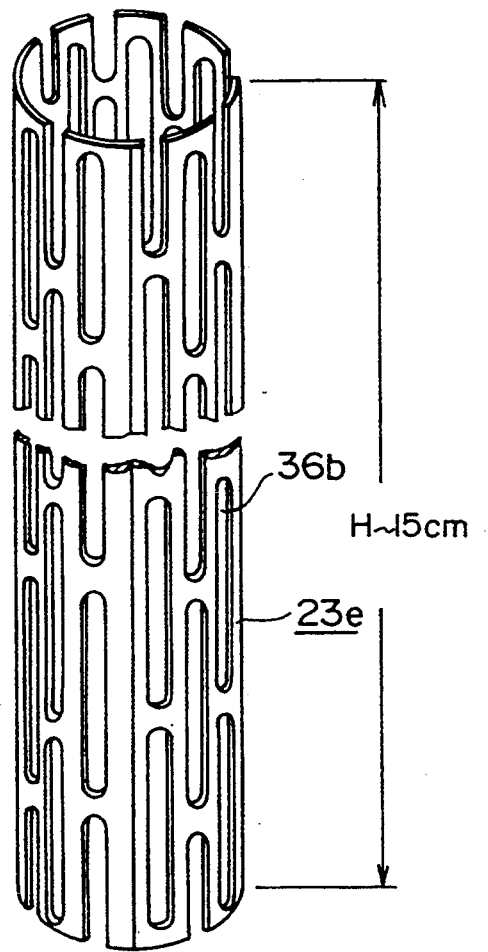
FIG. 21(B) is a perspective view of the burnable poison member of FIG. 21(A) and FIG. 21(C) is a perspective view of a modified example of FIG. 21(B)
Figure 21C:
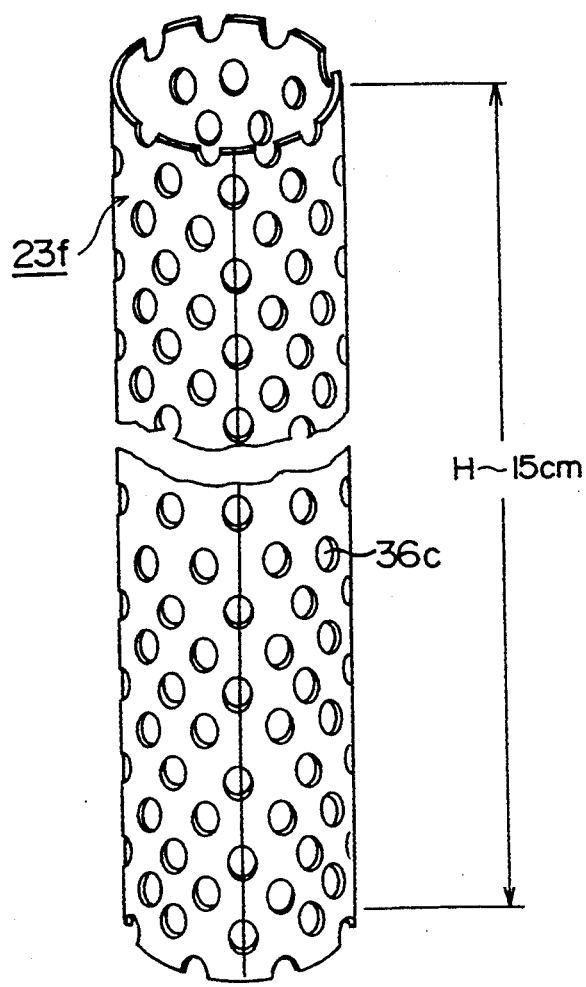

In the seventh embodiment, the thermet in particles of the zirconium and the gadolinia is utilized, but a thermet, ceramic or metal plate member containing the burnable poison, which is bent in arcuate, may be inserted into the annular section as shown in FIG. 21 with thickness distribution of the plate member.

In this embodiment, the combination of the plate member and the burnable poison similar to that of the first embodiment will be thought out. The plate members 23e and 23f are formed by means of press molding, pressing or chemical corrosion method to thereby punch shallow holes 36b, 36c to the outer surfaces thereof to distribute the thickness differences in the peripheral and axial directions thereof. In this formation, the shallow holes have uniform location in the axial and peripheral directions. The cylindrical member of the thus formed structure is packed in the annular section and, as shown in FIGS. 5(D) and 9(D), by providing the axial distribution, the combined effects of the first to fifth embodiments and the seventh embodiment.

Ninth Embodiment

Figure 22A:
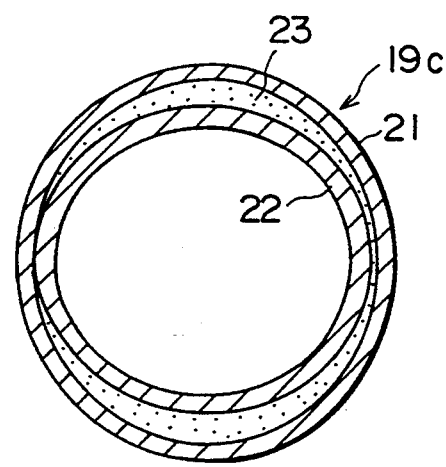
FIG. 22(A) is a cross sectional view of a moderator rod according to a ninth embodiment of the present invention and FIG. 22(B) is a cross sectional view of a moderator rod according to a tenth embodiment of the present invention.

A ninth embodiment will be described with reference to FIG. 22(A). In this embodiment, a moderator rod 19c containing the burnable poison has a double layer (tube) structure having an outer tube 21 and an elliptical inner tube 22, and the thickness of the annular section 23 between these tubes 21 and 22 changes continuous from the large thickness portion to the small thickness portion because of the elliptical shape of the inner tube 22.

The burnable poison having one kind of concentration is charged in the annular section 23. The present embodiment corresponds to a case where a plurality of portions having many different thickness portions of the burnable poison are provided, and substantially the same effects as those of the sixth embodiment can be achieved. Further, according to this embodiment, the inner tube can be easily manufactured, thus reducing the manufacturing cost.

Tenth Embodiment

Figure 22B:
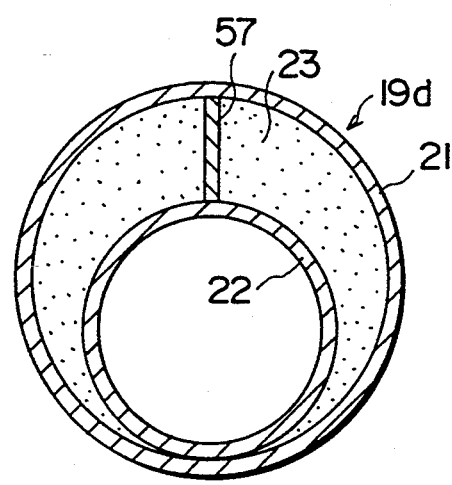

A tenth embodiment is described hereunder with reference to FIG. 22(B). Referring to FIG. 22(B), a moderator rod 19d containing a burnable poison has a double layer structure having an outer tube 21 and an inner tube 22 inserted into the outer tube 21 in an axially offset manner, and a thickness of an annular section between these outer and inner tubes 21 and 22 changes continuously from a large thickness portion to a small thickness portion.

A spacer 57 is disposed between the most wide portion of the annular section between the outer and inner tubes 21 and 22 so as not to shift them. In the annular section 23, the burnable poison is filled up likely in the sixth embodiment. This tenth embodiment achieves substantially the same effects as those of the ninth embodiment, and furthermore, since the inner tube 22 has a circular structure, it will be more easily manufactured.

As described above, in the seventh to tenth embodiments, the disclosures were made only to the moderator rods 19b, 19c and 19d, but it is of course noted that these moderator rods are incorporated in the channel box 2 to thereby constitute a fuel assembly as in the sixth embodiment. In such case, the arrangement thereof will have to be done in consideration of the symmetry with respect to the diagonal line WW-NN of the fuel assembly.

The tenth embodiment in these embodiments is especially effective for so-called a D-lattice type fuel assembly in which a water gap width on the WW side is different from that on the NN side. In the D-lattice type fuel assembly, since the thermal neutron flux is larger on the WW side having a wider water gap width, the power peak liably causes. Accordingly, the local power peaking can be reduced by arranging the moderator rod 19d containing the burnable poison as shown in FIG. 22(B) in the manner that the widest width portion, that is, direction of the spacer 57, of the annular section 23 directs to the corner portion on the WW side.

Eleventh Embodiment

Figure 23A:
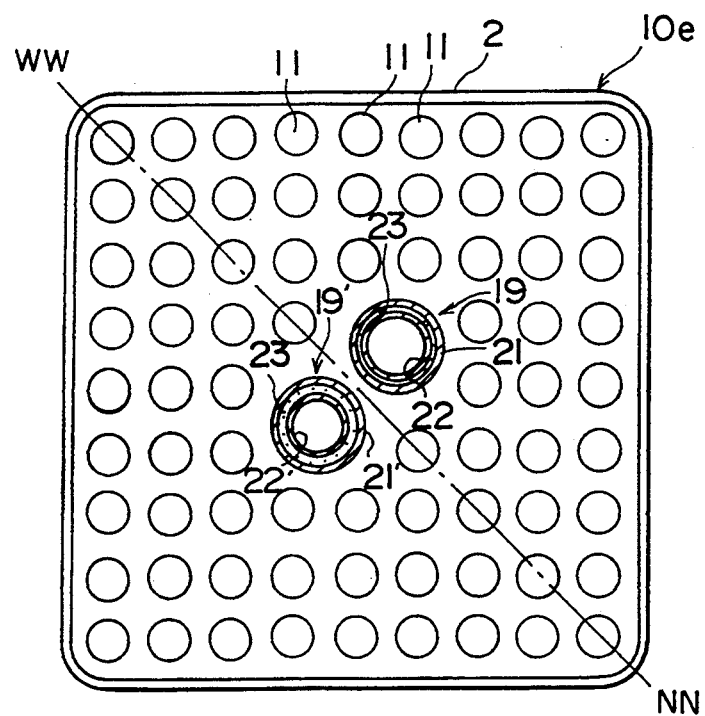
FIG. 23(A) is a cross sectional view of a fuel assembly according to an eleventh embodiment of the present invention.

FIG. 23(A) represents an eleventh embodiment of the present invention showing a fuel assembly 10e. The fuel assembly 10e utilizes two kinds of moderator rods 19 and 19' containing the burnable poison. One 19 of the moderator rods is composed of an outer tube 21 and an inner tube 22, but the other one 19' thereof is composed of an outer tube 21' having an outer diameter equal to that of the outer tube 21 and an inner tube 22' having an outer diameter smaller than that of the inner tube 22. Accordingly, the thickness of the annular section 23' between the outer and inner tubes 21' and 22' of the moderator rod 19' is larger than that of the annular section 23 between the outer and inner tubes 21 and 22 of the moderator rod 19.

The burnable poison is charged in the annular sections 23 and 23', and in this embodiment, each moderator rod has no peripheral distribution, but the reduction rate of the poison reactivity can approach a straight line by the use of two poisons having different thicknesses. Further, in FIG. 23(A), the fuel assembly 10e is generally composed of the fuel rods 11 and the channel box 2.

Further, in this embodiment, the diameter of the inner tube is changed for changing the inner volume of the annular section, but there is a certain limit for enlarging the diameter of the outer tube because the diameter of the outer tube is influenced by the distance between the fuel rods in the fuel assembly. Further, the diameter of the outer tube is generally made as possible as large because it is desired to increase the moderator amount in the inner tube as much as possible. It is however to be noted that it is possible, in an alternation, to make difference in volumes of the annular sections by changing the diameter of the outer tube.

Figure 23B:
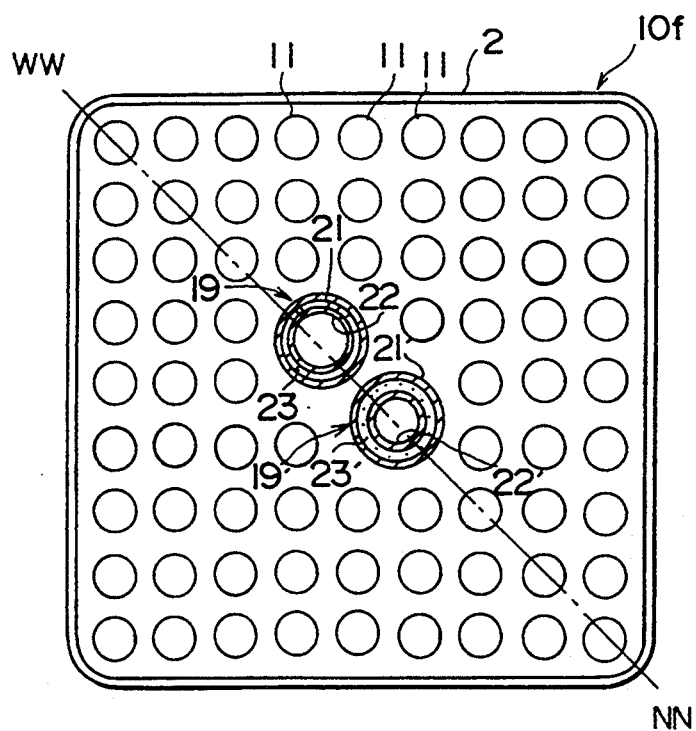
FIG. 23(B) is a cross sectional view of a modified example of the eleventh embodiment.

FIG. 23(B) shows a modified embodiment of this embodiment, and in this modified embodiment, two moderator rods are disposed on the diagonal line WW-NN, so that the symmetry with respect to the diagonal line WW-NN can be maintained even in the case of the different outer diameter of the inner tube, and as this result, the local power peaking in the fuel assembly can be reduced.

Twelfth Embodiment

Figure 23C:
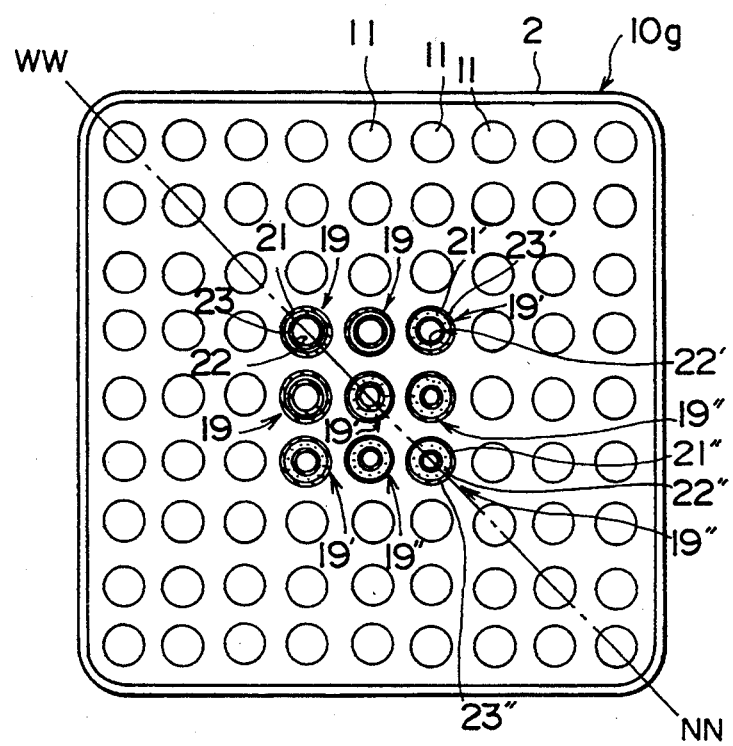
FIG. 23(C) is a cross sectional view of a fuel assembly according to a twelfth embodiment of the present invention and FIG. 23(D) is a cross sectional view of a fuel assembly according to a thirteenth embodiment of the present invention.

A twelfth embodiment is described hereunder with reference to FIG. 23(C), in which a fuel assembly 10g is provided with three kinds of 9 moderator rods 19, 19' and 19" containing burnable poisons 23, 23' and 23" in 3×3 lattice arrangement at the central portion of the channel box 2, and respectively three moderator rods 19, 19' and 19" are disposed at the central portion of the fuel assembly 10e in substitution for the fuel rods 11 in the symmetric arrangement with respect to the WW-NN diagonal line.

In this embodiment, the outer diameters of the respective inner tubes 22, 22' and 22" are different from each other to thereby provide the different thicknesses of the annular sections between the outer and inner tubes, and the burnable poisons 23, 23' and 23" are packed in the respective annular sections. Namely, the outer diameters of the inner tubes 22, 22' and 22" are made smaller in this order with respect to the moderator rods 19, 19' and 19". As this result, the poisons are reduced in amount at the control rod side to thereby alleviate the lowering of the control rod worth. According to this embodiment, the poison reactivity can further approach a straight line in comparison with the eleventh embodiment. The outer diameters of the outer tubes 21, 21' and 21" of the moderator rods 19, 19' and 19" are approximately equal to the outer diameter of the fuel rod 11. Further, in this embodiment, the thicknesses of the annular sections are made different by changing the outer diameters of the inner tubes 22, 22' and 22", but it will be easily understood that substantially the same effect may be attained by changing the concentrations of the burnable poisons.

In a modified embodiment of this twelfth embodiment, it may be possible that only the central one moderator rods of the nine moderator rods is designed to have the annular section thicker than those of the other eight moderator rods surrounding the central moderator rod. In such case, since the central moderator rod is surrounded by the other ones, the thermal neutrons are shielded, and accordingly, the burnable poison is gently burned up, but the effects of the burnable poison can be maintained long due to the thickened thickness of the annular section.

Thirteenth Embodiment

Figure 23D:
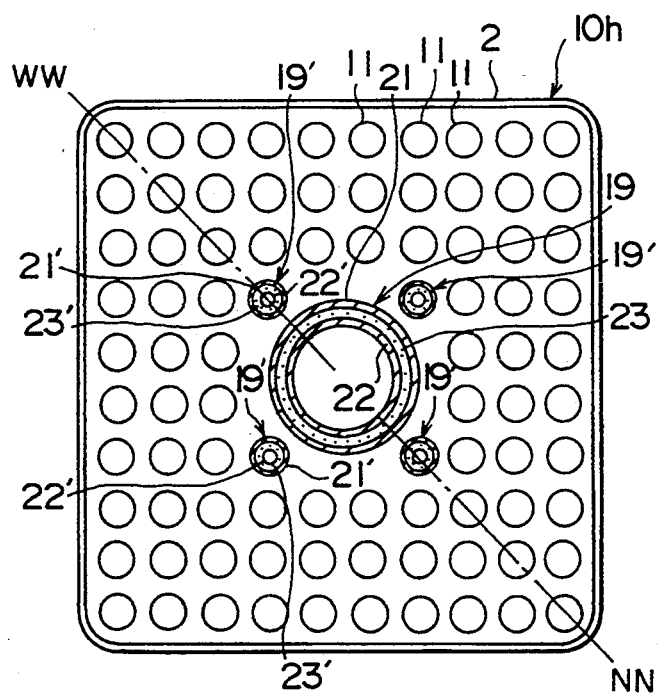

A thirteenth embodiment of a fuel assembly 10h will be described hereunder with reference to FIG. 23(D), in which the fuel assembly 10h is composed of fuel rods 11 in 10×10 lattice arrangement, one moderator rod 19 and four moderator rods 19'. The moderator rods 19 and 19' are arranged at the central portion of the fuel assembly 10h in a manner that the central moderator rod 19 has the same thickness as and different outer diameter from those of the moderator rods 19' surrounding the central one 19.

The central moderator rod 19 is composed of an outer tube 21 having a large diameter and an inner tube 22 having a large diameter, between which is formed an annular section in which the burnable poison 23 is packed, and on the contrary, each of the surrounding moderator rods 19' is composed of an outer tube 21' having a small diameter and an inner tube 22' having a small diameter, between which is formed an annular section in which the burnable poison 23' is packed.

Generally, as the speed reduction of the neutron due to the moderator becomes much as the diameter of the moderator becomes large, the flow-in amount of the thermal neutrons into the burnable poison increases. Accordingly, quenching time of the poison reactivity can be changed by the difference of the outer diameter of the moderator rod even in the case of the same thickness thereof, and hence, as in the other embodiments, according to this embodiment, the reduction of the poison reactivity can also approach the straight line. In this embodiment, there is shown an example in which the thickness of the annular section is changed, but it will be easily understood that substantially the same effect may be attained by changing the concentrations of the burnable poisons.

Fourteenth Embodiment

Figures 24A, 24B, 24C:
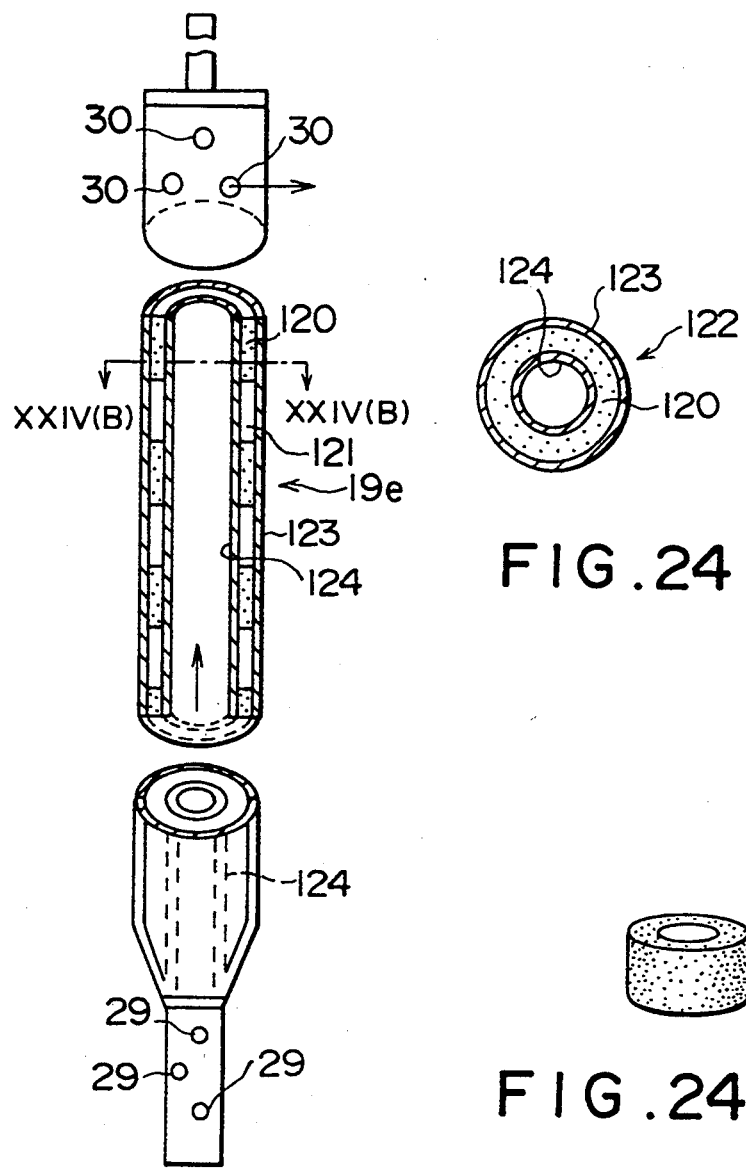
FIG. 24(A) is a perspective view of a moderator rod of a fourteenth embodiment of the present invention, partially cut away, in cross section.
FIG. 24(B) is a cross sectional view taken along the line XXIVB—XXIVB in FIG. 24(A) and FIG. 24(C) is a perspective view of a hollow burnable poison pellet in the embodiment of FIG. 24(A)

A fourteenth embodiment is shown in FIG. 24, in which FIG. 24(A) shows a elevational section of a moderator rod 19e according to this embodiment, FIG. 24(B) is a sectional view taken along the line XXIV(-B)—XXIV(B) and FIG. 24(C) is a perspective view of a hollow pellet 120 of FIG. 24(A).

In this embodiment, the moderator rod 19e is composed of an outer tube 123 and an inner tube 124 between which is formed an annular section in which pellets 121 and pellets 122 are piled up alternately. The pellets 121 have low gadolinia concentration and the pellets 122 have high gadolinia concentration, and both are formed by mixing and sintering gadolinia and zirconium so as to each provide a hollow structure and have 1-2 cm height.

A flow-in port 29 is provided to the lower portion of the moderator rod 19e to introduce the moderator (coolant) inside the inner tube 124 and the coolant is then flown out through a flow-out port 30 formed to the upper portion of the moderator rod 19e. The numbers of the flow-in and -out ports and the diameters thereof will be determined so that the coolant is not boiled in the moderator rod 19e.

This embodiment represents a case in which the burnable poisons having a plurality of concentrations are distributed in the axially vertical direction, and in this case, it is possible for use to easily combine the burnable poisons having different concentrations by using the outer and inner tubes having simple double tube structure. Further, in this embodiment, the heights of the hollow pellets 120 and 121 are determined to 1-2 cm in consideration of the thermal neutron diffusion length.

Fifteenth Embodiment

Figures 25A, 25B:
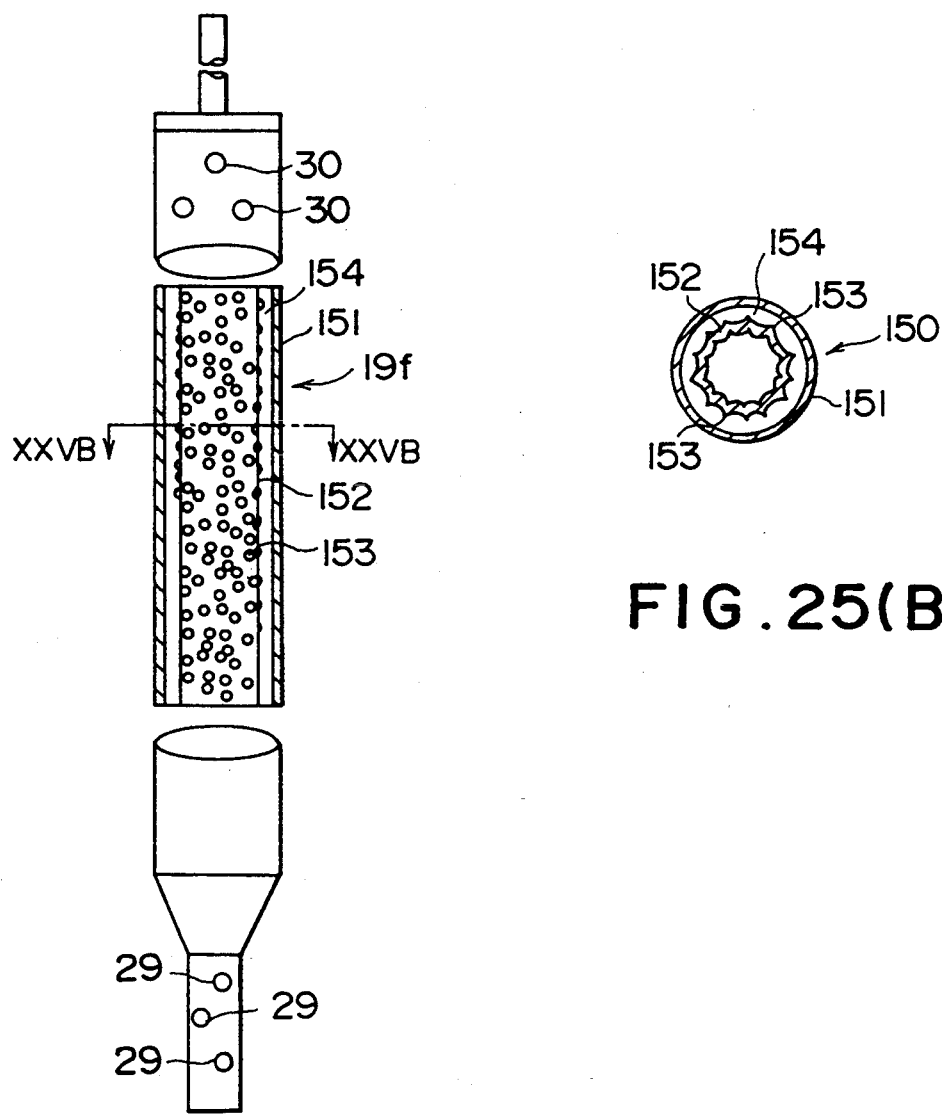
FIG. 25(A) is a perspective view of a moderator rod of a fifteenth embodiment of the present invention, partially cut away, in cross section
FIG. 25(B) is a cross sectional view taken along the line XXVB—XXVB in FIG. 25(A)

FIG. 25 is an elevational section of a moderator rod 19f according to a fifteenth embodiment of the present invention, in which the moderator rod 19f is composed of an outer tube 151 and an inner tube 152 having a peripheral surface to which dimples 153 are formed at random, and a burnable poison such as composed of gadolinia powder and zirconium powder is packed in an annular section 154 formed between the outer and inner tubes 151 and 152.

In this embodiment, thickened and thin portions of the burnable poison are finely distributed in the peripheral and axial directions by the location of the dimples 153, so that the reactivity change of the burnable poison can be properly adjusted without affecting on the power distribution.

Sixteenth Embodiment

Figure 26A:
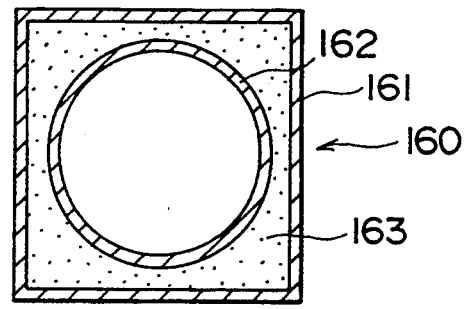
FIGS. 26(A), 26(B) and 26(C) are sectional views showing a moderator rod according to a sixteenth embodiment of the present invention.
Figure 26B:
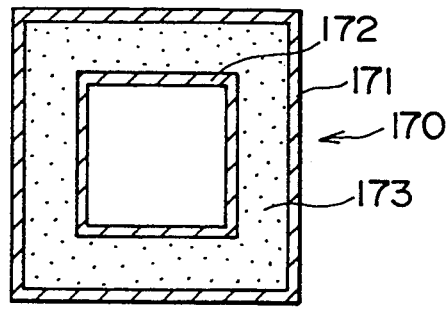
Figure 26C:
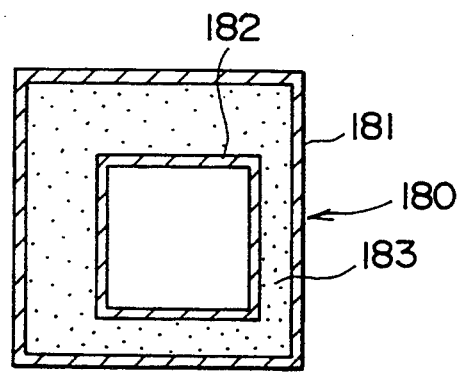
Figure 27:
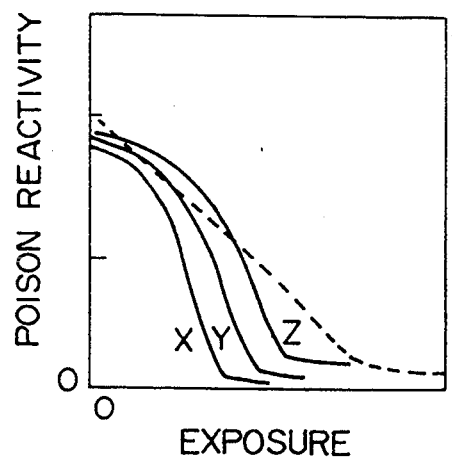
FIG. 27 is a characteristic view showing a burning change of a burnable poison reactivity.
Figure 28:
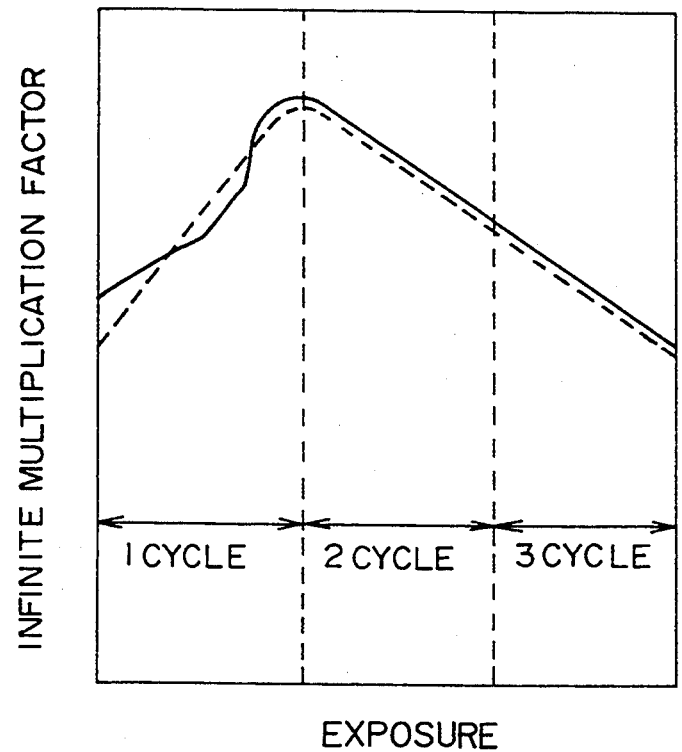
FIG. 28 is a characteristic view showing an infinite multiplication factor of a fuel containing a burnable poison.
Figure 29:
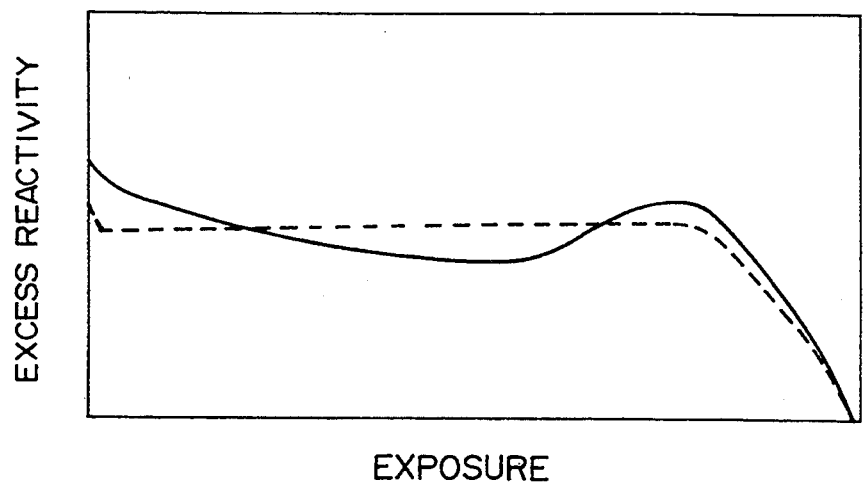
FIG. 29 is a characteristic view showing a burning change of an excess reactivity.
Figure 30A:
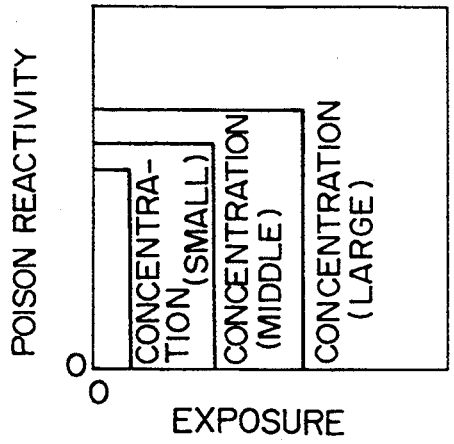
FIG. 30(A) is a characteristic view imaginarily showing a poison reactivity of a moderator rod and FIG. 30(B) is a characteristic view imaginarily showing an averaged poison reactivity of a moderator rod.
Figure 30B:
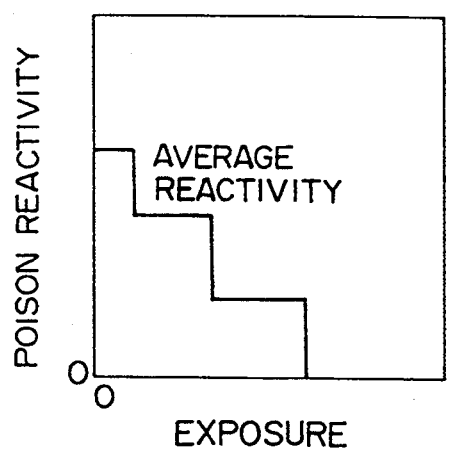
Figure 31A:
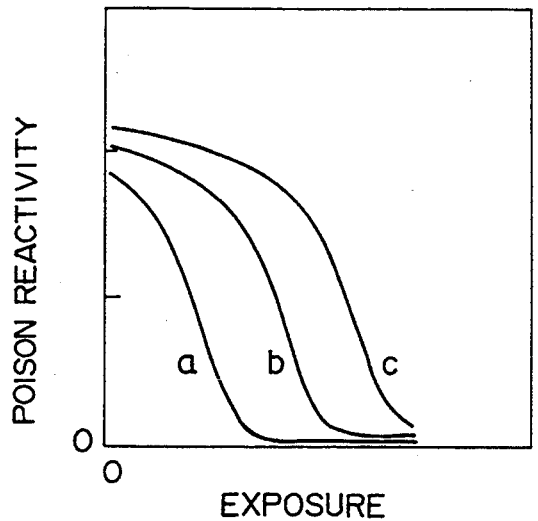
FIG. 31(A) is a characteristic view showing actual poison reactivity of a moderator rod and FIG. 31(B) is a characteristic view showing an averaged poison reactivity of the moderator rod.
Figure 31B:
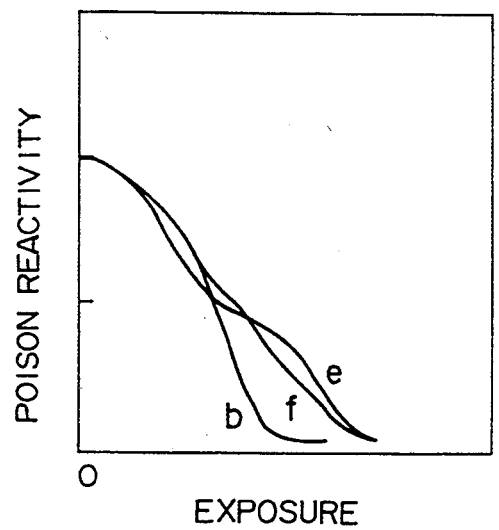
Figure 32:
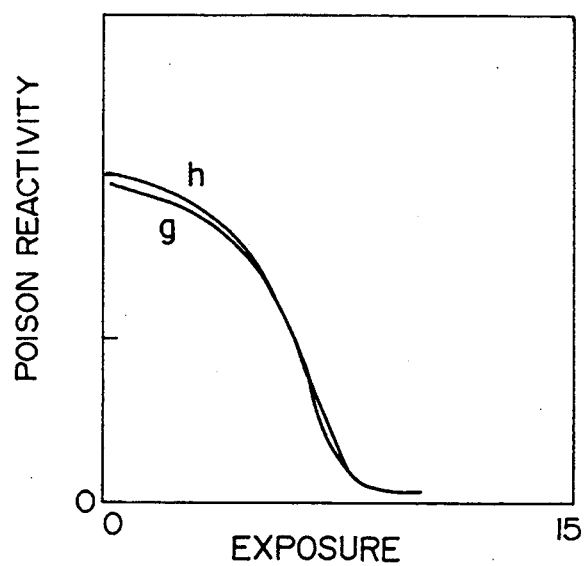
FIG. 32 shows a characteristic view of a poison reactivity in a case where the poison concentration or poison thickness is changed.
Figure 33A:
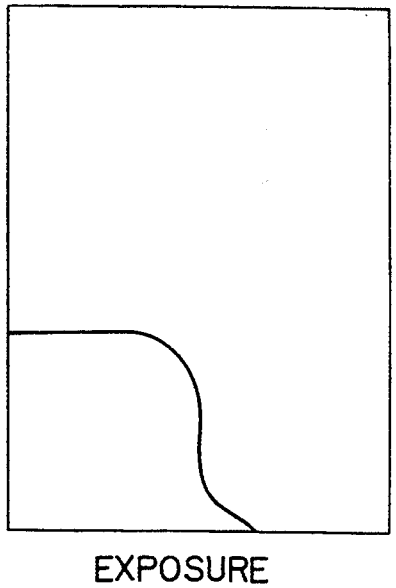
FIG. 33(A) is a view showing a poison reactivity of a moderator rod in the case of using only gadolinium as a burnable poison element.
Figure 33B:
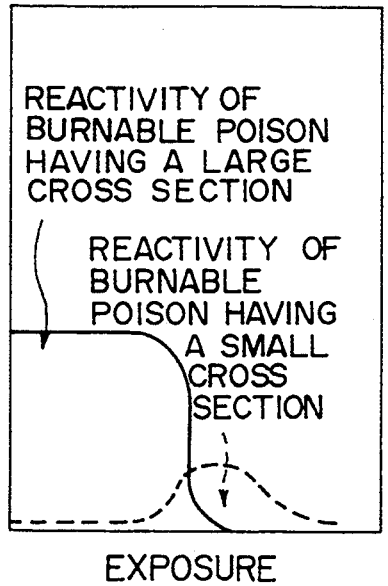
FIG. 33(B) is a view showing a poison reactivity of a moderator rod in the case of using gadolinium and boron as burnable poison elements.
Figure 33C:
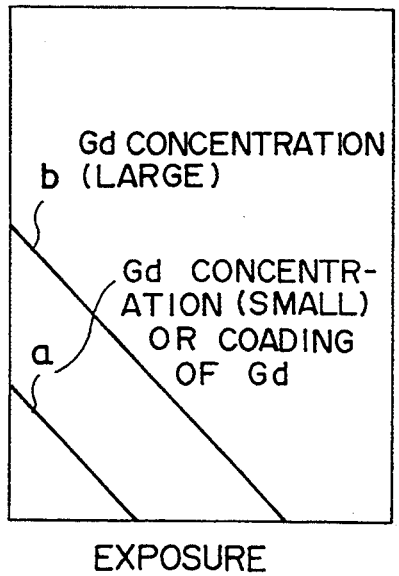
FIG. 33(C) is a view showing the poison reactivity of the gadolinium in a case where a burnable poison is coated on a surface of a fuel pellet or gadolinia of low concentration is added to a fuel pellet and a case where a gadolinia having a concentration of the extent which can be burned up to the end of the normal cycle.
Figure 33D:
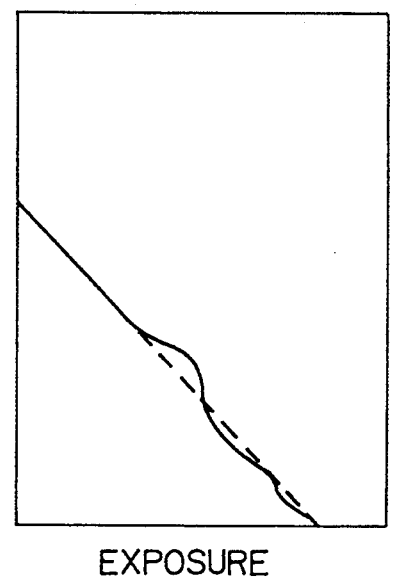

FIGS. 26(A) to 26(C) represent a sixteenth embodiment, showing examples of moderator rods 160, 170 and 180, respectively, and outer tubes 161, 171 and 181 in these examples have rectangular cross section. FIG. 26(A) shows an example in which an inner tube 162 having a circular cross section is utilized for the moderator rod 160, FIG. 26(B) shows an example in which an inner tube 172 having a rectangular cross section is utilized for the moderator rod 170, and FIG. 26(C) shows an example in which an inner tube 182 having a rectangular cross section is disposed with its axis being shifted from that of the outer tube 181 of the moderator rod 180.

As described above, the rectangular, in section, or other polygonal moderator rods may be adapted for the moderator rods 160, 170 and 180 without limiting to the circular shape in section. Burnable poisons 163, 173, 183 are packed in annular sections formed between the outer tubes 161, 171, 181 and the inner tubes 162, 172, 182 of the respective moderator rods 160, 170, 180.

Seventeenth Embodiment

Figure 34:
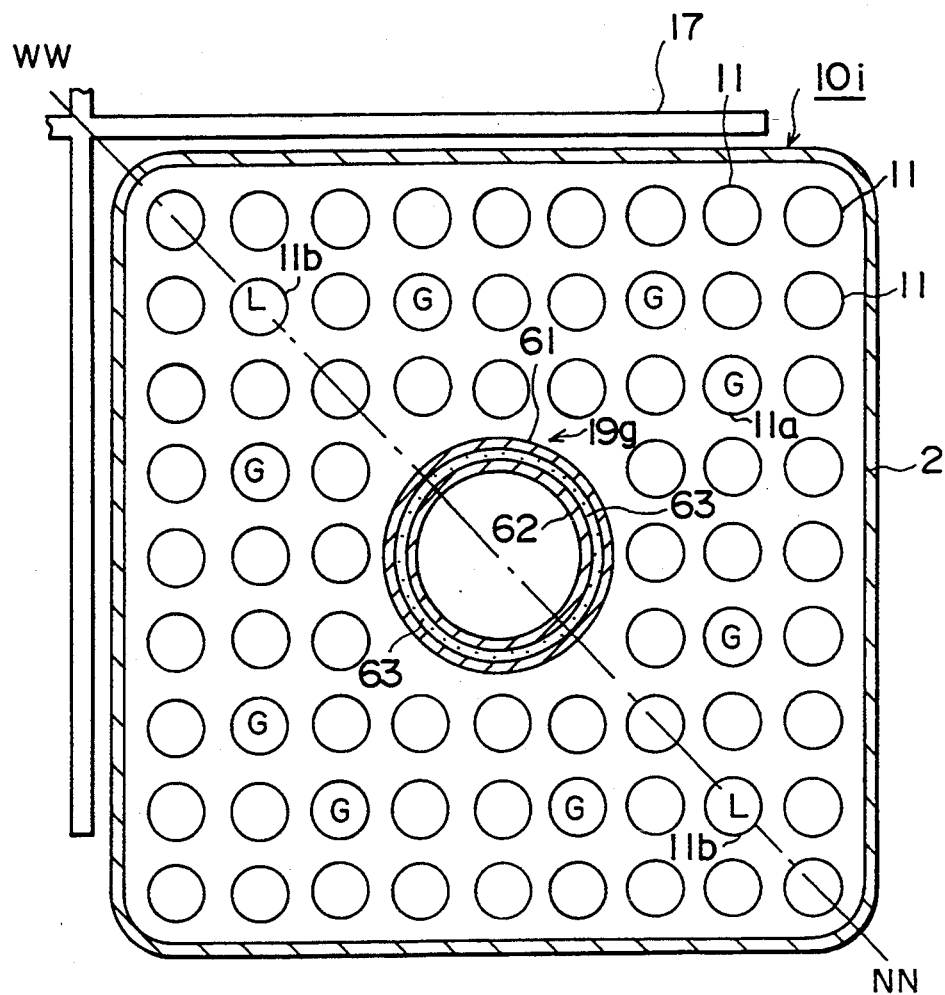
FIG. 34 is a fuel assembly according to a seventeenth of the present invention.

A seventeenth embodiment of the fuel assembly according to the present invention is described hereunder with reference to FIG. 34. The fuel assembly 10i is composed of a bundle of rods comprising fuel rods 11 packed with fissionable material pellets, fuel rods 11a and 11b (labelled as G and L) containing burnable poison (gadolinia) and a moderator rod 19g containing the burnable poison. The bundle is surrounded by and accommodated in a channel box 2. The moderator rod 19g has a double layer (tube) structure having an outer tube having about 40 mm outer diameter and an inner tube 62. The inner tube 62 and the outer tube 61 are formed of zirconium alloy added with the gadolinia ($Gd_2O_3$) or gadolinium. An annular section 63 formed between the outer and inner tubes is composed of zirconium alloy or aluminium oxide added with boron or boron compound such as boron carbide or zirconium boride.

In the case of the zirconium alloy as the burnable poison containing member of the inner tube, the outer tube and the annular section, the gadolinia of about 20 wt % is contained in, for example, the outer and inner tubes 61 and 62 and the boron of about 0.5 wt % is contained in the annular section. In the case of the burnable poison member being not formed of the zirconium alloy or in the case of chemical shapes or conditions of the burnable poison being different, the concentration thereof will be set so that the absolute amounts of the burnable poisons (here, gadolinium and boron) are substantially the equal amounts as those described above.

Further, two fuel rods 11b (labelled by L) containing the burnable poison are arranged in the fuel assembly 10i and filled up with the fuel pellets added with the gadolinia. The fuel rods 11a (labelled by G), reduced in numbers by about 5-6 numbers in comparison with the conventional fuel assembly, containing the burnable poison are also arranged in the fuel assembly 10i. The concentration of the gadolinia contained in the fuel rods 11a will be determined to the extent such that the poison effect of the gadolinia is almost quenched at the end period of the operation cycle, charged as a new fuel, the concentration thereof in this embodiment being 4.0%.

The functions of this embodiment will be explained hereunder with reference to FIG. 35.

Figure 35:
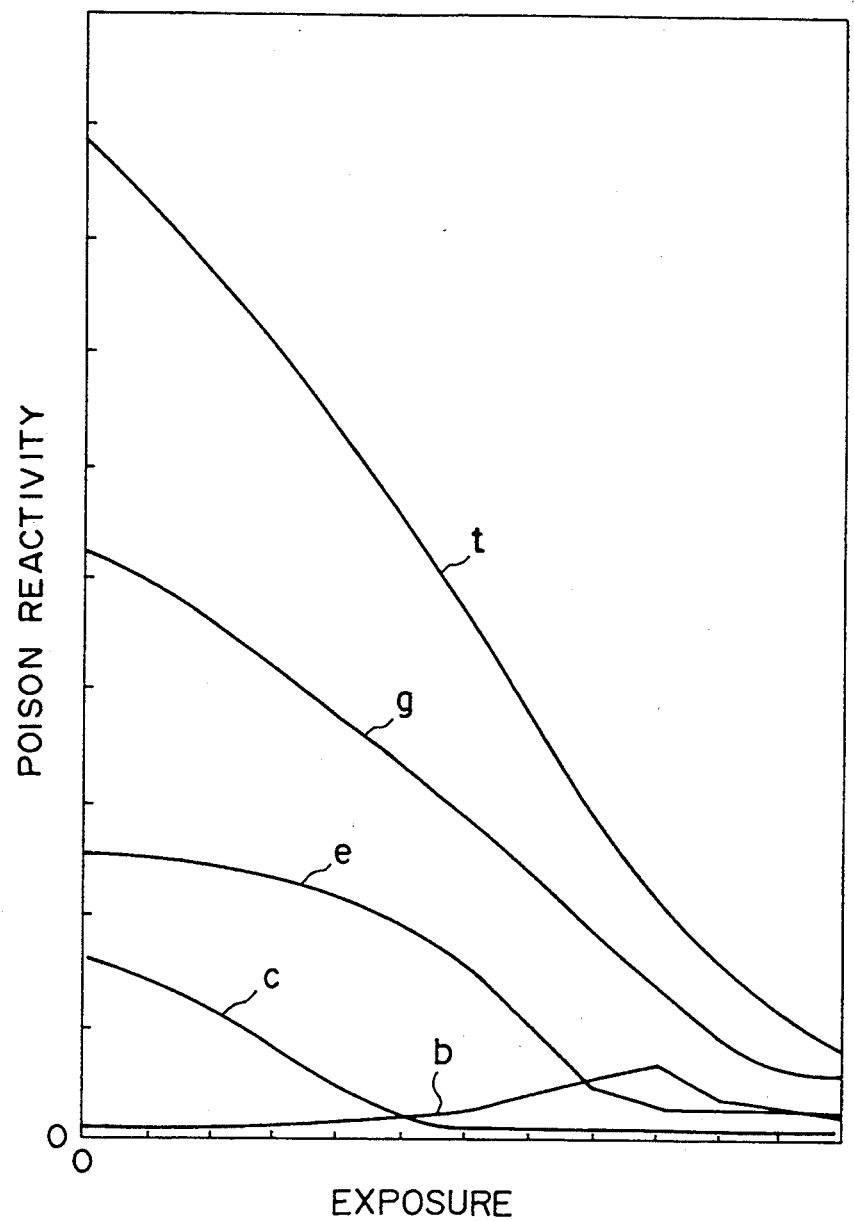
FIG. 35 is a view showing effects according to the seventeenth embodiment.

FIG. 35 is a graph showing a relationship between the poison reactivity and the burn-up degree for the understanding of the contribution of the poison reactivity of the fuel assembly from the respective poisons. In FIG. 35, solid line g shows a poison reactivity change of the gadolinium in the fuel rod 11a containing the burnable poison, solid line l shows a poison reactivity change of the gadolinium in the moderator rod 19g, solid line b shows a poison reactivity change of the boron in the moderator rod 19g and solid line c shows a poison reactivity change of the gadolinium in two fuel rods 11b containing the burnable poison. Solid line t represents the poison reactivity in the whole fuel assembly, and as a whole, the poison reactivity can be linearly reduced as well as the burn-up degree.

This embodiment attains the following effects.

According to this embodiment, according to the addition of the boron to the gadolinia as the burnable poison in the moderator rod 19g, the poison reactivity change at the final period of the burning of the moderator rod containing the burnable poison can be compensated to be reduced approximately linearly. Furthermore, according to the gadolinia of low concentration added to the fuel rods 11b, the poison reactivity at the life initial time of the fuel assembly can be also compensated. Accordingly, the burning change of the poison reactivity in the whole fuel assembly can be made substantially linear, thus making more flat the excess reactivity of the core.

Further, in the embodiment of FIG. 34, the poison reactivity at the burning initial time is not so changed, as in the moderator rod containing the burnable poison of the sixteenth embodiment, only by the moderator rod containing the burnable poison. Accordingly, it is essential to use the fuel rods added with the burnable poison having low concentration, and this concentration will have to be made higher than in the case of the fourth means of the present invention. For this reason, the gadolinia of 2% concentration is used in this embodiment although the gadolinia of 1% concentration is used in the sixth embodiment.

An effective burnable poison packing or charging rate can be enhanced by using an enriched boron, as the boron used for the moderator rod containing the burnable poison, containing a large amount of boron-10 having a large absorption cross section. As this result, the absolute value reducing effect of the negative void coefficient after the burning of the burnable poison can be increased by reducing the thickness of the annular section 63 and increasing the moderator area section in the inner tube 62 by an amount corresponding to the reduced thickness of the annular section 63, thereby reducing the reactivity loss due to the structure of the moderator rod 19g. Furthermore, the addition absolute amount of the gadolinium or gadolinia can be reduced by enhancing the containing ratio of Gd-157 in the gadolinium added to the inner tube 62 and the outer tube 61 with respect to the naturally presenting ratio thereof, whereby the reactivity loss due to the remaining gadolinia can be reduced and performance lowering degree of the strength, ductility and corrosion-proof property of the inner and outer tubes 62 and 61 can be alleviated.

Furthermore, in the MOX fuel using the plutonium which will be essentially utilized in future, since the neutron spectrum is harden, the poison reactivity of the burnable poison can be lowered, but, according to the double layer structure of the moderator rod of the present invention, the poison reactivity effect is hardly influenced with the neutron spectrum hardening when the burnable poison is arranged in the MOX fuel, and hence, the reactivity effect of the burnable poison can be effectively taken out.

Eighteenth Embodiment

An eighteenth embodiment of the fuel rod of the present invention will be described hereunder with reference to FIG. 36.

According to the seventeenth embodiment shown in FIG. 34, the gadolinium is contained in the inner and outer tubes 62 and 61 of the moderator rod 19g containing the burnable poison. However, in the seventeenth embodiment, the strength, ductility and corrosion-proof property can be degraded by adding simple substance or compound of the gadolinium and boron to the zirconium alloy.

Figure 36:
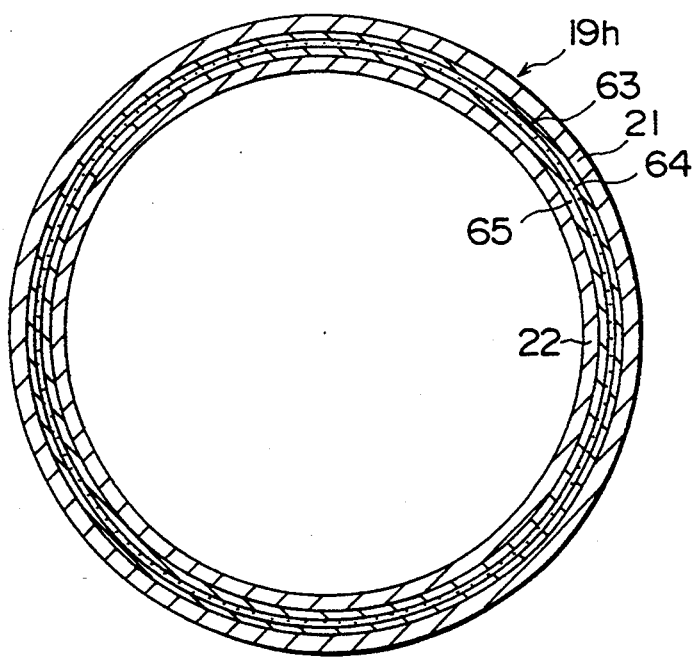
FIG. 36 shows a moderator rod according to an eighteenth embodiment of the present invention.

Then, in this embodiment, as shown in FIG. 36, the inner tube 22 and the outer tube 21 of the moderator rod 19h containing the burnable poison are formed of a zirconium alloy such as zircaloy-2 or zircaloy-4, and the thickness thereof is made as possible as thin such as to 0.4–0.8 mm and the annular section between the outer tube 21 and the inner tube 22 is formed so as to provide a three layer structure in the diameter direction as shown in FIG. 36.

In such case, the boron or boron compound (boron carbide, zirconium boride) in a single substance or member such as ceramics such as zirconium alloy, aluminum oxide or zirconia containing the boron or boron compound is disposed to the axially central position in the annular section, which is sandwiched from both sides in its shape of the gadolinium or its compound (gadolinia) in a single substance or member (burnable poison member 64, 65) such as ceramics such as zirconium alloy, aluminum oxide or zirconia containing the gadolinium or its compound. Accordingly, substantially the same effects as those attained by the moderator rod 19g containing the burnable poison shown in FIG. 34 can be attained and the soundness of the moderator rod during the fuel life can be improved and enhanced.

In the above seventeenth and eighteenth embodiments, the gadolinium and boron are together used as the burnable poison in the moderator rod. In the gadolinium, two nuclides of Gd-155 and Gd-157 are substantial neutron absorbing material, and the former has absorbing ability four times of the latter. By utilizing this fact, the annular section is formed as the three layer structure and the concentration of Gd-155 is made high in the central layer 63 and the concentration of Gd-157 is made high in the layer 65 contacting the inner tube 22 and the layer 64 contacting the outer tube 21, whereby the effects similar to those attained by the combination of the gadolinium and boron can be attained.

This will be explained hereunder with reference to FIG. 36. The gadolinium enriched in Gd-155 is selected as the burnable poison element in the central burnable poison layer 63, and the gadolinium enriched in Gd-157 is selected as the burnable poison element in the both side burnable poison layers 64 and 65.

The gadolinium in the respective layers is formed as independent layer of single substance layer, a member formed by adding the gadolinium or gadolinia to the zirconium alloy, and a member formed by adding the gadolinia to the ceramics of the aluminium oxide or zirconia, which are piled up into three layer structure.

In an alternation, the central layer may be formed of gadolinia added zirconia, the ceramics of aluminum oxide or zirconium alloy and both side surfaces thereof are flame-coated with gadolinia or gadolinium-zirconium alloy, coated with powders thereof and then sintered.

The reactivity worth of the area, i.e. the inner and outer layers 64 and 65 of the annular section of three layer structure in the diameter direction, in which the concentration of Gd-157 is made high, is reduced faster. In such case, since in the central layer of the annular section enriched in Gd-155 having the small thermal neutron absorption section, the thermal neutrons are shielded, the neutron absorbing effect of the Gd-155 can be late maintained in comparison with the structure using the natural gadolinium of single layer of the annular section. As this result, the effects similar to those attained by the combination of the gadolinium and the boron can be also attained.

Further, in the foregoing description, the structure of the eighteenth embodiment of FIG. 36 is adapted, the structure of the seventeenth embodiment may be adapted, in which gadolinium or gadolinia enriched in Gd-157 are added to the outer tube 61 and the inner tube 62 of the moderator rod 19h and the gadolinia enriched in Gd-155, the gadolinium, the gadolinia added zirconium alloy or the ceramics (zirconia, aluminium oxide) is used for the annular section 63.

Further, in the case where the gadolinium enriched in Gd-155 is produced from the natural gadolinium, the remaining material is the gadolinium enriched in Gd-157 and the enrichment of these materials may be done by utilizing a laser irradiation technique.

Nineteenth Embodiment

In the above embodiments utilizing the combination of the boron and gadolinium, the boron containing layer is sandwiched by the gadolinium containing layers. However, in this embodiment, although the poison effect maintaining effect of the boron is weak, simply, in the structure of the moderator rod 19g of FIG. 34, the fuel assembly is constructed by packing a member such as zirconium alloy or ceramids such as alumina or zirconia, in which the single substance or compound of boron and gadolinium (gadolinia, boron carbide, zirconium boride) are uniformly contained, or a sintered material of the single substance mixture of their compounds or compound single substance particle mixture. In such case, the inner and outer tubes are formed of the zirconium alloy containing no burnable poison. Otherwise, the annular section between the inner and outer tubes is formed in the double layer structure in which the single substance of the boron or its compound is contained in the outer tube side layer and the single substance of gadolinium or its compound is contained in the inner tube side layer. Since the coolant is not boiled in the moderator rod, the thermal neutron flux in the moderator rod is larger than that outside thereof. Accordingly, the burning of the boron having small neutron absorption cross section is delayed and the poison effect thereof can be hence maintained for the long term.

Twentieth Embodiment

This embodiment is a modified embodiment of the seventeenth embodiment, in which boron is added as the poison element to the inner tube and the outer tube and the gadolinia is disposed in the annular section between these inner and outer tubes. As a further modified embodiment of the eighteenth embodiment, the gadolinium as the poison element is arranged in the central layer of the three layer structure of the annular section and the boron is arranged in both side layers.

According to this embodiment, since the boron is not influenced with the thermal neutron shielding effect due to the gadolinium having large thermal neutron absorbing area, the reactivity effect can be maintained only by the fact that the boron has small neutron absorption section and hence easily remains unburned, and accordingly, the linearness of the reactivity effect at the burning final period of the burnable poison can be obtained. In this embodiment, it is necessary to increase the amount of the boron.

Twenty-oneth Embodiment

In this embodiment, the aforementioned combination of the gadolinium and the boron is utilized in an area of ⅓ to ⅔ length portion from the lower end of the effective fuel length in the fuel enrichment area in place of the combination of the gadolinium and boron or combination of the Gd-155 enriched gadolinium and the Gd-155 enriched gadolinium in the seventeenth and twentieth embodiments, and for the remaining upper portion, only the natural gadolinium combined with no boron is used or only the Gd-157 enriched gadolinium is used.

As described above, the fuel reactivity of the lower portion of the moderator rod can be suppressed throughout the entire fuel charging cycle by adapting the structure for maintaining long the reactivity effect of the poison only to the lower portion of the moderator rod, thus suppressing the downward power peak, being effective.

According to the present invention, the effects similar to those attained by the first and third embodiments can be attained by the sixth to twenty-oneth embodiments with respect to the combination of, as shown in FIGS. 5 and 10, the axial enrichment distribution of the fuel assembly, the axial gadolinia concentration distribution of the fuel rods containing the burnable poison and the axial distribution of the gadolinium amount in the moderator rod containing the burnable poison.

According to the embodiments of the present invention, as described hereinabove, the following advantageous effects can be achieved.

First, according to the fuel assembly of the present invention, since the burnable poison having low concentration is added to the fuel pellet and the burnable poison having high concentration is added to the burnable poison rod in a manner separated from the fuel pellet, the temperature of the fuel pellet added with the burnable poison of low concentration is less increased in amount in comparison with the conventional fuel pellet added with the burnable poison of the amount of 4–5 wt % and can be designed so as to provide a volume almost the same as the volume of the gas plenum of the fuel rod added with no burnable poison.

As this result, the countermeasure technique, such as to increase the required lowering amount of the enrichment of the nuclear fuel (U-235 enrichment or Pu enrichment or enhancement) or the thickness of the fuel rod cladding in comparison with the standard fuel rod added with no gadolinia with respect to the burnable poison added fuel rod, or to elongate the entire length of the fuel assembly by an amount corresponding to the elongation of the gas plenum of the fuel rod in comparison with the conventional one, can be remarkably improved.

Furthermore, since the fuel rods added with the burnable poison are substituted with the fuel rods having the maximum enrichment or enhancement, the average enrichment of the entire fuel assembly or plutonium enhancement can be increased, whereby the fuel assembly having high burn-up degree can be easily realized.

Still furthermore, according to the present invention, the number of the high power fuel rods can be increased in the fuel assembly and the power distribution in the horizontal cross section of the fuel assembly is made flat, whereby the local power peaking of the fuel rods arranged to the most outer peripheral portion is lowered. As this result, the numbers of both the fuel pellets added with the gadolinia and fuel pellets added with no gadolinia can be reduced in comparison with the conventional structure, thus making simple the fuel manufacturing process.

According to the burnable poison rod of the present invention, it is formed by piling up the circular zirconium alloy or zirconium thermet in which the axial concentration or amount of the burnable poison is changed or the splittable annular piece ceramics forming a portion of the cylindrical member, and can be easily formed so as to accord with the nuclear calculation mesh in a simulation code of a reactor with respect to the sectioning of the concentration or amount of such burnable poison.

Furthermore, since the burnable poison rod has the moderator passage therein, it serves as a neutron absorbing material, having good efficiency, of the neutron flux trap type on the case of having the neutron absorbing ability of the burnable poison. When the burnable poison contained in the burnable poison rod has been burned up, it serves as a water rod thereafter to increase the thermal neutron flux at the central area of the fuel assembly to thereby make flat the power distribution in the horizontal sectional area of the fuel assembly.

Still furthermore, according to the present invention, the number of the fuel rods containing the burnable poison can be reduced by using the moderator rod containing the burnable poison, so that the local power peaking of the fuel assembly can be reduced and problems involved by the requirement of the high burn-up degree realization can be also improved. Furthermore, in the case of using the moderator rod containing the burnable poison, the change of the burning of the poison reactivity can be suitably controlled, so that it becomes possible to make flat the excess reactivity of the core and make simple the operation for adjusting the coolant flow rate and the control rod operation.

What is claimed is:

1. A moderator rod provided with a burnable poison and disposed in a fuel assembly of a reactor core comprising:
    an outer tube;
    an inner tube disposed in the outer tube, said outer and inner tubes constituting a double tube structure between which an annular section is formed, wherein said annular section has a structure provided with holes where the diameters of the holes are distributed with diameters equal to or smaller than a thermal neutron diffusion length of water during a reactor operation period; and
    a burnable poison charged in said annular section,
    wherein a containing amount of the burnable poison per unit area of the annular section is distributed in at least one of peripheral direction and axial direction of the double tube structure of the inner and outer tube and said burnable poison is distributed in an interval smaller than a thermal neutron diffusion length during an operation period of a reactor.

2. A moderator rod according to claim 1, wherein a thickness of said annular section in which the burnable poison is charged is distributed.

3. A moderator rod according to claim 1, wherein a concentration of the burnable poison contained in said annular section is distributed.

4. A moderator rod provided with a burnable poison and disposed in a fuel assembly of a reactor core comprising:
    an outer tube;
    an inner tube disposed in the outer tube, said outer and inner tubes constituting a double tube structure between which an annular section is formed; and
    at least two kinds of burnable poisons charged in said annular section, said burnable poisons being different in neutron absorption cross sections,
    wherein said annular section has a three layer structure having outer layers contacting the outer and inner tubes and an intermediate layer interposed between both the outer layers, said outer layers containing a burnable poison having a large neutron absorption cross section and said intermediate layer containing a burnable poison having a small neutron absorption cross section.

5. A moderator rod provided with a burnable poison and disposed in a fuel assembly of a reactor core comprising:
    an outer tube;
    an inner tube disposed in the outer tube, said outer and inner tubes constituting a double tube structure between which an annular section is formed;
    a first burnable poison charged in said annular section; and
    a second burnable poison charged in at least one of said outer and inner tubes, said second burnable poison having a neutron absorption cross section different from that of the first burnable poison,
    wherein said second burnable poison is contained in both the outer and inner tubes and has a neutron absorption cross section larger than that of the first burnable poison contained in the annular section.

6. A moderator rod according to claim 4, wherein the burnable poison having a large neutron cross section is gadolinium and the burnable poison having a small neutron cross section is boron.

7. A moderator rod according to claim 4, wherein the burnable poison having a large cross section is gadolinium containing Gd-157 at a ratio higher than that contained in a natural gadolinium, and the burnable poison having a small cross section is gadolinium containing Gd-155 at a ratio higher than that contained in a natural gadolinium.

8. A moderator rod according to claim 1, wherein the poison charged area of the burnable poison has a burnable poison concentration distribution in axial direction or density distribution and a portion positioned higher than a boundary positioned at $\frac{1}{3}$ to $\frac{2}{3}$ length position from the lower end of the fuel effective length has the burnable poison concentration or density distribution smaller than that in a portion positioned lower than the boundary.

9. A moderator rod according to claim 1, wherein the poison charged area of the burnable poison has a burnable poison concentration distribution in axial direction or density distribution, said poison charged area having a first sectioning portion positioned at $\frac{1}{3}$ to $\frac{2}{3}$ length position from the lower end of the fuel effective length and a second sectioning portion positioned at $\frac{2}{3}$-5/6 length position from the lower end of the fuel effective length, and the burnable poison concentration or density distribution is made highest at a portion lower than the first sectioning portion, made lowest at a portion higher than the second sectioning portion, and made middle at a portion between the first and second sectioning portions.

10. A moderator rod according to claim 4, wherein the moderator comprises an outer tube, an inner tube disposed in the outer tube, said outer and inner tubes constituting a double tube structure between which an annular section is formed, and a burnable poison charged in the annular section so as to provide a burnable poison charged area having a burnable poison concentration distribution or density distribution in axial direction, and wherein the moderator rod has an upper portion having a double tube structure of the outer tube and the inner tube between which is formed an annular section in which one kind of burnable poison is charged and has a lower portion having the structure as defined in the claim 6, the upper and lower portions being sectioned by a boundary portion positioned at a $\frac{1}{3}$ to $\frac{2}{3}$ length portion from the lower end of the fuel effective length.

11. A fuel assembly of a nuclear reactor comprising the moderator rod containing the burnable poison as set forth in claim 1 and a number of fuel rods, said moderator and fuel rods being bundled.

12. A fuel assembly according to claim 11, wherein at least one of said fuel rods contains a fuel pellet in which a burnable poison having a low concentration having a poison reactivity life shorter than that of a burnable poison contained in the moderator rod or a burnable poison is coated on a surface of the fuel pellet.

13. A fuel assembly of a nuclear reactor comprising:
an upper tie plate;
a lower tie plate;
a number of fuel rods supported at their upper ends by the upper tie plate and at their lower ends by the lower tie plate and filled up in their inner spaces with a plurality of fuel pellets;
at least one of moderator rods defined in claim 1 and disposed between the fuel rods; and
a square cylindrical channel box forming the coolant passage, in which said fuel rods and said moderator are accommodated in a bundle,
wherein said moderator rod containing the burnable poison has an elongated outer tube, an inner tube disposed coaxially in the outer tube, upper and lower annular plugs secured to these outer and inner tubes and metal, ceramics or thermet containing burnable poison charged in an annular space formed between the outer tube and the inner tube, said lower annular plug being connected to a lower end tube of a single tube structure having a lower end plug, and a coolant having a neutron moderating function is taken into the inner tube from the flow-in port formed to the lower end tube through a coolant passage formed between the fuel rods in the fuel bundle, the coolant then flowing through the inner tube, said upper annular plug being connected to an upper end tube of a single tube structure having an upper end plug, and the coolant from the inner tube through the leakage port is discharged into the coolant passage between the fuel rods in the fuel bundle, at least one of the moderator rods containing the burnable poison being provided with a tub for supporting a plurality of spacers arranged axially of the fuel bundle for maintaining a horizontal space between the fuel rods and the burnable poison rods, and an area of a metal, ceramics or thermet containing the burnable poison is formed at a portion except for portions having axial length corresponding to 1/24 to 1/12 length of the fuel effective length from the upper and lower ends thereof.

14. A fuel assembly according to claim 11, wherein the moderator rod containing the burnable poison defined in claim 1 is arranged at a central portion of the fuel bundle and the fuel rods include ones, of the fuel rods facing the moderator rod containing the burnable poison, containing no burnable poison corresponding to the number of fuel rod cells occupied by at least the moderator rods containing the burnable poison.

15. A fuel assembly according to claim 11, wherein the fuel rods containing the burnable poison and arranged at a most outer peripheral portion or at a portion next to the most outer peripheral portion of the fuel bundle has a burnable poison concentration less than that at which the burnable poison has been burned up at a time of 0.5 to 0.8 time of a cycle length.

16. A moderator rod provided with a burnable poison and disposed in a fuel assembly of a reactor core comprising:
an outer tube;
an inner tube disposed in the outer tube, said outer and inner tubes constituting a double tube structure between which an annular section is formed; and
at least two kinds of burnable poisons charged in said annular section, said burnable poisons being different in neutron absorption cross sections,
wherein said annular section has a two layer structure having a first layer contacting the inner tube and containing a burnable poison having a large neutron absorption cross section and a second layer contacting the outer tube and containing a burnable poison having a smaller neutron absorption cross section than that of the inner tube.

17. A moderator rod according to claim 16, wherein the burnable poison having a large neutron cross section is gadolinium and the burnable poison having a small neutron cross section is boron.

18. A moderator rod according to claim 17, wherein the burnable poison having a large cross section is gadolinium containing Gd-157 at a ratio higher than that contained in a natural gadolinium, and the burnable poison having a small cross section is gadolinium containing Gd-155 at a ratio higher than that contained in a natural gadolinium.

19. A moderator rod as claimed in claim 18, wherein the moderator rod comprises an outer tube, an inner tube disposed in the outer tube, said outer and inner tubes constituting a double tube structure between which an annular section is formed, and a burnable poison charged in the annular section so as to provide a burnable poison charged area having a burnable poison concentration distribution or density distribution in axial direction, and wherein the moderator rod has an upper portion having a double tube structure of the outer tube and the inner tube between which is formed an annular section in which one kind of burnable poison is charged and has a lower portion having the structure as defined in claim 18, the upper and lower portions being sectioned by a boundary portion positioned at a ⅓ to ⅔ length portion from the lower end of the fuel effective length.

20. A moderator rod provided with a burnable poison and disposed in a fuel assembly of a reactor core comprising:
an outer tube;
an inner tube disposed in the outer tube, said outer and inner tubes constituting a double tube structure between which an annular section is formed;
a first burnable poison charged in said annular section; and
a second burnable poison charged in at least one of said outer and inner tubes, said second burnable poison having a neutron absorption cross section different from that of the first burnable poison,
wherein said second burnable poison is contained in the inner tube and has a neutron absorption cross section larger than that of the first burnable poison contained in the annular section, or said second burnable poison is contained in the outer tube and has a neutron absorption cross section smaller than that of the first burnable poison contained in the annular section.

* * * * *